(12) United States Patent
Herman et al.

(10) Patent No.: US 11,866,253 B2
(45) Date of Patent: Jan. 9, 2024

(54) HIGH-DENSITY AUTOMATED STORAGE AND RETRIEVAL SYSTEM

(71) Applicant: CARNEGIE MELLON UNIVERSITY, Pittsburgh, PA (US)

(72) Inventors: Herman Herman, Pittsburgh, PA (US); Gabriel Goldman, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/915,213

(22) PCT Filed: Dec. 28, 2020

(86) PCT No.: PCT/US2020/067174
§ 371 (c)(1),
(2) Date: Sep. 28, 2022

(87) PCT Pub. No.: WO2021/236164
PCT Pub. Date: Nov. 25, 2021

(65) Prior Publication Data
US 2023/0139228 A1  May 4, 2023

Related U.S. Application Data

(62) Division of application No. PCT/US2020/033790, filed on May 20, 2020.
(Continued)

(51) Int. Cl.
*B65G 1/04* (2006.01)
*B65D 21/02* (2006.01)

(52) U.S. Cl.
CPC ....... *B65G 1/0435* (2013.01); *B65D 21/0204* (2013.01); *B65G 1/0478* (2013.01)

(58) Field of Classification Search
CPC . B65G 1/0435; B65G 1/0478; B65D 21/0204
See application file for complete search history.

(56) References Cited

U.S. PATENT DOCUMENTS 2,864,515 A  12/1958 Marshall
3,508,495 A   4/1970 Mirel
(Continued)

FOREIGN PATENT DOCUMENTS

ES  2069491 A2  5/1995
JP  S5978305 A  5/1984
(Continued)

OTHER PUBLICATIONS

International Search Report and Written Opinion for Application No. PCT/US2020/033790 dated Aug. 14, 2020, 13 pages.
(Continued)

*Primary Examiner* — Kaitlin S Joerger
(74) *Attorney, Agent, or Firm* — KDW Firm PLLC

(57) ABSTRACT

A high-density storage system for goods is described in which totes carrying the goods are stored in a storage structure and stored and retrieved via stationary or mobile conveyers running along opposite ends of each layer of the storage structure. The totes may be moved to or from the conveyers as the rows move at a constant velocity toward or away from the conveyers. Totes at the ends of rows are quickly moved and stored in another row until the desired tote appears at the end of the row, at which point the desired tote is carried to an exit point of the storage structure by one of the conveyers.

30 Claims, 62 Drawing Sheets

Related U.S. Application Data

(60) Provisional application No. 62/850,191, filed on May 20, 2019.

(56) References Cited

U.S. PATENT DOCUMENTS

| | | | |
|---|---|---|---|
| 3,805,973 | A | 4/1974 | Thompson |
| 4,389,157 | A | 6/1983 | Bernard, II |
| 4,679,381 | A | 7/1987 | Truninger |
| 9,511,830 | B2 | 12/2016 | Corcoran |
| 9,639,824 | B1 | 5/2017 | Brazeau |
| 10,913,603 | B1 * | 2/2021 | Kalm ................... G05B 19/418 |
| 11,332,312 | B2 | 5/2022 | Valinsky et al. |
| 2005/0186053 | A1 * | 8/2005 | Itoh ....................... B65G 1/137 414/285 |
| 2010/0230408 | A1 | 9/2010 | Licari |
| 2013/0129455 | A1 | 5/2013 | De Vries |
| 2014/0044506 | A1 * | 2/2014 | De Vries .............. B65G 1/0435 414/277 |
| 2016/0347544 | A1 | 12/2016 | Kvifte |
| 2017/0225890 | A1 * | 8/2017 | Li .......................... B65G 1/023 |
| 2018/0029796 | A1 * | 2/2018 | De Vries .............. B65G 1/0435 |
| 2018/0290830 | A1 | 10/2018 | Valinsky |
| 2019/0375590 | A1 | 12/2019 | Gravelle |
| 2021/0009348 | A1 * | 1/2021 | Pietrowicz ....... G06Q 10/06315 |
| 2021/0130092 | A1 * | 5/2021 | Hu .......................... B65G 1/10 |

FOREIGN PATENT DOCUMENTS

| | | |
|---|---|---|
| JP | 2017536314 A | 12/2017 |
| WO | 2018068026 A1 | 4/2018 |

OTHER PUBLICATIONS

International Search Report and Written Opinion for Application No. PCT/US2020/067174 dated Mar. 8, 2021, 8 pages.

European Search Report and Written Opinion for Application No. EP20808276, dated Mar. 27, 2023, 9 pages.

* cited by examiner

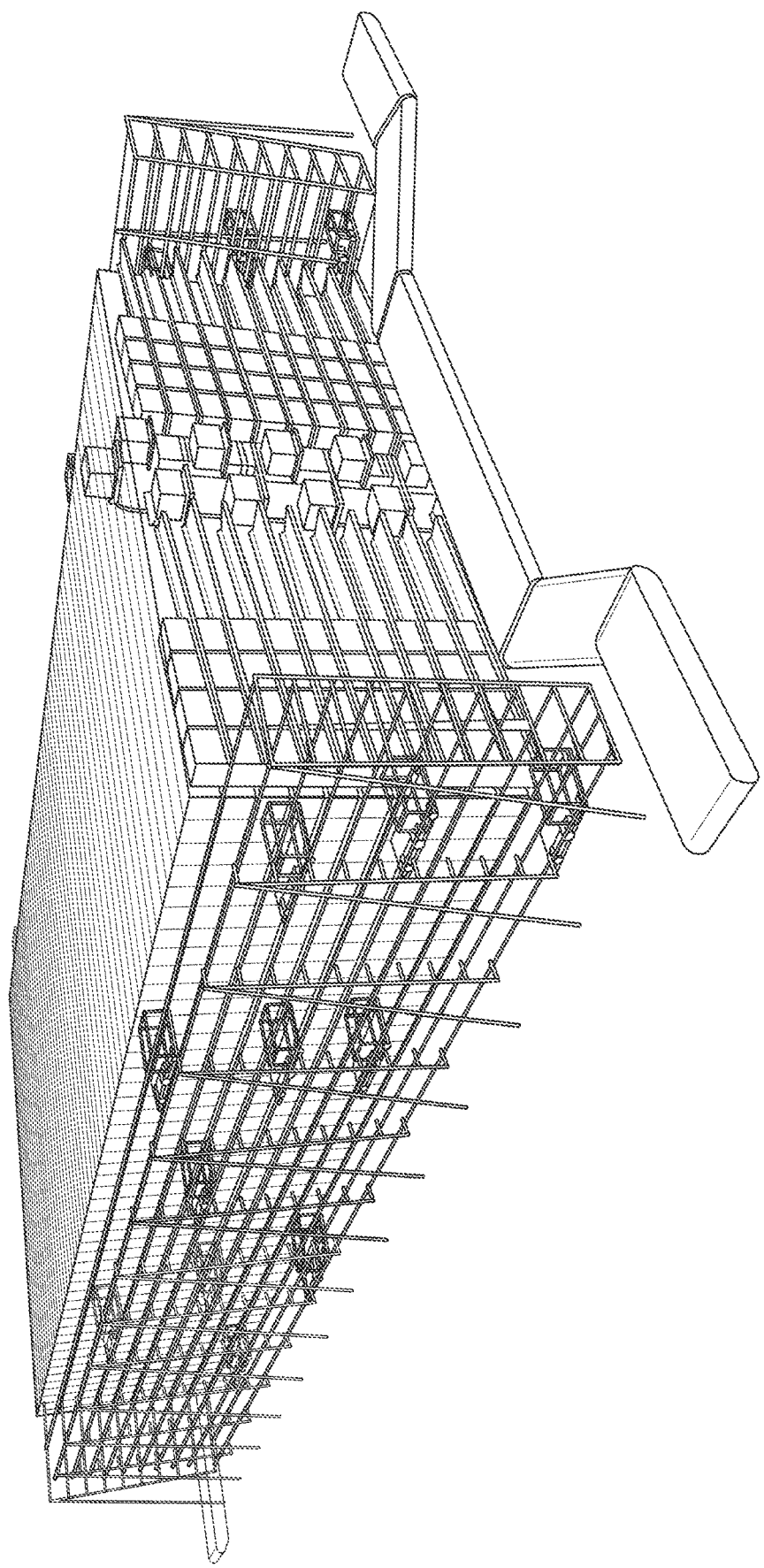

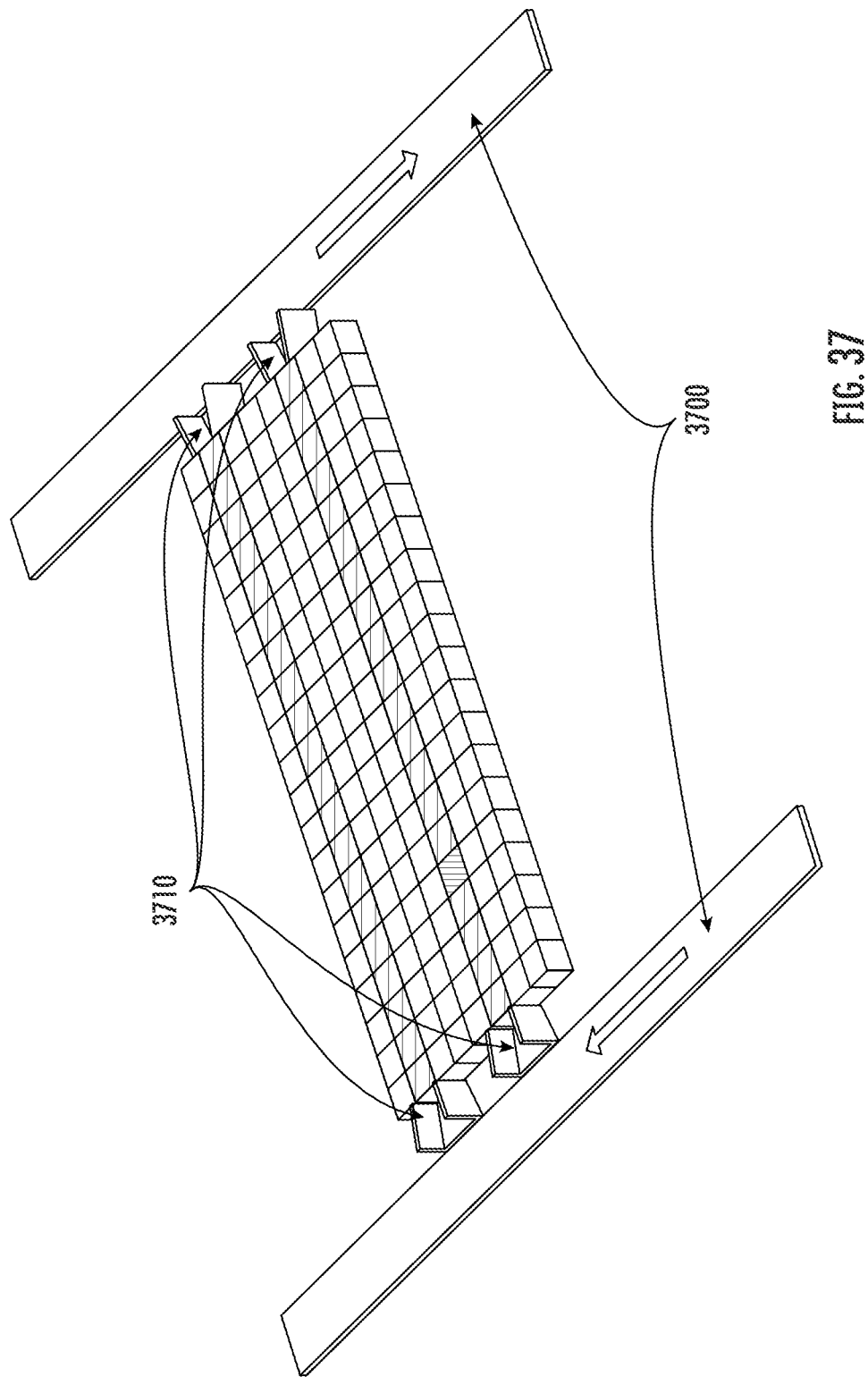

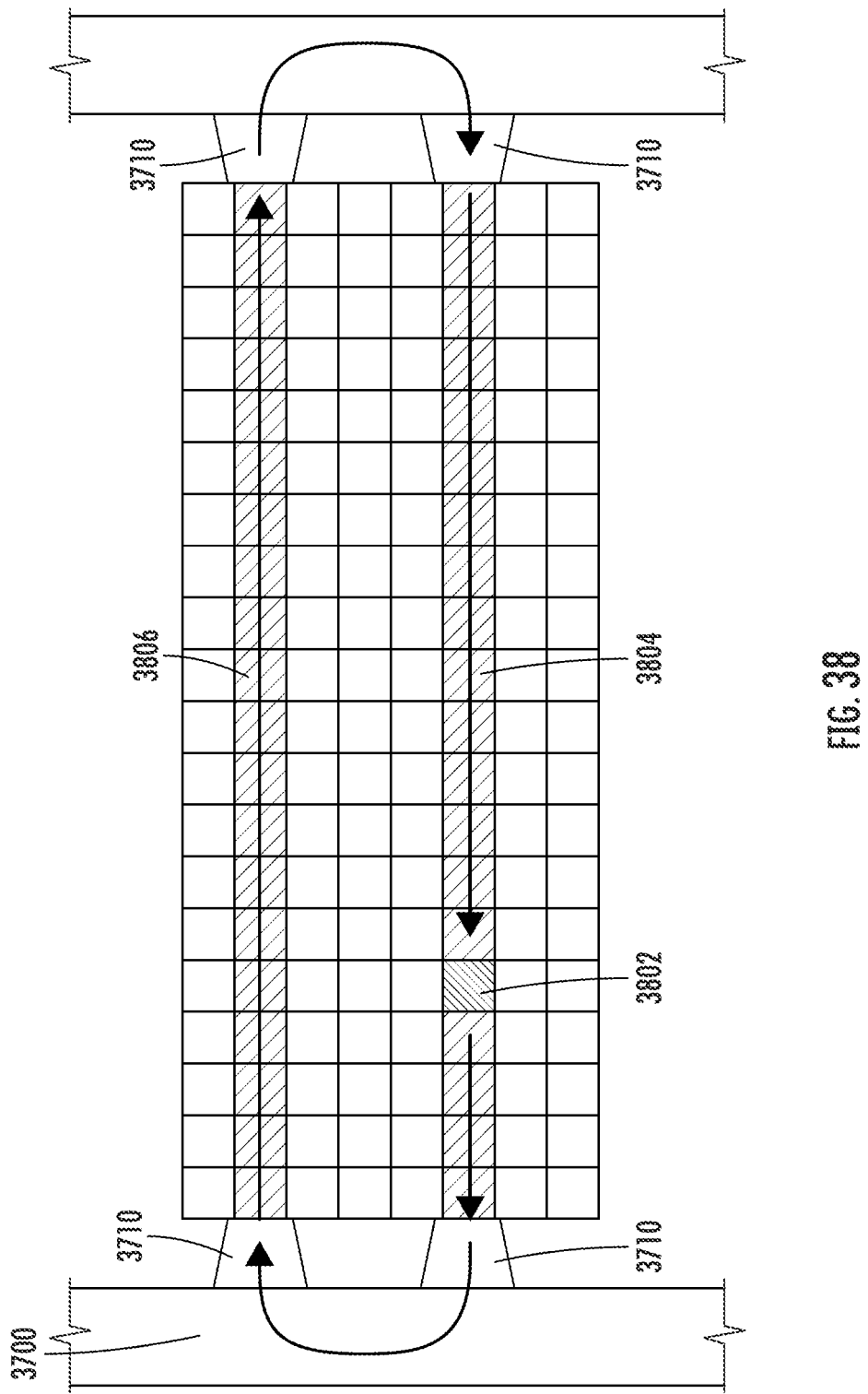

HIGH-DENSITY AUTOMATED STORAGE AND RETRIEVAL SYSTEM

RELATED APPLICATIONS

This application is a national phase filing under 35 U.S.C. § 371 claiming the benefit of and priority to International Patent Application No. PCT/US2020/067174, filed Dec. 28, 2020, which is a continuation-in-part of PCT Application PCT/US2020/033790, filed at the U.S. Receiving Office on May 20, 2020, which claims the benefit of U.S. Provisional Patent Application No. 62/850,191, filed May 20, 2019. The contents of these applications are incorporated herein in their entireties.

BACKGROUND

Companies are pushing to maximize the storage density and efficiency of automated storage and retrieval systems (AS/RS) in their order fulfillment process. AS/RS systems use automated carriers that typically move either between or on top of structures that hold products or totes filled with products. In the case of systems (Schaefer iCube, Cuby, and Miliload Crane, Dematic Multishuttle, Venderlande ADAPTO, and OPEX Perfect Pick) where carriers move in between aisles of products and/or totes, there is a limit as to how dense the system can be in that the space required for the carrier movement reduces the overall potential storage density of the system.

Some systems (Autostore, and CimCorp) maximize density by stacking products or totes vertically, which maximizes storage density, but has potentially lower efficiency when retrieving products or totes that are buried lower in the stacks. In the case of the CimCorp system, a gantry services a range of totes that are stacked on the floor, which assists to minimize infrastructure but ultimately has a limit on performance based on a limited number of gantry arms overlapping the same workspace. The Autostore system stacks totes vertically within a raised structure. Retrieval robots have to lift the totes from the top one-by-one. This results in a limit on performance to retrieve totes that are lower in the stack with each lift taking a longer amount of time proportional to the height of the tote stack or product being lifted.

SUMMARY OF THE INVENTION

The embodiments described herein provide the capability for a highly dense storage solution while also providing a high level of performance, thereby improving both density and speed of retrieval over prior art systems. Instead of stacking the totes vertically (which has an inherent height limit due to the mechanical limit and the weight of the totes), the totes are arranged in horizontal rows within a supporting structure. Unlike other systems, the totes are mechanically coupled to allow for a row of horizontally connected totes to be pulled and/or push together as a unit by pulling or pushing the tote on the end of a row, which will also pull or push all other totes within that same row that are connected to each other. This arrangement allows any totes within a row to be retrieved by repeatedly pulling and decoupling the outer tote or totes from the row until the right tote is retrieved. It also allows for the easy storage of totes. A tote could be stored in this AS/RS system simply by pushing a tote into a row that has an empty spot. As that tote is pushed into that row, it will automatically couple itself longitudinally when it comes into contact with the totes that are already in that row. This efficient storage approach could also be used to store the outer totes that were removed from a row to access the tote that needs to be retrieved.

The described embodiments store totes within a layered support structure. This structure supports the weight of all totes as well as providing rows within the structure in which totes can be stored. The totes are placed into the structure rows through a horizontal motion in a similar manner to other rack-based storage solutions. The novel storage structure allows for a high number of totes to be stored in a single row, whereas more standard rack structures allow for only a small number of totes or packages to be stored on a given shelf, because there is no efficient way to access totes that are located deep in the row. The described embodiments are able to retrieve totes from anywhere within a row upon request with a high level of performance in comparison to other high-density storage solutions. This is possible since all totes, no matter how deep they are located in the row, could be accessed just by pulling on the outside totes until the totes of interest are at the edge of the row. Pulling on the outer tote or totes will also pull all the other totes that are coupled, allowing the tote that needs to be retrieved to be pulled outside of the row.

One embodiment of the invention retrieves totes within the system when they are pulled or pushed to the end of a row, where the tote is decoupled when moved in a direction other than the direction of the longitudinal axis of the row. In preferred embodiments, the tote is automatically decoupled when moved in a direction perpendicular to the longitudinal axis of the row. This exposes the next tote in the row to be pulled or pushed and decoupled. This process can then be repeated until the target tote to be retrieved is pulled or pushed to the end of the row and decoupled. The totes that were removed and decoupled from the row previous to access the target tote can be moved to another row one or more at a time. Those totes can then be coupled onto totes that were previously in the new row as they are push/pulled into the row.

The novel tote coupling embodiment also provides a method for totes to be coupled to one another through linear motion in the coupling direction. As totes are pushed into one another, features on the totes couple to one another to allow for transfer of forces between the totes along the length of the row. In one embodiment, coupling can only be accomplished in the direction of the row, whereas decoupling can only occur in any direction other than a direction along the longitudinal axis of the row. In other embodiments, active coupling and decoupling mechanisms may be provided.

There are multiple embodiments of how totes can be stored within the support structure. One embodiment has totes arranged in rows that are single tote height and coupled together along the length of the row. Other embodiments have totes arranged in stacks that are two or more totes high with one or more of the totes in the stack being coupled to the next tote stack in the row. For this embodiment, it is possible that neighboring stacks of totes in a row have different number of totes in their stack, resulting in one or more totes being coupled to the next tote stack in the row.

There are multiple embodiments for the novel technology wherein one or more automated carriers can access the totes in the support structure. One embodiment of the novel technology has one or more automated robotic carriers that moves in the center of multiple rows (on the left and right) of totes. It can pull or push totes from a row on either side to either retrieve it for delivery or push it into another row on either side until the target tote is retrieved.

Another embodiment for the novel technology features one or more carriers that travel along the outside of one or more faces of the storage structure along the ends of the tote rows. In this embodiment, automated carriers can push or pull totes from a row, decouple them from that row, and move it to another row or retrieve the tote from a single side of the carrier. Having the carrier on the outsides face(s) of the structure allow for a high density of storage space while still allowing for access to the automated carrier components from outside of the storage structure for maintenance or other operations.

A further embodiment of the novel system has carriers working in two or more pairs on opposite sides of the structure, with both automated carriers of each pair aligned on opposite ends of the same rows, or capable of storing and retrieving totes from the same or nearby rows. This embodiment utilizes both automated carriers to push and/or pull totes from both ends of the rows. The automated carriers would be able to move totes from one row to another in unison with one another until the tote(s) that need to be retrieved are removed from the storage structure row and decoupled from neighboring totes in the row, providing a "circular" motion of the totes within the rows. In some embodiments, during these push and pull motions, the motion of the totes could be kept at a constant velocity even during decoupling and coupling, thereby minimizing the time needed for the actions.

This novel process is capable of having higher performance than other solutions for multiple reasons. First, by having totes within a row coupled to one another, the automated carriers only have to act on the totes on the end or near the end of the row, to move all of the coupled totes within that row. Secondly, by having totes that can decouple through motions in direction different from the direction of the longitudinal axis of the row, the process is able to be efficient and quick, reducing storage and retrieval times. Third, as totes are moved to decouple from one row, they can be coupled to a new row in the same motion. Once the tote is coupled to the new row, it can be pushed or pulled resulting in the movement of the entire row. Finally, by maintaining the constant velocity of the totes as they are being pushed and pulled, the time needed to retrieve a certain tote or to store a tote can be minimized.

BRIEF DESCRIPTION OF THE DRAWINGS

FIG. 11 shows a first embodiment of a storage structure for totes.

FIG. 15 shows the positioning of carriers on the exterior of the storage structure of FIG. 14.

FIG. 37 shows an improved-efficiency embodiment of the invention which utilizes conveyers along the ends of each row and which allows totes to be decoupled from and coupled to rows while the rows are moving at a constant velocity.

FIG. 38 is a top schematic view of a portion of a layer of the storage structure showing the circular motion enabled by the use of the conveyers along the side of the layers of the storage structure.

DEFINITIONS

Figure 1A:
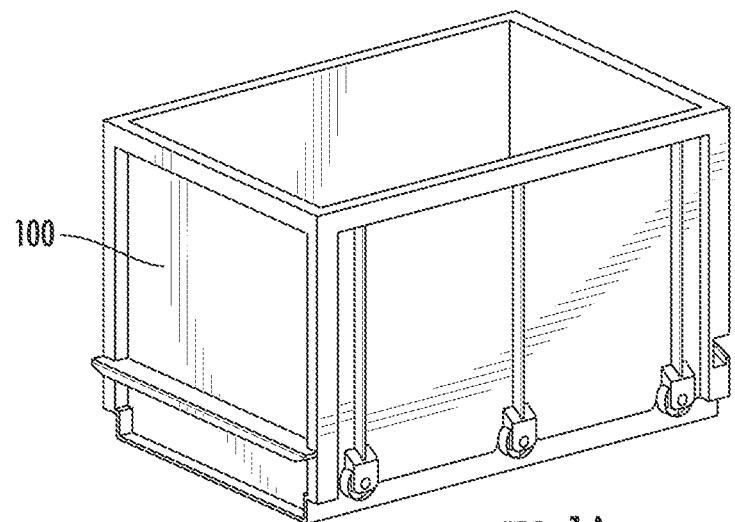
FIG. 1 shows several views of a first embodiment of a tote where the tote comprises an integral carrier.

As used herein, the term "carrier" refers to a locally or remotely controlled robotic or mechanism capable of moving about a tote support and storage structure in a vertical, horizontal or both directions and capable of accepting, carrying and discharging one or more totes.

As used herein, a "tote" refers to a device capable of carrying goods for transport by a carrier from one location to another. The tote may be configured to be manipulated by a carrier for purposes of movement from a storage location to and from an exit or entry point of the storage system. The tote may be configured as a container or as a flat structure on which other containers may be placed.

As used herein, the term "storage structure" refers to a structure for storing totes and facilitating the placement and retrieval of totes within the storage structure by a carrier.

As used herein, the term "layer" refers to multiple rows for the storage and retrieval of totes. Layers can be oriented in a horizontal, vertical, or any orientation within the storage structure.

As used herein, a "row" is defined as a portion of a storage structure capable of storing a plurality of totes aligned longitudinally with each other and able to move in the longitudinal direction of the row. A row may be horizontal, vertical, or any orientation within the storage structure, but horizontal orientation is the preferred embodiment, because the force to pull a row of totes in the horizontal direction is significantly less than the force needed to lift the coupled totes in vertical direction.

As used herein, the term "constant velocity", with respect to the movement of rows of totes, is defined as the movement of a row at a substantially constant speed after being accelerated from a stopped position or before being decelerated to a stopped position.

As used herein, the term "conveyer", is defined as any system capable of moving objects from one place to another, as, for example, using belts, rollers or any other means. A conveyer could operate independently from a mobile carrier or as part of the mobile carrier. A mobile carrier could be considered a conveyer.

DETAILED DESCRIPTION

The embodiments described herein utilize multiple carriers that work in unison to manipulate totes or other stored product from a storage structure, to efficiently retrieve a particular tote or store a tote. The process utilizes a system of totes or carriers that allow for force to be shared between a row of totes in a singular linear direction (in either positive or negative direction) but also allows for the totes to be decoupled mechanically by using electromechanical actuator, or by moving them in a direction other than the direction of the longitudinal axis of the row (either positive or negative direction). The novel technology can manipulate the totes or other products in both directions to move a target tote (and as a result, all totes coupled to the target tote) toward an end of the row where it may be decoupled from the row.

Tote Configuration

Figure 3A:
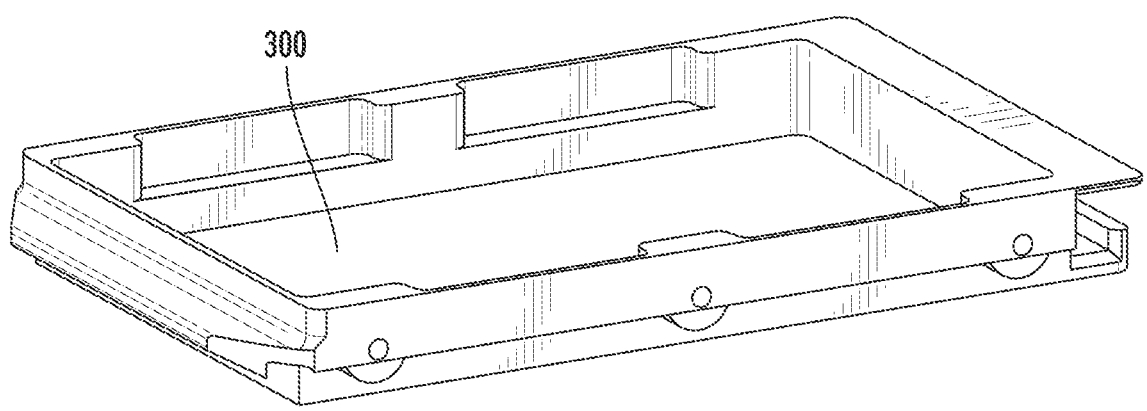
FIG. 3 shows several views of a second embodiment of a tote where the tote comprises a flat carrier upon which containers or boxes containing goods may be stacked.
Figure 3B:
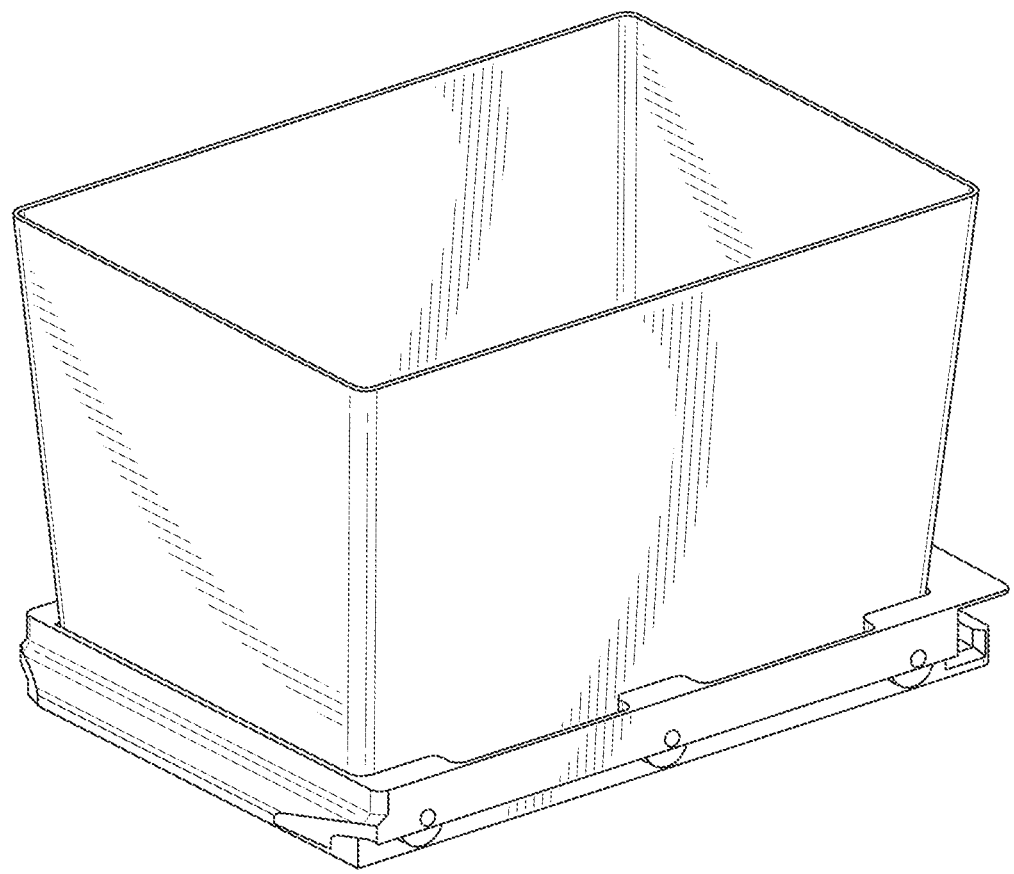

One aspect of the invention is directed to various configurations of totes for storage in a storage structure. A first embodiment of the tote is shown in FIG. 1(A) wherein the tote embodies a container structure 100 for accepting goods for storage. In an alternate embodiment of the invention, the tote may be configured as shown in FIG. 3(A) as a flat platform having the coupling and mobility components and which can accept goods or containers for goods stacked thereon, as shown in FIG. 3(B).

Figure 1B:
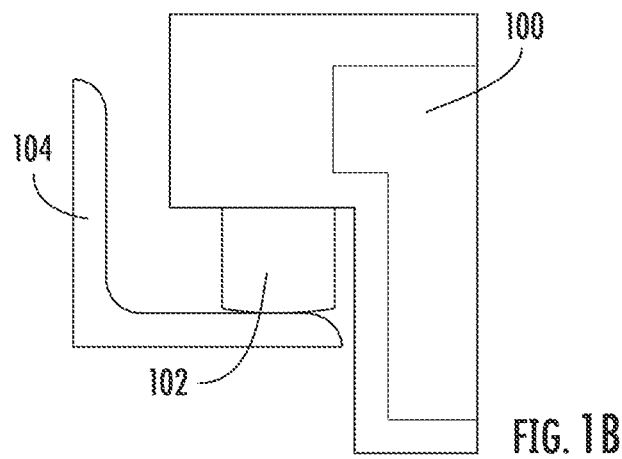
Figure 1C:
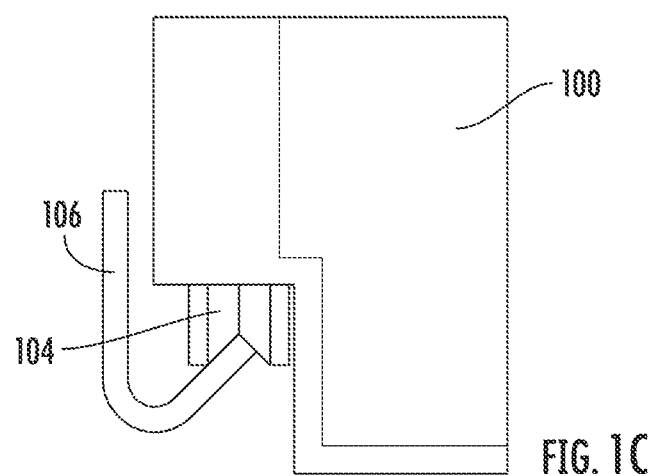

The totes are required to be able to be moved back and forth in a direction along the longitudinal axis of any row in the storage structure such that they may be manipulated as rows of totes within the storage structure. In one embodiment, shown in FIG. 1(B), tote 100 may be configured with wheels or casters 102 which slide along rails 104 disposed in the storage structure. In an alternate embodiment, tote 100 may be configured with angled wheels 104 which slide along rails 106 as shown in FIG. 1(C). In yet other embodiments, not shown in the figures, tote 100 may be configured with low friction sliding surfaces which engage mating surfaces in the storage structure. The mobility components of the embodiments shown in FIG. 1(B,C) may be fitted to the types of tote shown in FIG. 1(A) or FIG. 3(A). Wheels or casters 102 may be disposed on any portion of the tote and are not limited to the placement shown in FIG. 1(A).

A second aspect of the invention is directed to a coupling system which allows totes to be coupled end-to-end as they are pushed into each other, thereafter allowing an entire row of coupled totes to be pushed or pulled from the tote on the end of the row. In one embodiment of the invention, totes may be configured with an interface to a drive mechanism for moving the coupled totes into and out of the rows of the storage structure.

Figure 2A:
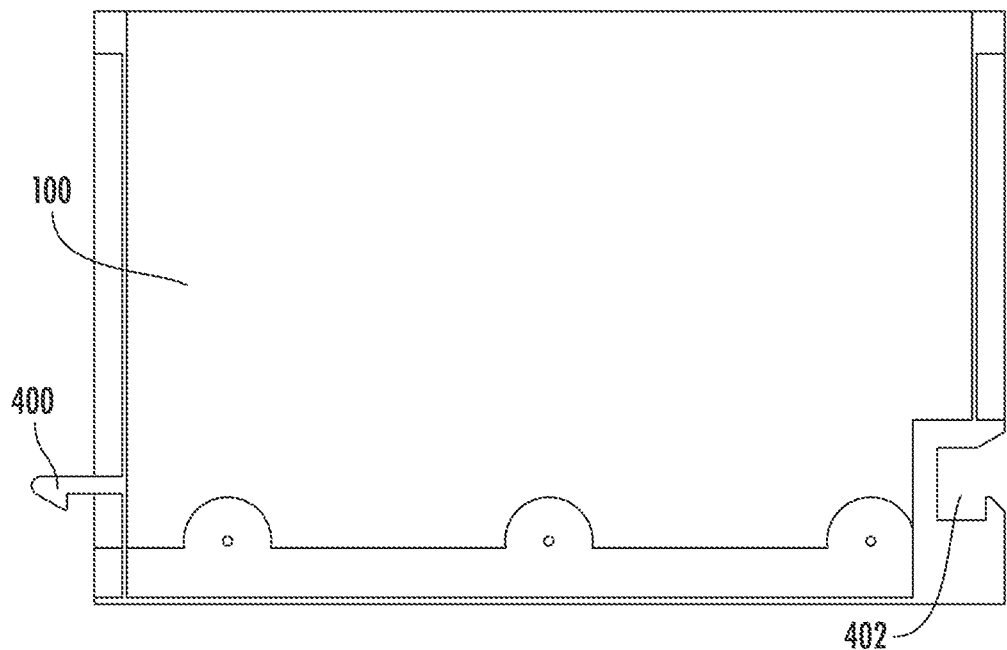
FIG. 2 shows and inside views of the tote of FIG. 1, showing the coupling mechanism.
Figure 4A:
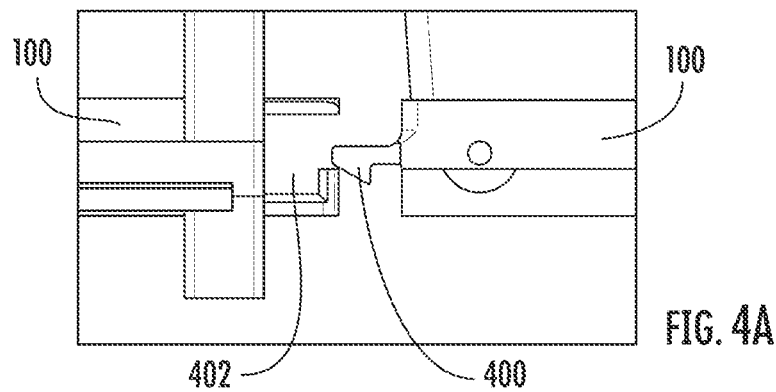
FIG. 4 shows the passive end-to-end coupling process for totes.
Figure 4B:
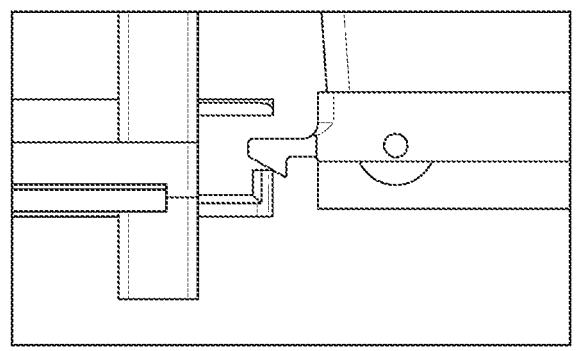
Figure 4C:
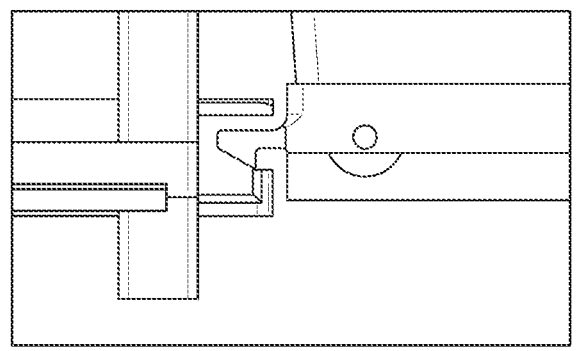
Figure 4D:
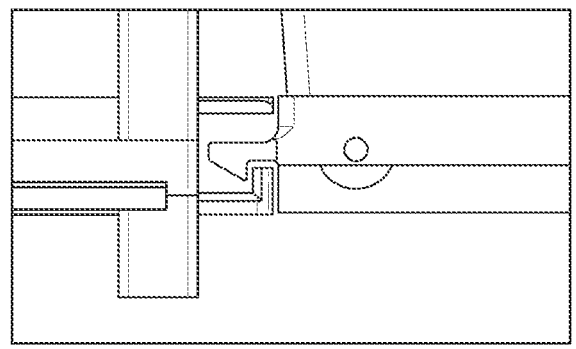

One embodiment of this aspect of the invention is shown in FIG. 2(A), showing a side view of tote 100 in which one side on the end of the tote is configured with a hook, while the opposite side is configured with a hook receptacle for accepting the hook of an adjacent tote. FIG. 4(A-D) show one embodiment of the coupling process, in which the totes 100 are pushed together and wherein hook 400 on a first tote, having a slanted surface, is pushed upwardly by the lip of the hook receptacle 402 on the adjacent tote. In the embodiment shown in FIG. 4(C), entire tote is raised to allow hook 400 to slide into hook receptacle 402. In an alternate embodiment, hook 402 may be spring-loaded such as to be able to be raised for disposal into the hook receptacle 402 without raising the entire tote 100. FIG. 4(D) shows tote 100 in a fully coupled position. Other embodiments of the coupling mechanism are contemplated to be within the scope of the invention.

The de-coupling of the totes may occur in one of two ways. In a first embodiment, the totes are decoupled as they are moved in a direction other than the direction of the longitudinal axis of the row, allowing hook 400 to slide out of the side of hook receptacle 402. As shown in FIG. 1(A) and FIG. 2(A), hook receptacle 402 is open on the ends such as to allow hook 400 to slide out of hook receptacle 402 in response to a perpendicular motion of the totes with respect to each other.

Figure 5A:
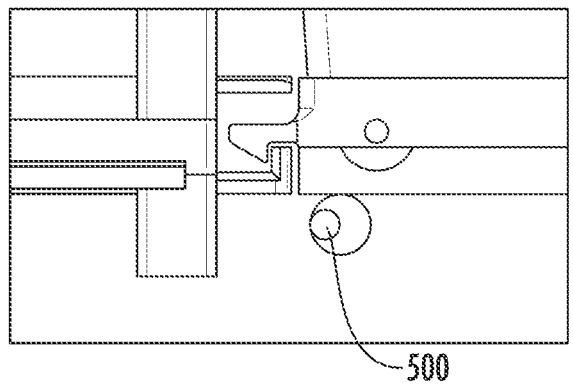
FIG. 5 shows several views of one embodiment of an active decoupling process utilizing an eccentric roller.
Figure 5B:
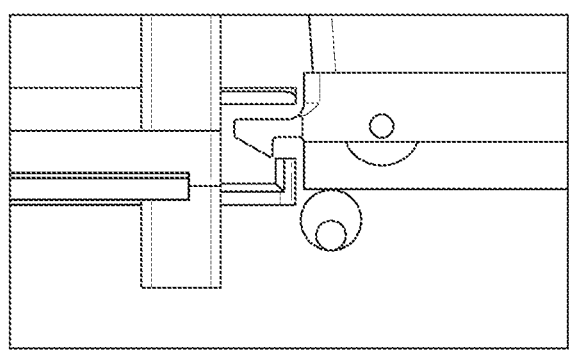
Figure 5C:
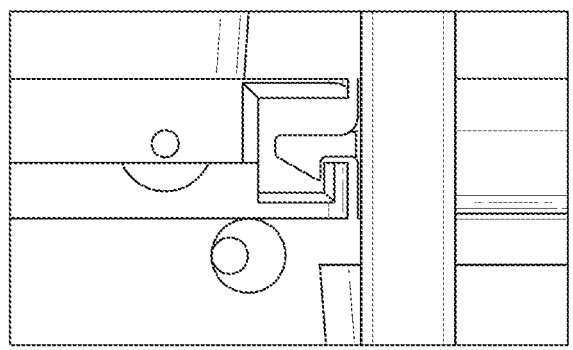
Figure 5D:
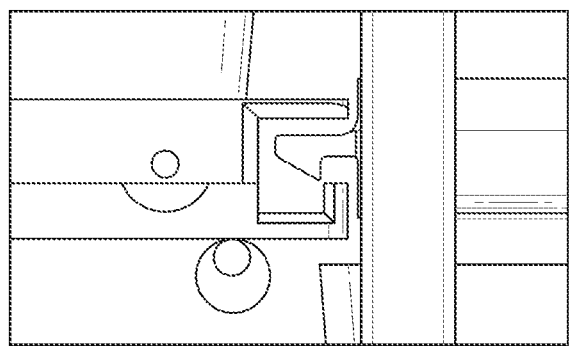
Figure 5:
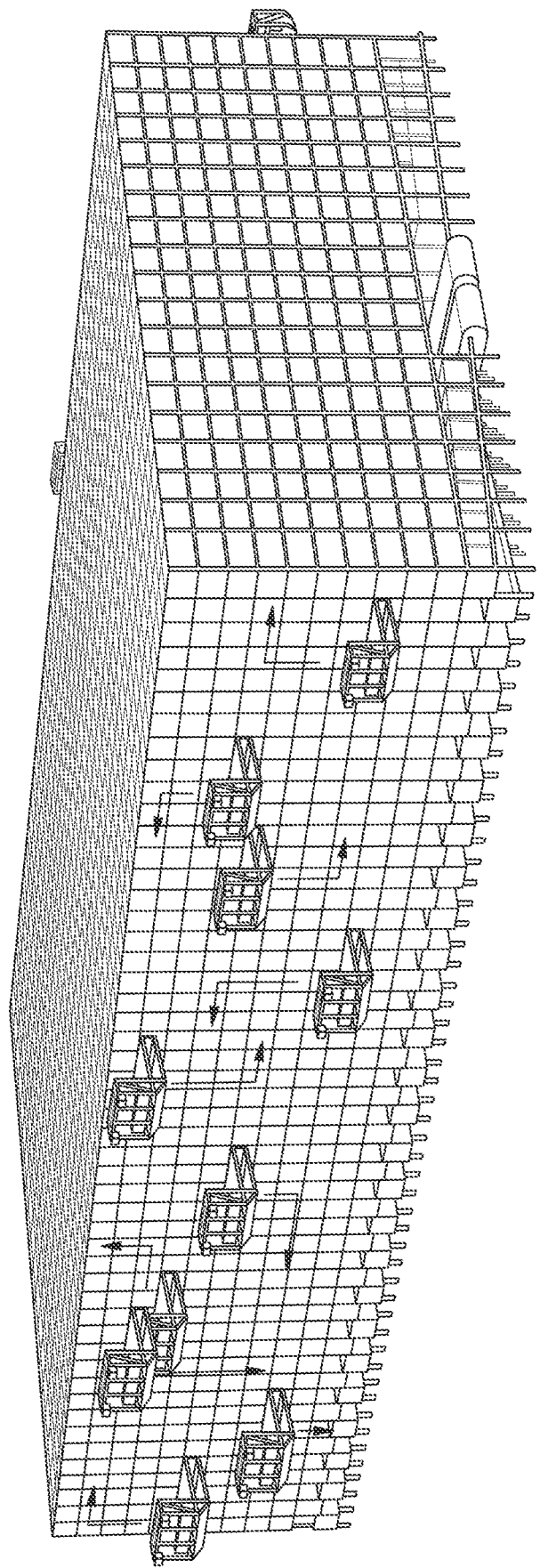

In a second embodiment of the invention, the totes may be decoupled either by an active or passive mechanism. FIG. 5(A-D) show an example of an active decoupling mechanism in which an eccentric roller is provided to lift tote 100, and thereby lift hook 400 out of hook receptacle 402. Note that when eccentric roller 500 is on the tote 100 having the hook 400, as shown in FIG. 5(B), tote 100 must be raised to decouple the totes, while if eccentric roller 500 is on the tote 100 having the hook receptacle 402, as shown in FIG. 5(D), tote 100 must be lowered to decouple the totes. FIG. 5(C) shows eccentric roller 500 in neutral position to allow for passive coupling of the totes. Other decoupling mechanisms are contemplated to be within the scope of the invention.

Figure 6A:
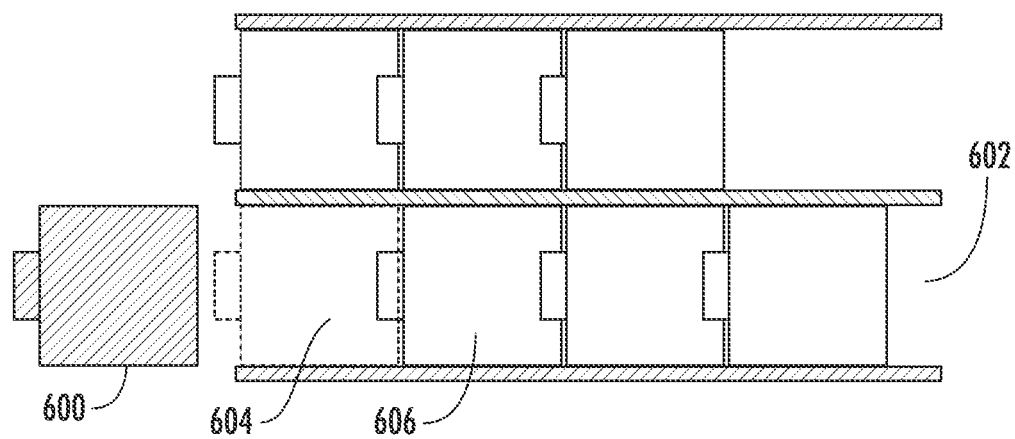
FIG. 6 shows totes being coupled by longitudinal motion by being pushed onto a row.
Figure 6B:
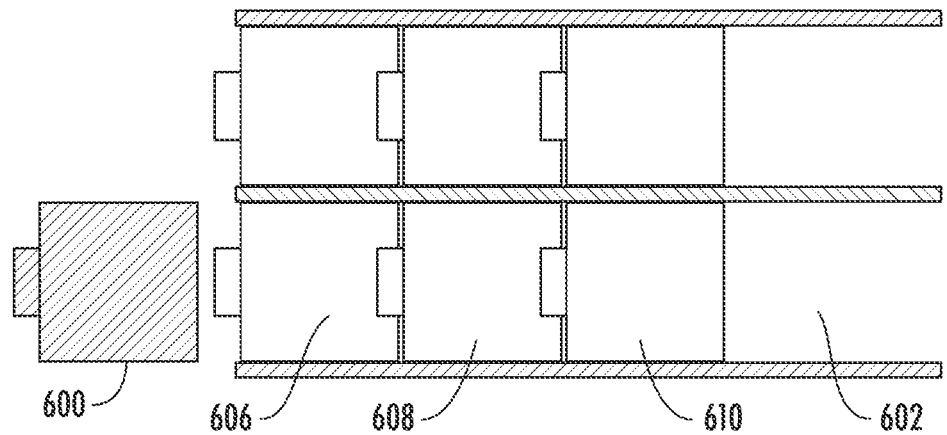
Figure 6C:
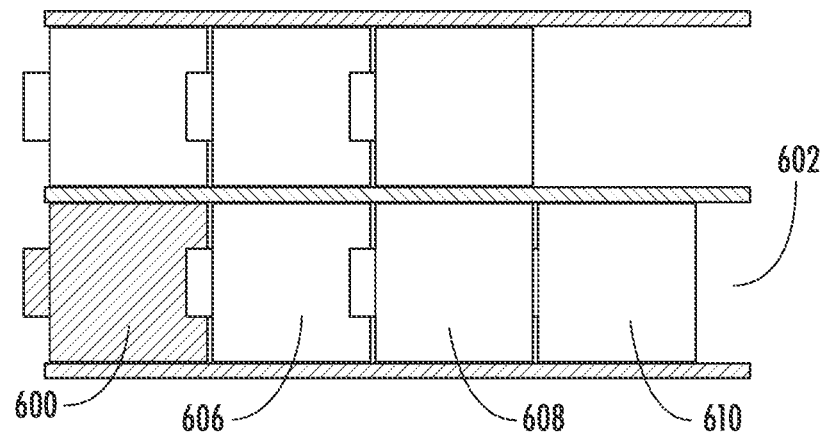

FIG. 6 shows how totes are coupled as they are inserted into rows of the storage structure. FIG. 6(A) shows the situation wherein a gap 604 is present at the end of the row into which tote 600 is being pushed. When tote 600 is pushed into row 602, it will couple with tote 606, filling empty spot 604, however, none of the totes 606, 608, 610, in row 602 will be pushed in the longitudinal direction. FIG. 6(B) shows the situation wherein tote 606 is present at the end of row 602. In this case, when tote 600 is pushed into row 602, it will immediately couple with tote 606 and will cause totes 606, 608, 610 to be pushed into row 602 as tote 606 is pushed into row 602. In both cases, the end result is shown in FIG. 6(C) in which totes 600, 606, 608, 610 are present in row 602. Thereafter, as shown in FIG. 6(C), if tote 600 is pulled, it would also pull on totes 606, 608 and 610 that are coupled to it in row 602. Likewise, pushing on the tote 600 would move the entire row of connected totes in the opposite longitudinal direction.

As the totes are coupled at the end of the row, and then inserted into a particular row, the coupled totes could fill in a gap within that row. If the tote farthest into the row crosses this gap and encounters another tote that is already in the row, the pushing motion by the carrier will cause them to couple and they will now move as a coupled unit.

Figure 7A:
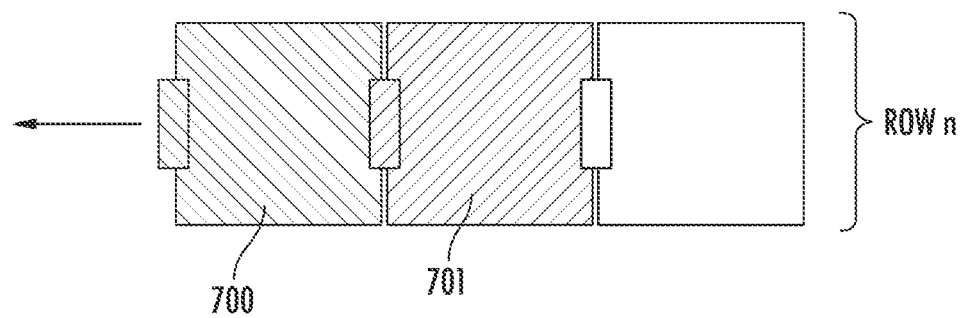
FIG. 7 shows totes being decoupled by moving in a direction perpendicular to the row and re-coupled to an adjacent row based on the perpendicular motion.
Figure 7B:
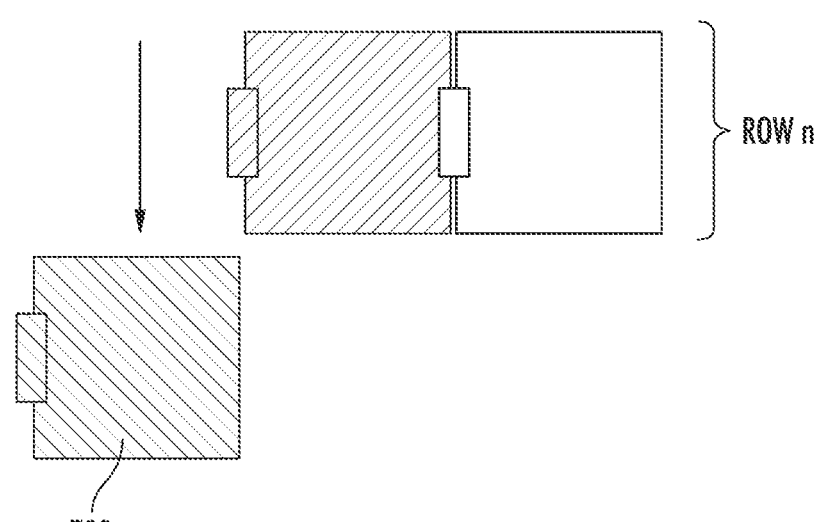
Figure 7C:
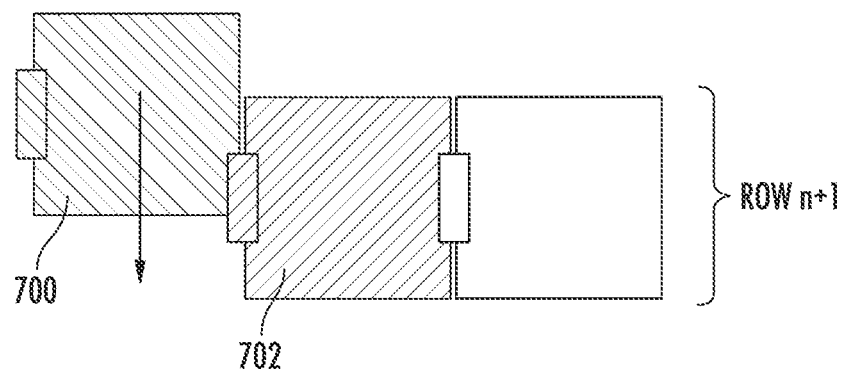

FIG. 7 shows the motion required for passive decoupling of the totes. FIG. 7(A) shows tote 700 currently at the end of row n. Row n is pulled in the direction of the arrow by a carrier (not shown) to bring tote 700 onto the carrier. FIG. 7(B) shows the shifting of tote 700 in a direction perpendicular to the row by the carrier, which causes a passive decoupling of tote 700 from tote 701 in row n. As shown in FIG. 7(C), Tote 700 is immediately passively coupled, as a result of the perpendicular motion, to adjacent tote 702 in row n+1. In alternate embodiments, if, for example, tote 702 were not at the end of row n+1, tote 700 could simply be pushed into row n+1 and would couple with the first tote at the end of the row by virtue of its longitudinal motion within the row. In yet another embodiment, after tote 700 has been decoupled from row n as shown in FIG. 7(B), it may be removed by a carrier to an exit point of the system.

Figure 8A:
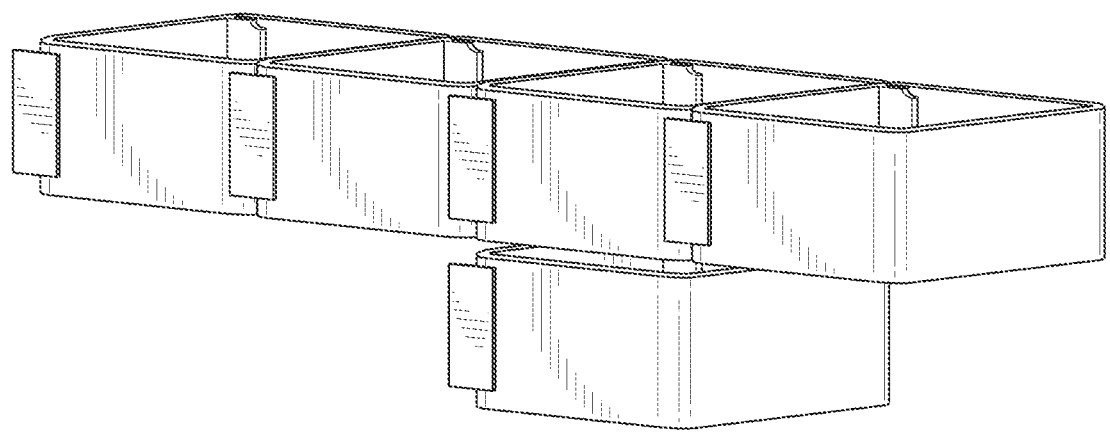
FIG. 8 shows a tote coupling/decoupling in a vertical perpendicular direction.
Figure 8B:
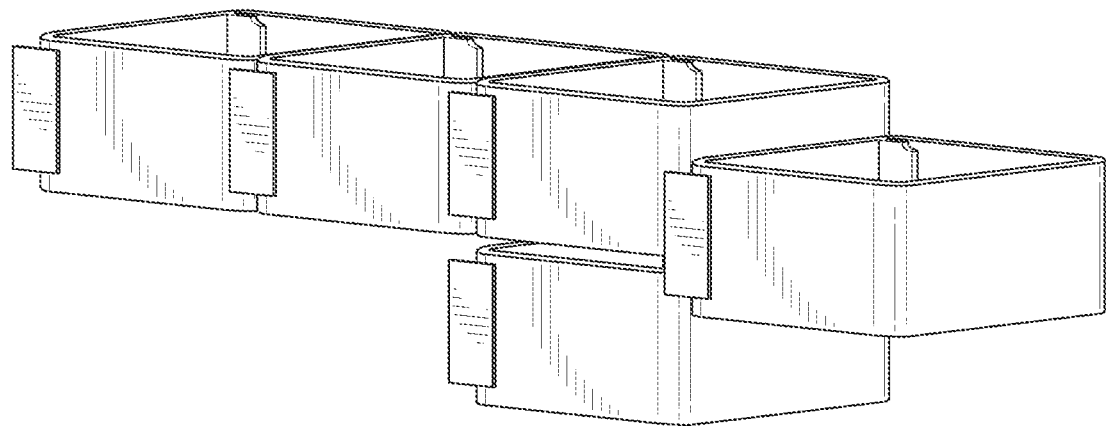
Figure 8C:
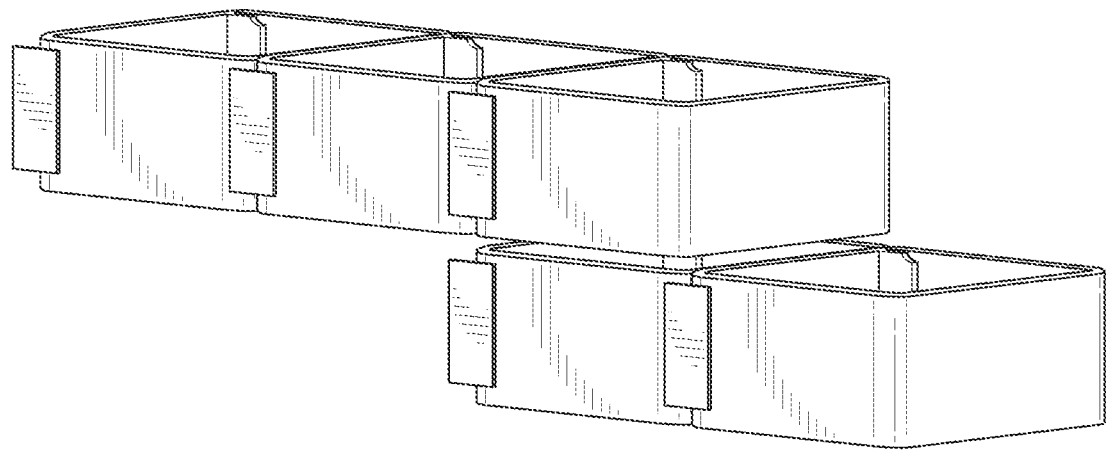
Figure 9:
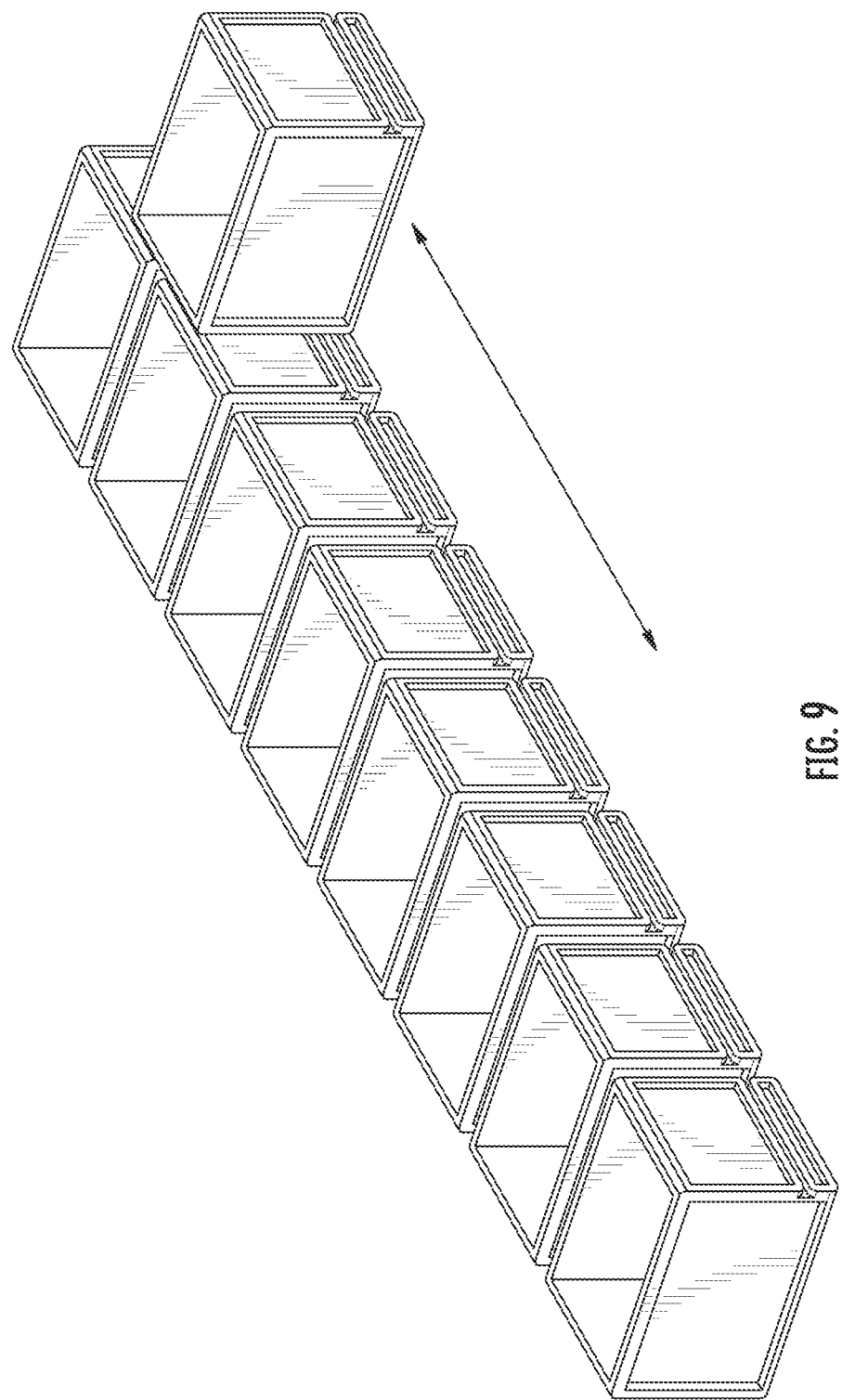
FIG. 9 shows a tote being coupled/decoupled in a horizontal perpendicular direction.

Totes can be coupled such that they can be decoupled in any direction other than longitudinal axis of the row (e.g., vertically, horizontally, diagonally). FIG. 8 shows a distinct embodiment where totes can be decoupled/coupled in a vertical perpendicular direction, while FIG. 9 shows an alternative embodiment wherein totes can be decoupled/coupled in a horizontal perpendicular direction. Totes could also be decoupled by disabling the coupling mechanism using an electromechanical actuator.

Figure 10A:
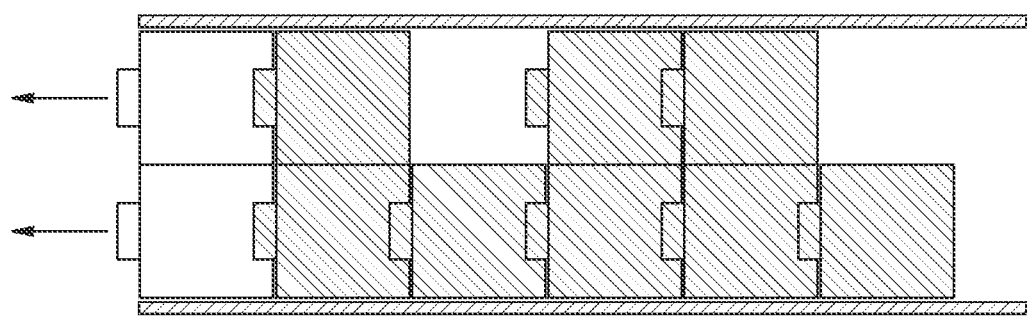
FIG. 10 shows the coupling and decoupling of tote stacks stored within a row.
Figure 10B:
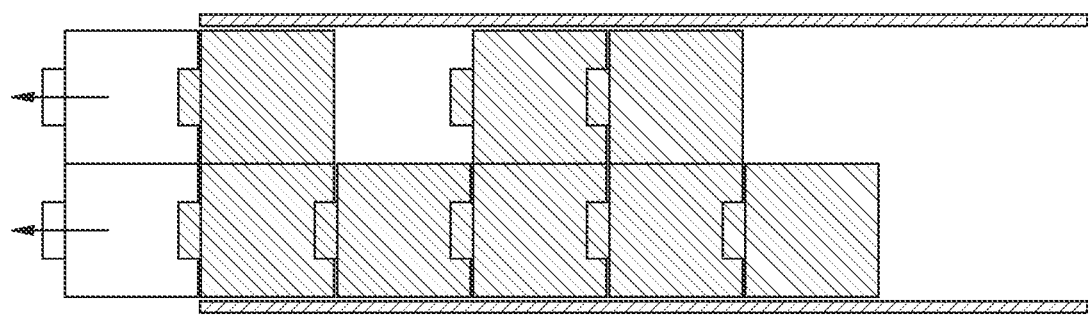
Figure 10C:
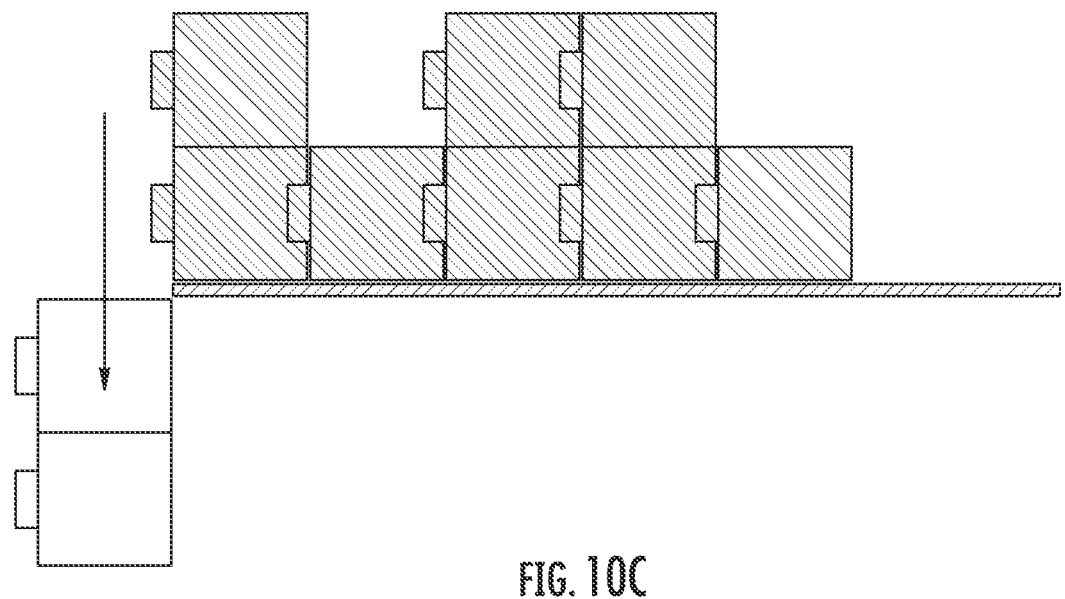

The novel technology for tote connections are not limited to a single tote in a row. The concept can be extended to embodiments wherein multiple totes are stacked on top of each other within the row, shown in FIG. 10. The stacks, which can be comprised of at least one tote height or width, retain the ability to be coupled in the direction of the row. As one or more of the totes on the end stack are pulled, all tote stacks in the row move as well. As the totes are moved along the perpendicular direction and are clear of all totes in the previous row, they are decoupled.

Storage Structure Configurations

A second aspect of the invention involves the storage structure in which the totes are stored. The present invention provides two basic configurations for the storage structure.

Figure 12:
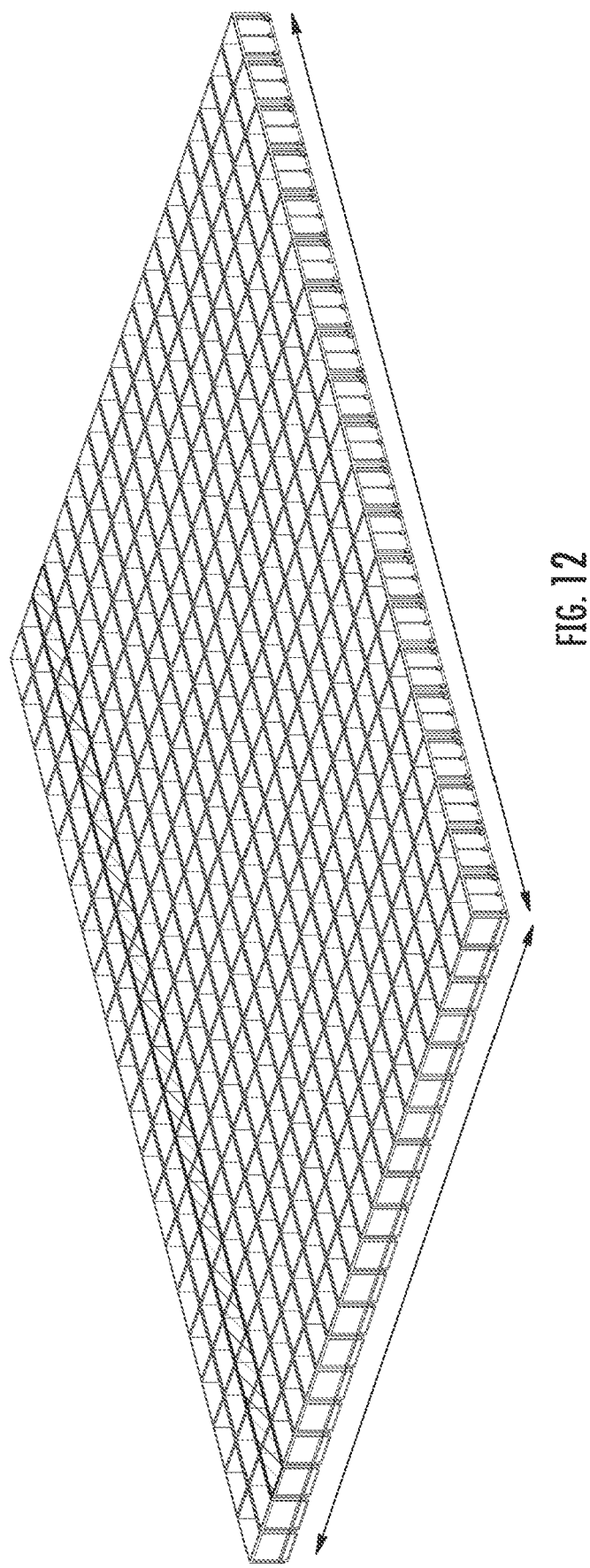
FIG. 12 shows a single layer of the first embodiment of the storage structure shown in FIG. 11.

In a first, preferred, embodiment of the invention, referred to herein as the "single-layer bot" embodiment, a layered storage structure concept, shown in FIG. 11 is used. In this configuration, the storage structure comprises multiple layers, as shown in FIG. 12, of connected totes. Note that while FIG. 12 shows a single layer as being completely full of totes, it is possible that, in operation, a single gap of any size may be found within any row of totes. In this embodiment of the invention, a carrier support structure is utilized at one end or both ends of each row to support one or more robotic carriers capable of manipulating a row of totes to store and retrieve a target tote.

Figure 13:
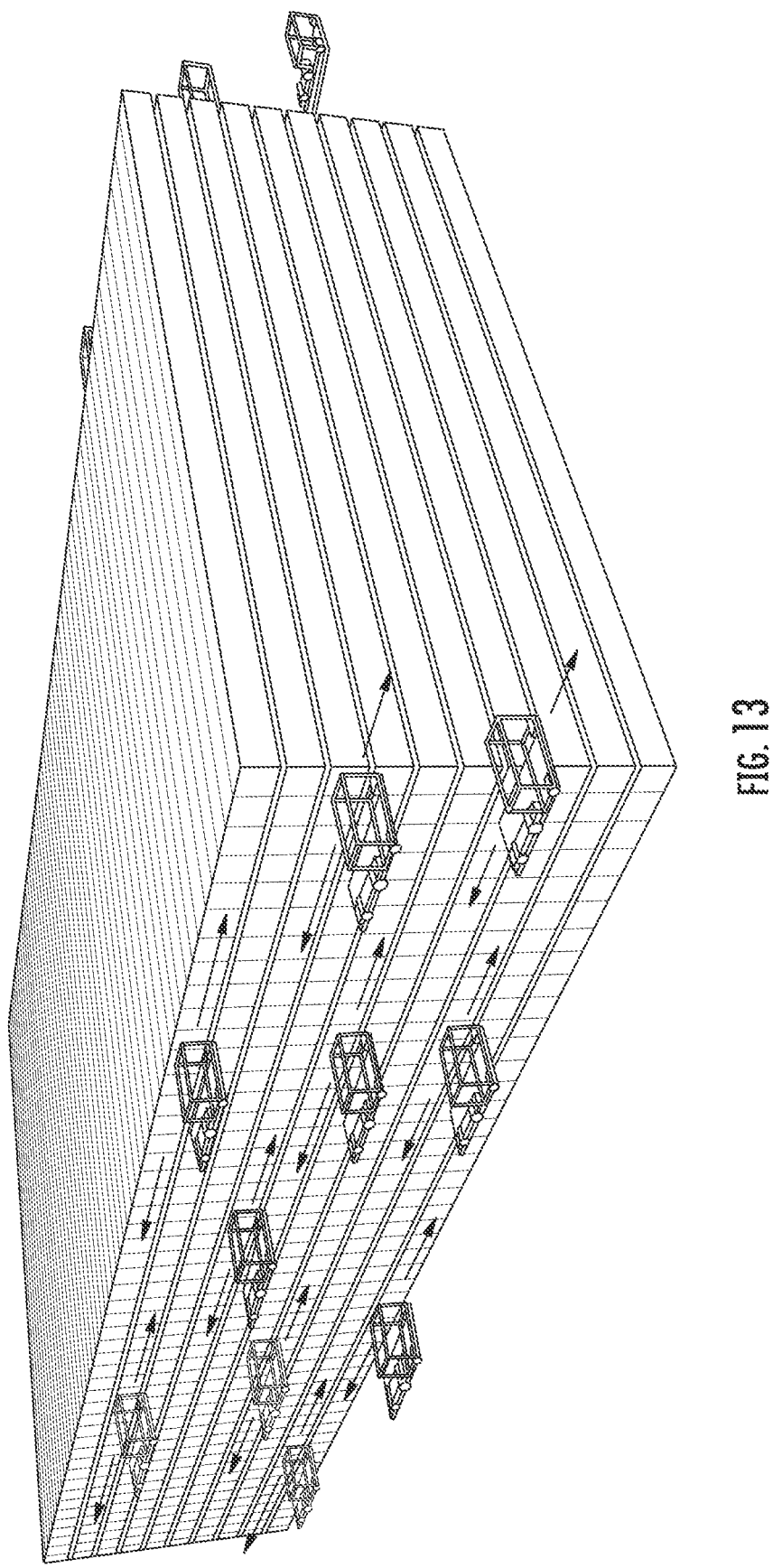
FIG. 13 shows the positioning of carriers on the exterior of the storage structure of FIG. 11.

In the single-layer bot embodiment, the carriers are restricted to moving only within layer of the support structure which they service (their "home" layer), as shown in FIG. 13 (although, in a variation of this embodiment, the single-layer bots may be moved between layers by a conveyer). Theoretically, the single-layer bot embodiment may operate with one bot per layer on one side of the storage structure, or one pair of robots per layer, with one bot of each pair disposed in the same layer on opposite sides of the storage structure, such as to be able to insert and remove totes from opposite sides of the structure. More realistically, multiple robots per layer may be provided for more efficient operation. In this configuration, the robots may only move within their home layer. Note that, while FIGS. 11 and 13 show the layers stacked horizontally, it is contemplated that the layers may also be stacked vertically. But at the minimum, only a single robotic carrier is needed to pull on the outer tote or totes to access any tote within a row.

Because the carriers are restricted to movement only within their home layer, the single-layer bot embodiment of the storage structure also requires a vertical input/output conveyer located at one or both ends of the structure, which allows movement of the totes from the layer from which they were retrieved down to the input/output conveyer, and to raise incoming totes from the input/output conveyer to the level the layer where they will be stored. The input/output conveyer is discussed in more detail below.

Figure 14:
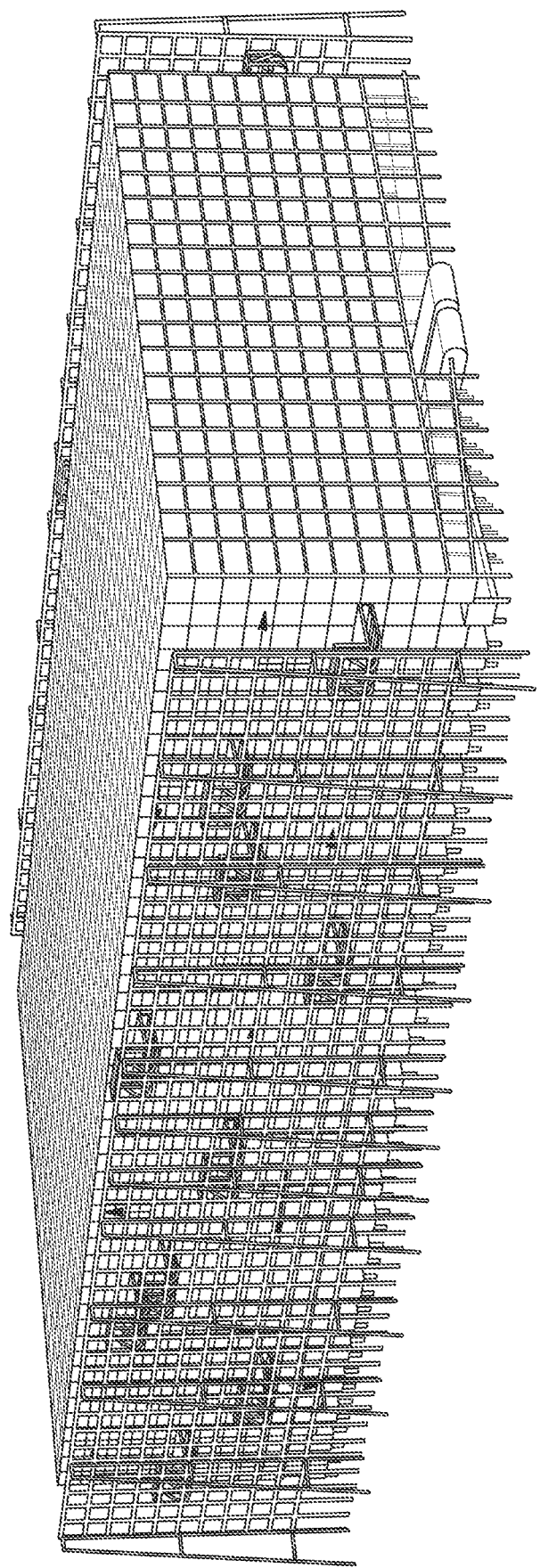
FIG. 14 shows a second embodiment of a storage structure for totes.

A second embodiment of the storage structure is shown in FIG. 14 and is referred to herein as a "multi-layer bot" embodiment. In this embodiment, the carriers are able to move both vertically and horizontally, as shown in FIG. 15. Multi-layer bot carriers can therefore retrieve totes from any row in any layer or from the input/output system and deliver the totes to any row in any layer, or to the input/output system.

Figure 16:
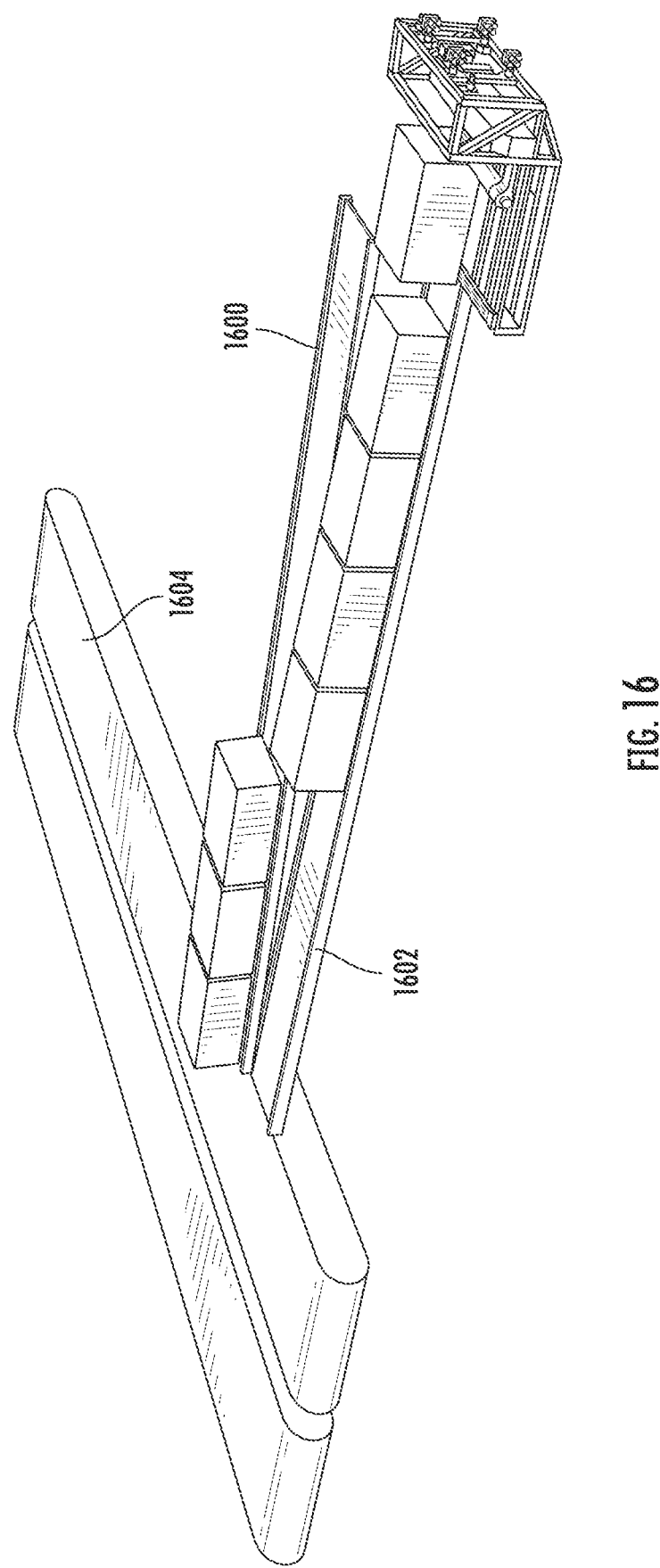
FIG. 16 shows an input/output mechanism for use with the storage structure of FIG. 14.

In this embodiment, the input/output system may consist of a pair of conveyers running longitudinally through the middle of the support structure as shown in both FIGS. 14 and 15. Other configurations of the input/output system may also be used with this embodiment. Detail of the input/output system is shown in FIG. 16 and will be discussed in more detail below.

Carrier Configurations

The carrier configurations for use with the single-layer bot and multi-layer bot storage structures are described in this section.

Figure 17:
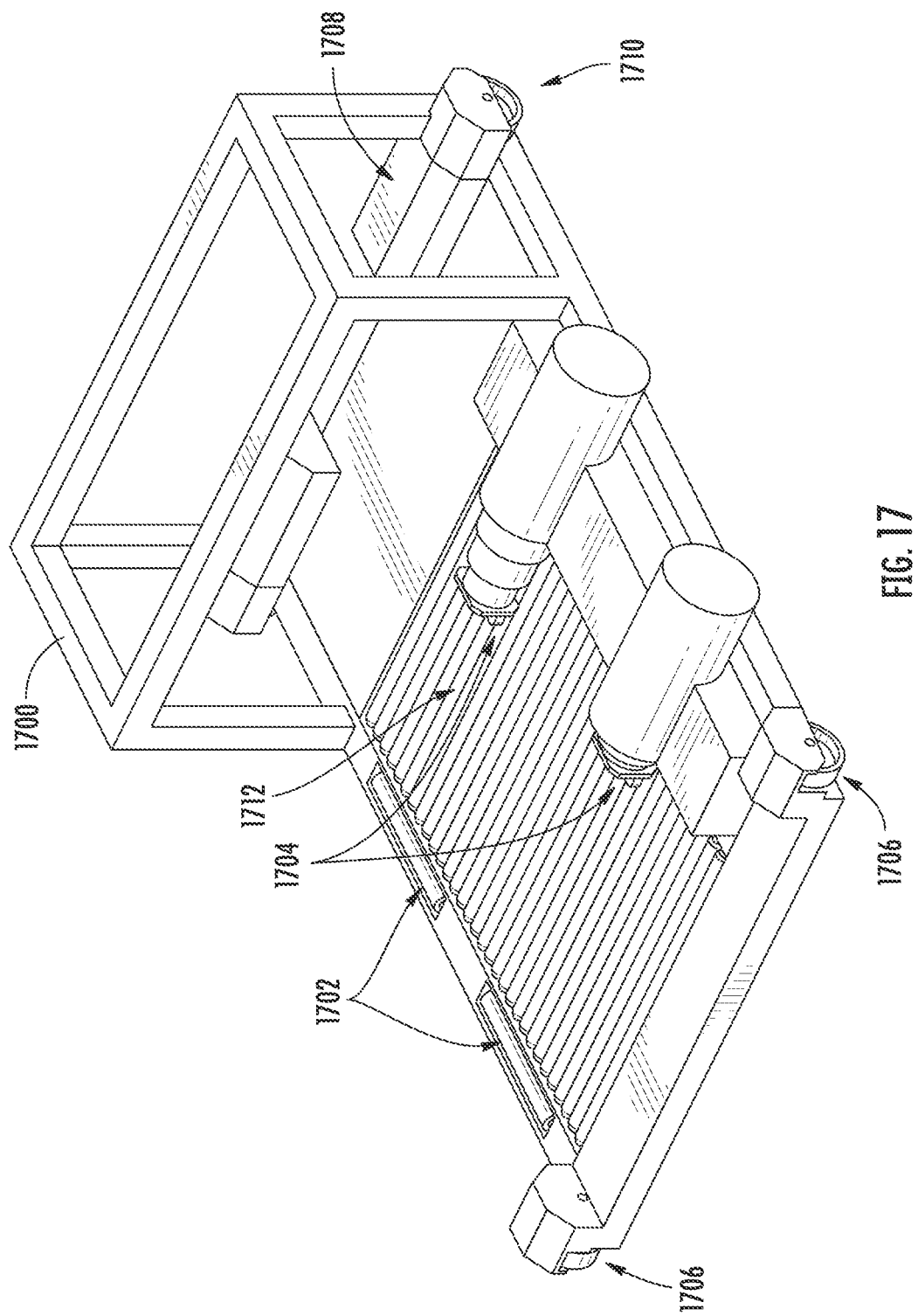
FIG. 17 shows one embodiment of a carrier for use with the storage structure of FIG. 11.

FIG. 17 shows a first embodiment of a carrier 1700 for use with the single-layer bot storage structure. Carrier 1700 is capable of moving back and forth in the longitudinal direction driven by drive wheels 1710 and supported by idler wheels 1706. The carrier shown in FIG. 17 is capable of servicing two rows of its home layer at a time. That is, a first tote can be pulled from a first row simultaneously with a second tote being pushed into a second row. Push/pull actuators 1704 are capable of pulling an entire roll of totes from the layered bot storage structure such that the first tote in the row rests in a first position on conveyer roller 1712. The tote may then be shifted to a second position using conveyer rollers 1712 where may be pushed into a second row by push/pull actuators 1704.

Note that, in this embodiment, the movement of the tote from the first to the second position via conveyer rollers 1712 on carrier 1700 enables the passive decoupling of the tote from the row from which it was retrieved. As the tote is then pushed into its destination row, the tote is passively coupled to the first tote in the destination row if there is a tote at the end of the row. If there is a gap in the destination row, totes may continue to be pushed into the destination row until the gap is closed and all totes in the destination row have been passively coupled via their longitudinal motion causing contact of the coupling mechanisms of the totes.

In a second embodiment, carrier 1700 may also be configured with de-latch rollers 1702, as described above with respect to FIG. 5, to decouple the tote from its row.

Note that, while FIG. 17 shows carrier 1700 capable of handling two totes simultaneously, the invention is not meant to be limited thereby. Carriers may be configured with any number of places for accepting totes, including embodiments having a single place, in which case the carrier must move to place the tote in its destination row. Theoretically, carrier 1700 could be configured with a number of places equal to the number of rows in its home layer. In such embodiments, drive wheels 1710 and idler wheels 1706 would become superfluous as the carrier would not move within its home layer.

Figure 18:
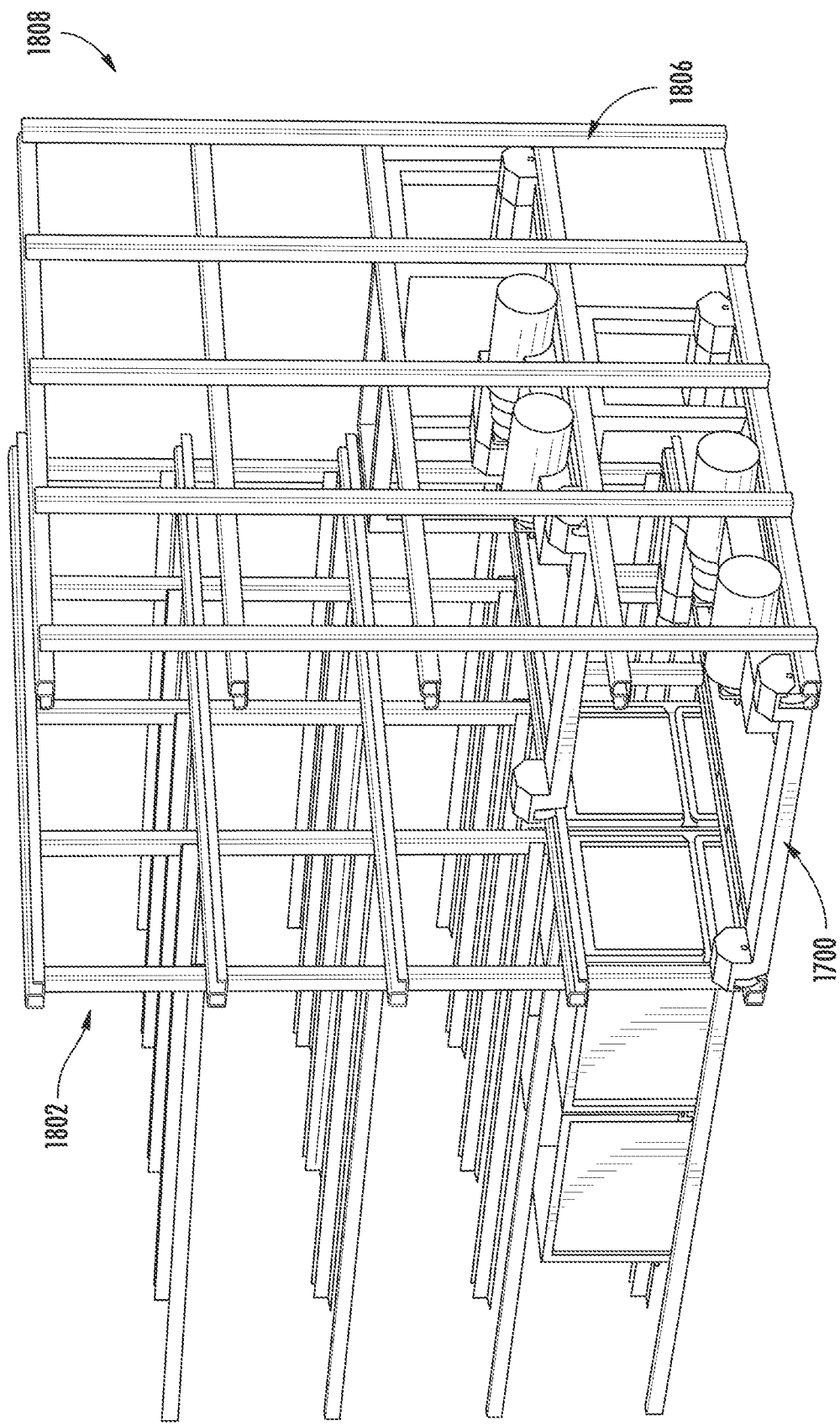
FIG. 18 shows a support structure for supporting the carriers shown in FIG. 17 for use with the storage structure FIG. 11.

FIG. 18 shows the interaction of carrier 1700 with the single-layer bot version of the storage structure 1802 and the outboard frame structure 1806. Carrier support structure 1806 includes tracks 1808 along which carrier 1700 will roll or slide to access the rows of its home layer. Note that, in this configuration, there are two outboard carrier support structures 1806, one positioned as shown on one end of the storage structure 1802 and a second one positioned on the opposite side of the storage structure 1802.

Figure 19:
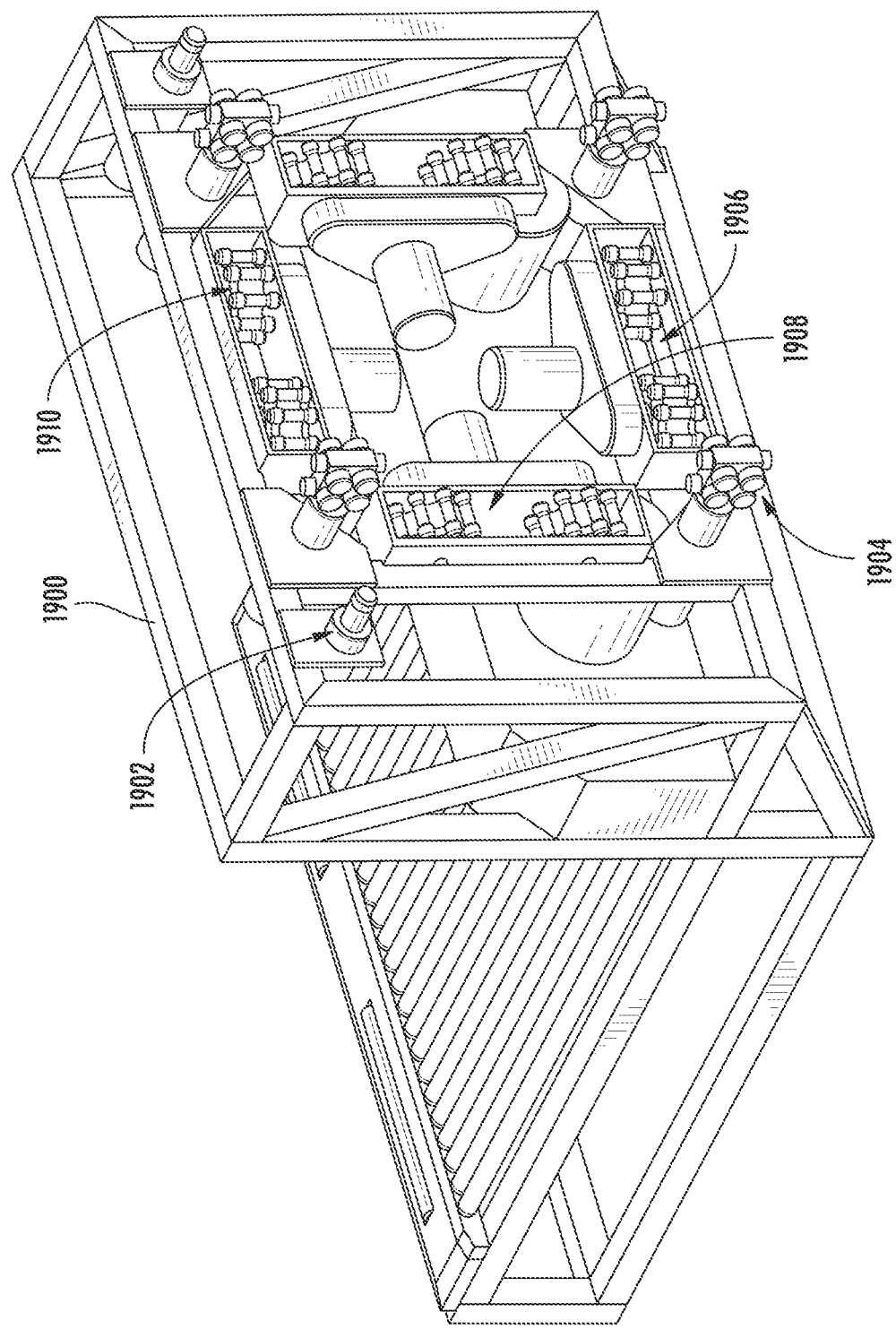
FIG. 19 shows one embodiment of the carrier for use with the storage structure of FIG. 14.

FIG. 19 shows a second embodiment of carrier 1900 for use with the multi-layer bot configuration of the storage structure. In this embodiment, the carrier 1900 can move both vertically and horizontally with the carrier support structure 2002 shown in FIG. 20. FIG. 19 shows the mechanism allowing the two-dimensional movement of carrier 1900 which includes roller pinion 1910 which will engage with racks disposed on the support frame structure. The roller pinions 1910 are driven by an X-axis or horizontal drive 1906 and Z-axis or vertical drive 1908. Carrier 1900 may also include steering assembly 1904 and retractable rollers 1902 for interaction with the carrier support structure 2002.

Figure 20:
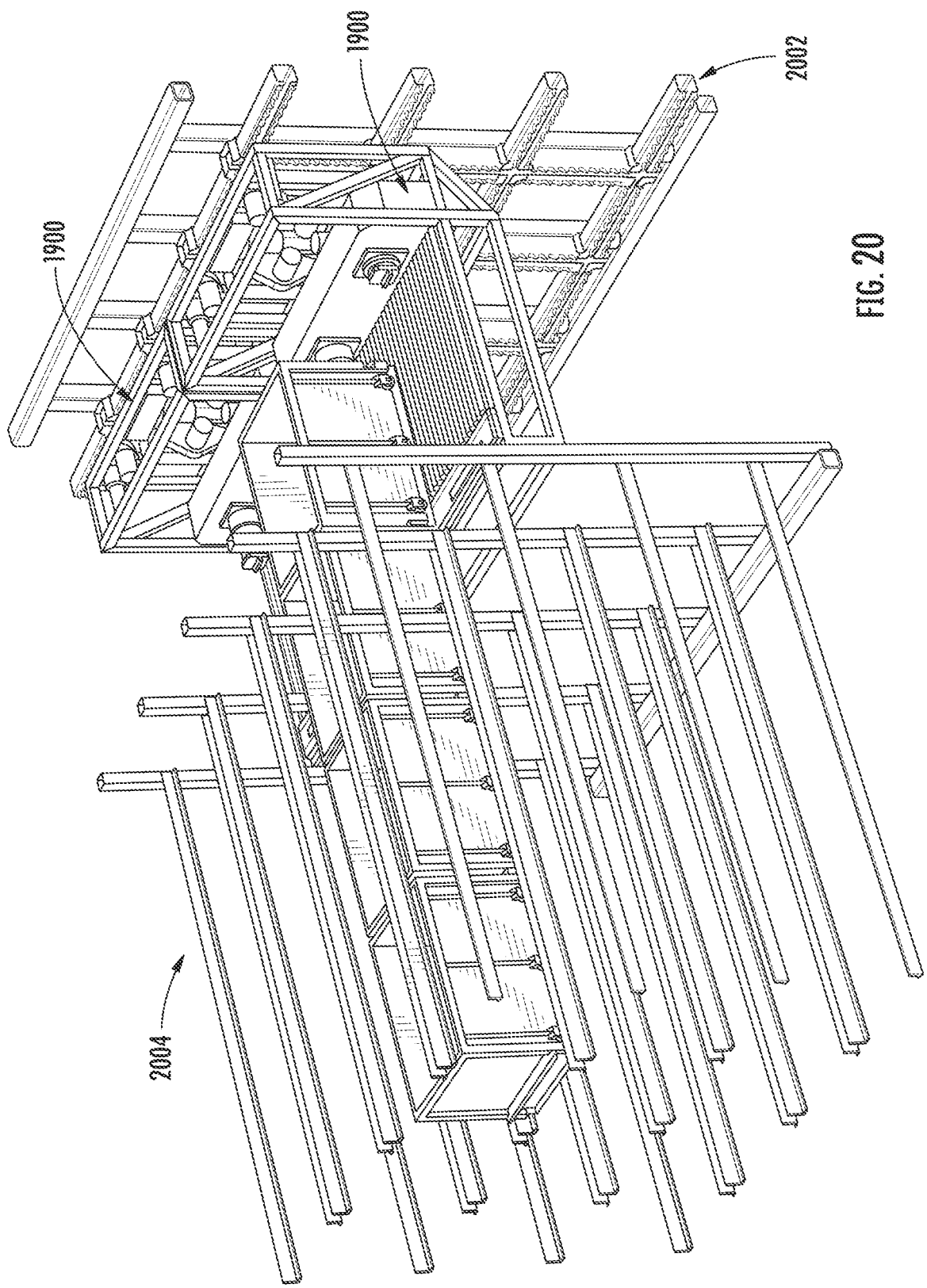
FIG. 20 shows a support structure for supporting the carrier shown in FIG. 19 for use with the storage structure of FIG. 14.
Figure 21:
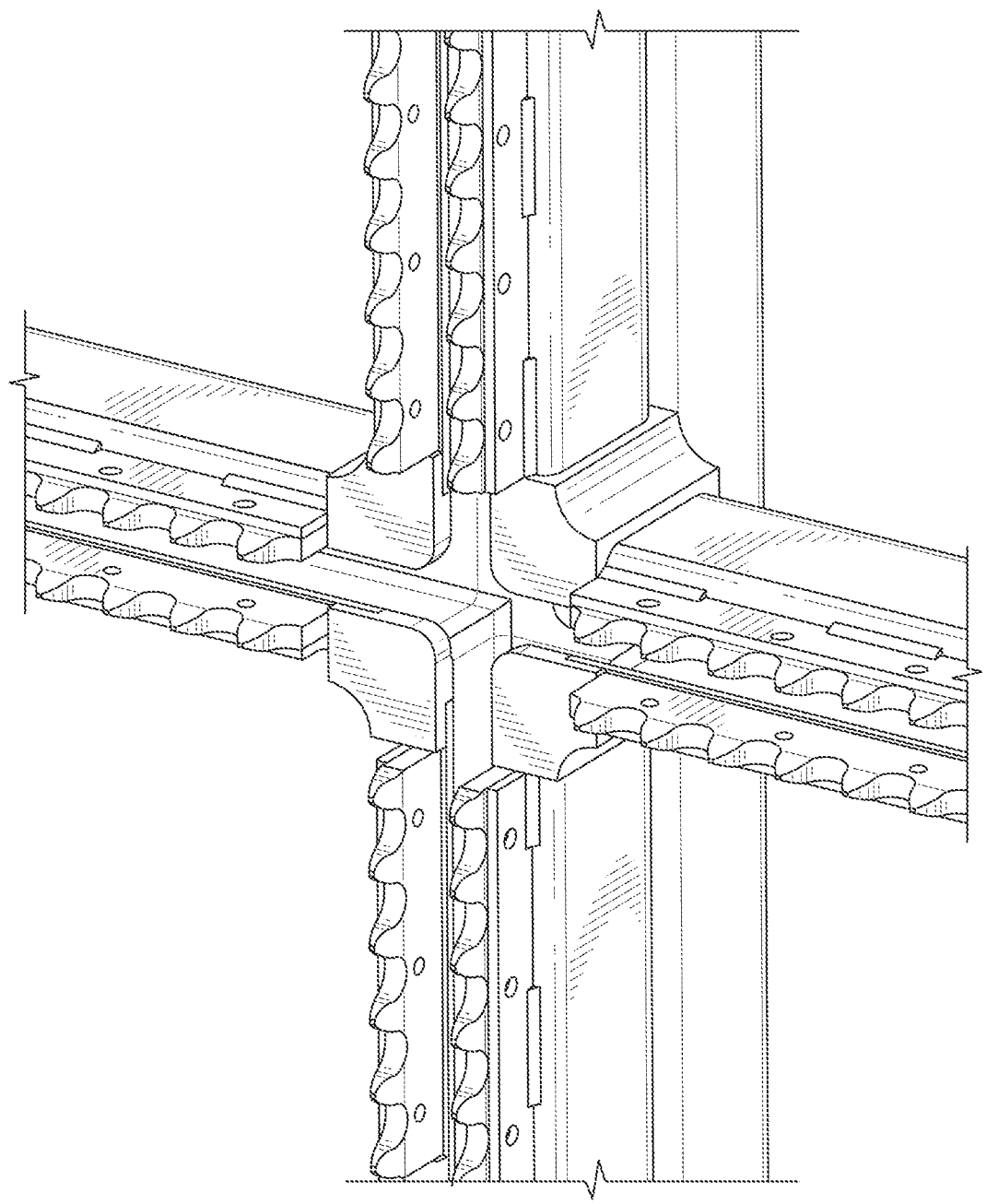
FIG. 21 is a detailed view of a portion of the support structure shown in FIG. 20.

FIG. 20 shows carrier 1900 in place on carrier support structure 2002 servicing storage structure 2004. FIG. 21 shows detail of the carrier support structure 2002 showing toothed racks (both vertical and horizontal) for accepting vertical and horizontal pinions 1910.

Figure 22:
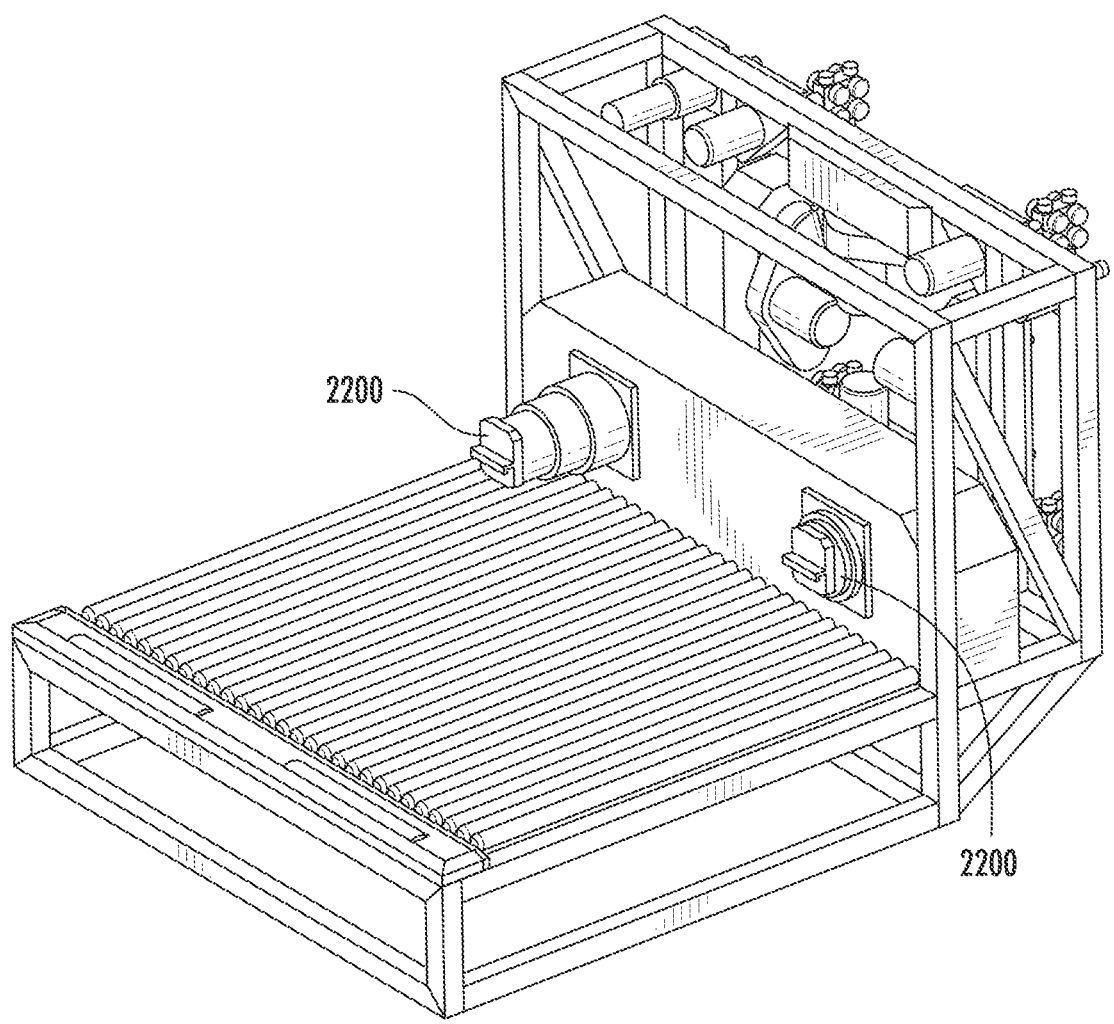
FIG. 22 shows a first embodiment of the push/pull mechanism for pushing and pulling rows of totes within the storage structures of FIG. 11 or FIG. 14.

FIG. 22 shows a first embodiment of a push/pull mechanism for pulling a row of connected totes from the storage structure such that the first tote in the row is positioned on the conveyer of the carrier, and for pushing a tote already on the carrier into a destination row. FIG. 22 shows the use of telescoping actuators 2200 for use as a push/pull mechanism. Telescoping actuators 2200 would be configured with a hook on one end capable of interacting with the coupling mechanism on the totes. Actuators 2200 could be any type of actuator, for example, pneumatic, hydraulic, electric, etc.

Figure 23A:
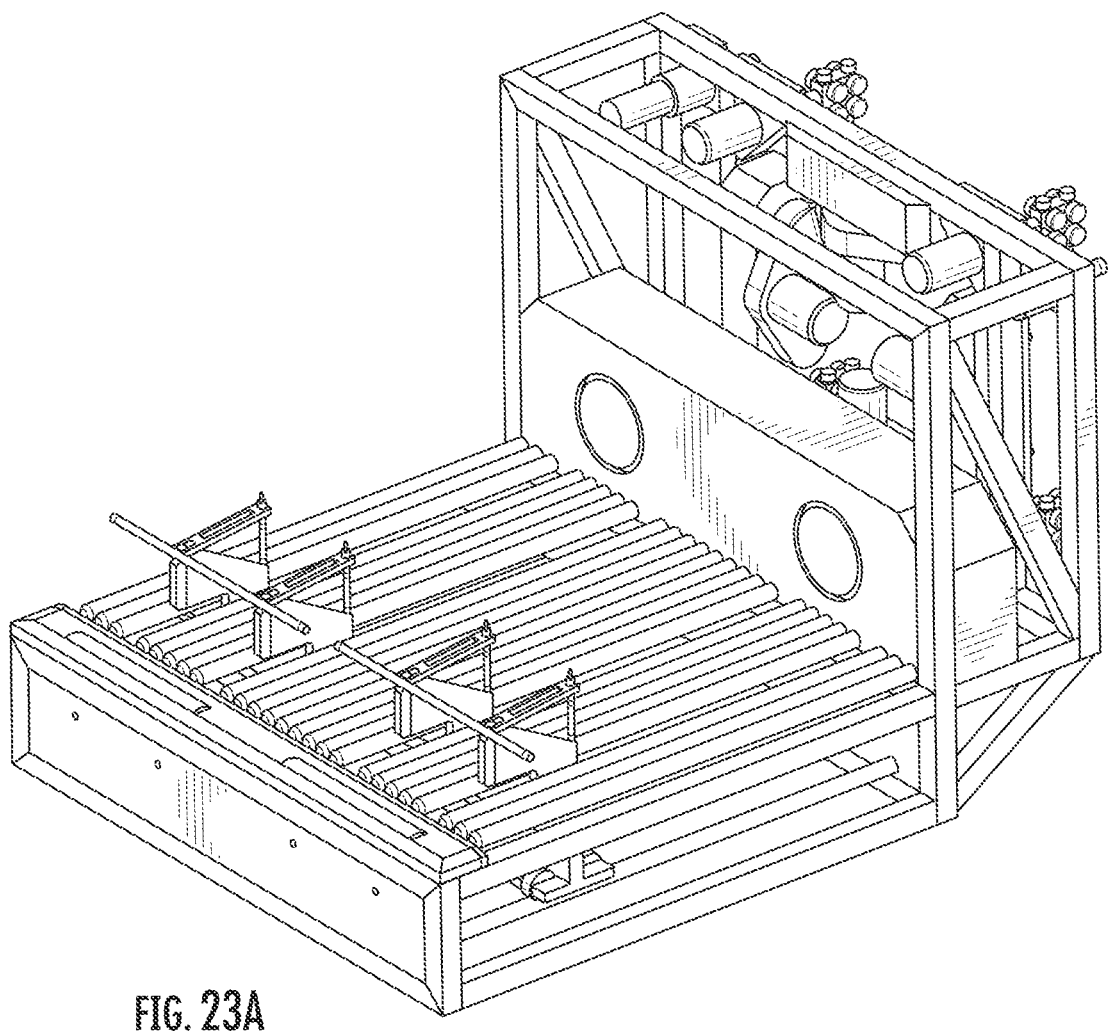
FIG. 23 shows a second embodiment of the push/pull mechanism for pushing and pulling rows of totes within the storage structures of FIG. 11 or FIG. 14.
Figure 23B:
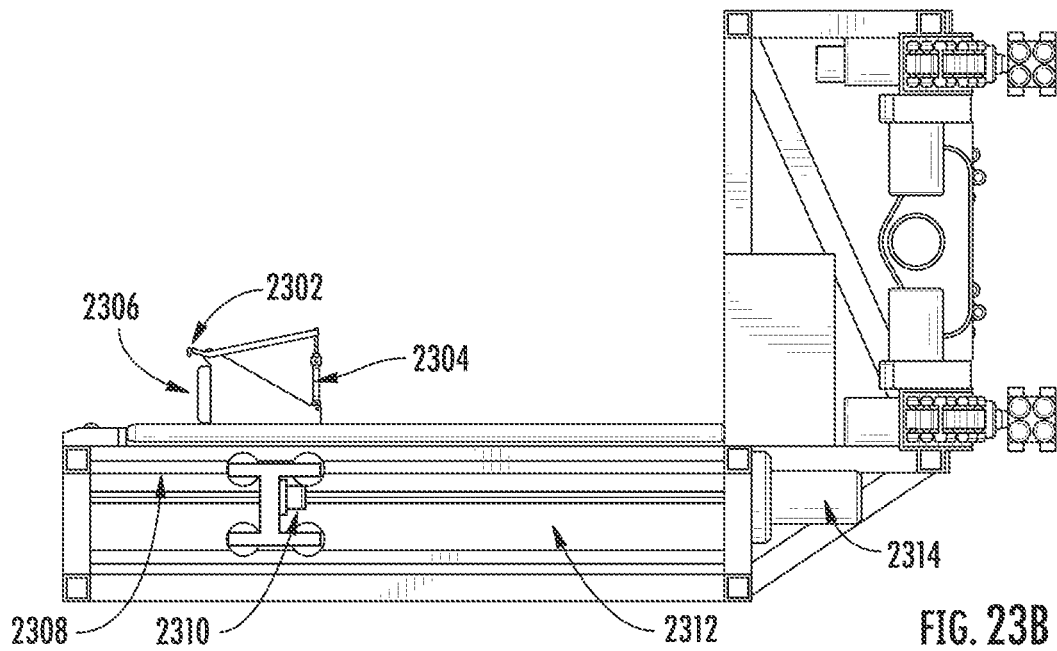
Figure 24A:
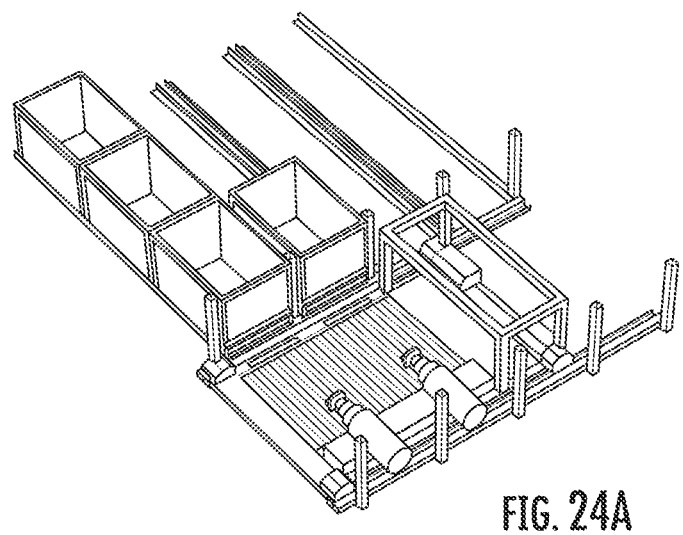
FIG. 24 shows the process of pushing and pulling totes to move totes from one row to another.
Figure 24B:
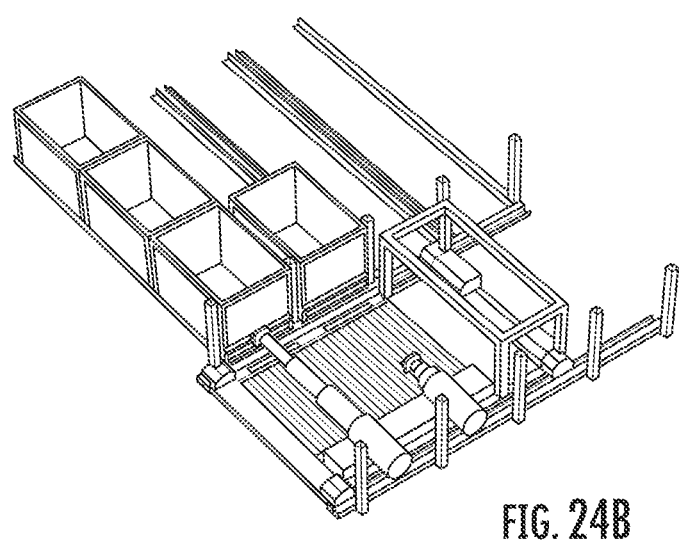
Figure 24C:
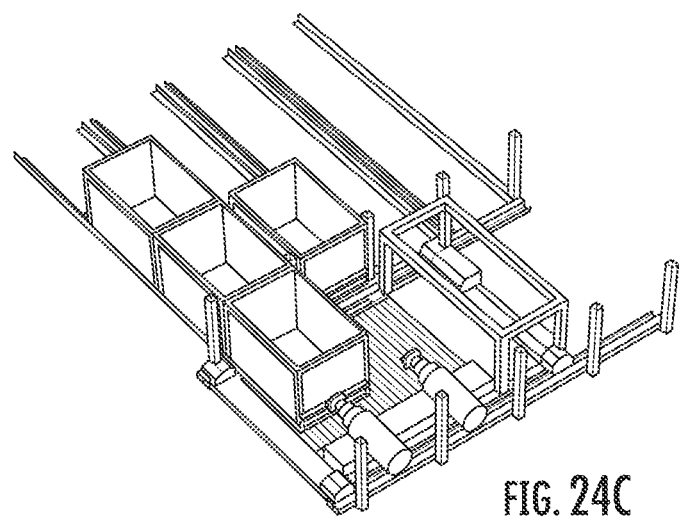
Figure 24D:
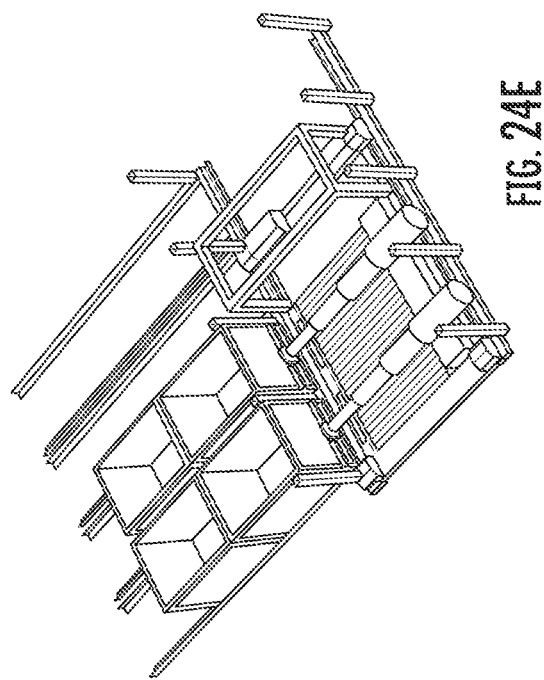
Figure 24E:
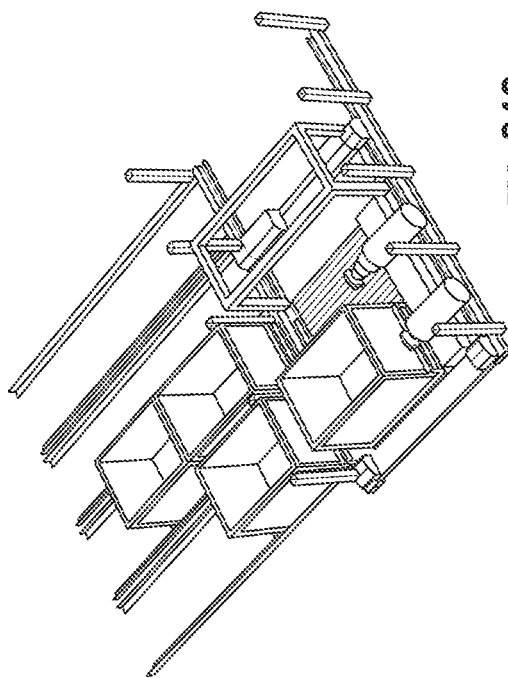
Figure 24F:
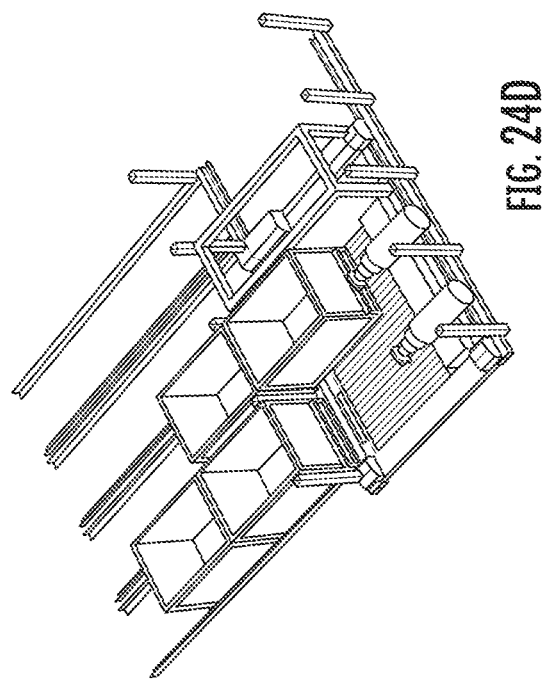
Figure 24G:
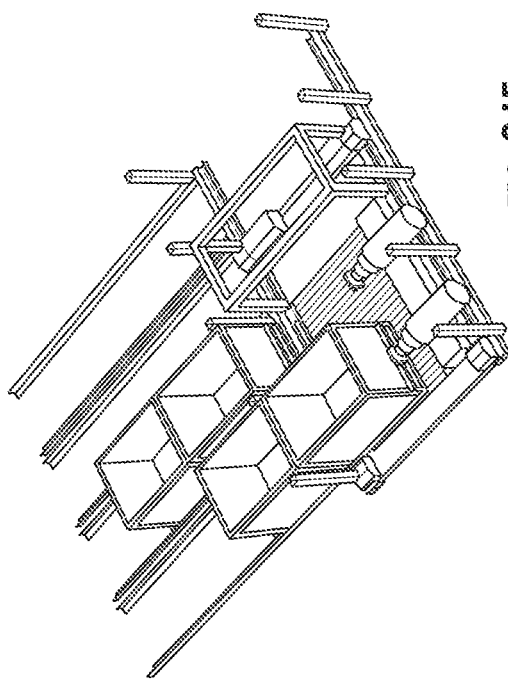

FIG. 23 shows a preferred embodiment of the push/pull mechanism, shown in perspective view in FIG. 23(A) and a side view in FIG. 23(B). To pull on a tote, linear actuator 2314 pushes pull bar platform 2310 towards the tote with the pull bar 2302 raised. Pull bar 2302 is brought into position and is dropped into place by latch actuator 2304. The linear actuator 2314 then reverses and pulls the tote onto the carrier while latch actuator 2304 holds the pull bar 2302 down in the locked position. Aligning multiple pull bars allows a tote to be shifted along the carrier. To insert the tote into a different row, linear actuator 2314 is actuated to push against the tote with push bumper 2306 with the pull bar 2302 in the unlocked position.

Note that, although the push/pull mechanisms shown in FIGS. 22 and 23 are shown in use with the multi-layer bot version of the carrier, either configuration may be used with the single-layer bot version of the carrier shown in FIG. 17 as well. Also, it should be noted that, in alternate embodiments, carriers may be fitted with only a push capability or only a pull capability.

FIG. 24 shows the carrier actuation motion. In FIG. 24(A), the actuators are retracted upon arrival at the designated rows within the storage structure. FIG. 24(B) shows the extension of actuator A grabbing the tote at the end of the row. FIG. 24(C) shows the retraction of actuator A, which pulls the tote onto the carrier (and moves all the connected totes in the row towards the carrier). FIG. 24(D) shows the conveyer shifting the tote to the adjacent row. Note that the perpendicular movement of the tote with respect to its row passively decouples it from its row and may automatically couple it to the next row. Alternatively, the tote may be automatically coupled to the next row when pushed onto the row by actuator B. FIG. 24(E) shows both actuators A & B extended. Actuator A grabs the next tote while actuator B pushes the previous tote into the adjacent row. FIG. 24(F) shows retraction of both actuators A & B, which pulls the next tote from onto the carrier. FIG. 24(G) shows a tote being decoupled from its row using the latch rollers 1712 shown in FIG. 17.

Input/Output Mechanisms

In addition to retrieval, storing and shuffling of totes, the system must be capable of outputting a tote from the system and intaking a tote to the system. In both embodiments of the storage structure this is accomplished via an input/output mechanism.

FIG. 11 shows the input/output mechanism for the single-layer bot configuration of the storage structure. Totes are delivered to and from the input/output mechanism via a conveyer. Note that, in certain embodiments of the invention the input/output mechanism may be located on both sides of the storage structure, while in other embodiments, the input/output mechanism may only be located on one side of the storage structure. In yet other embodiments, one or more input/output mechanisms may be located at any convenient location in proximity to the storage structure, including, for example, on the interior of the storage structure, underneath the storage structure or on top of the storage structure.

Figure 25:
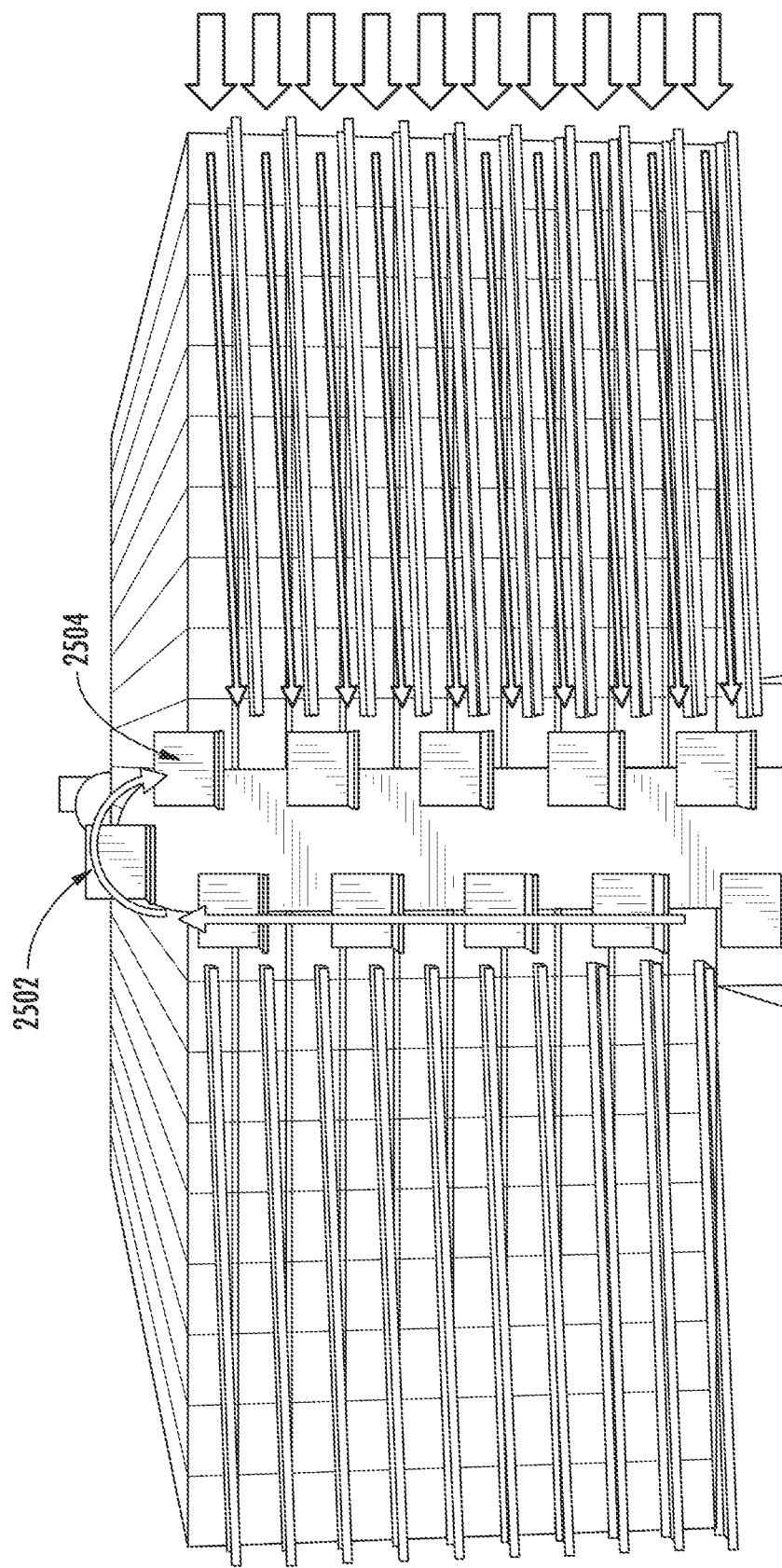
FIG. 25 shows the output portion of the input/output mechanism for use with the storage structure of FIG. 11.

FIG. 25 shows one possible embodiment of a process for outputting totes from the storage structure. In this embodiment, carriers 1700 convey a retrieved tote to the output buffer ramps 2504. The ramps are sloped such that the totes, once placed on the ends of the ramps nearest the carriers 1700 will roll or slide down the ramp 2502. A mechanism (not shown) may be provided to stop the downward motion of the tote until an open spot on vertical conveyer 2502 arrives at the bottom of the ramp, at which time the mechanism will allow the tote to continue its downward motion onto vertical conveyer 2502. Vertical conveyer 2502 rotates with a circular motion and, when the retrieved tote reaches the bottom of the vertical conveyer 2502, it is pushed onto the conveyer shown in FIG. 11.

Figure 26:
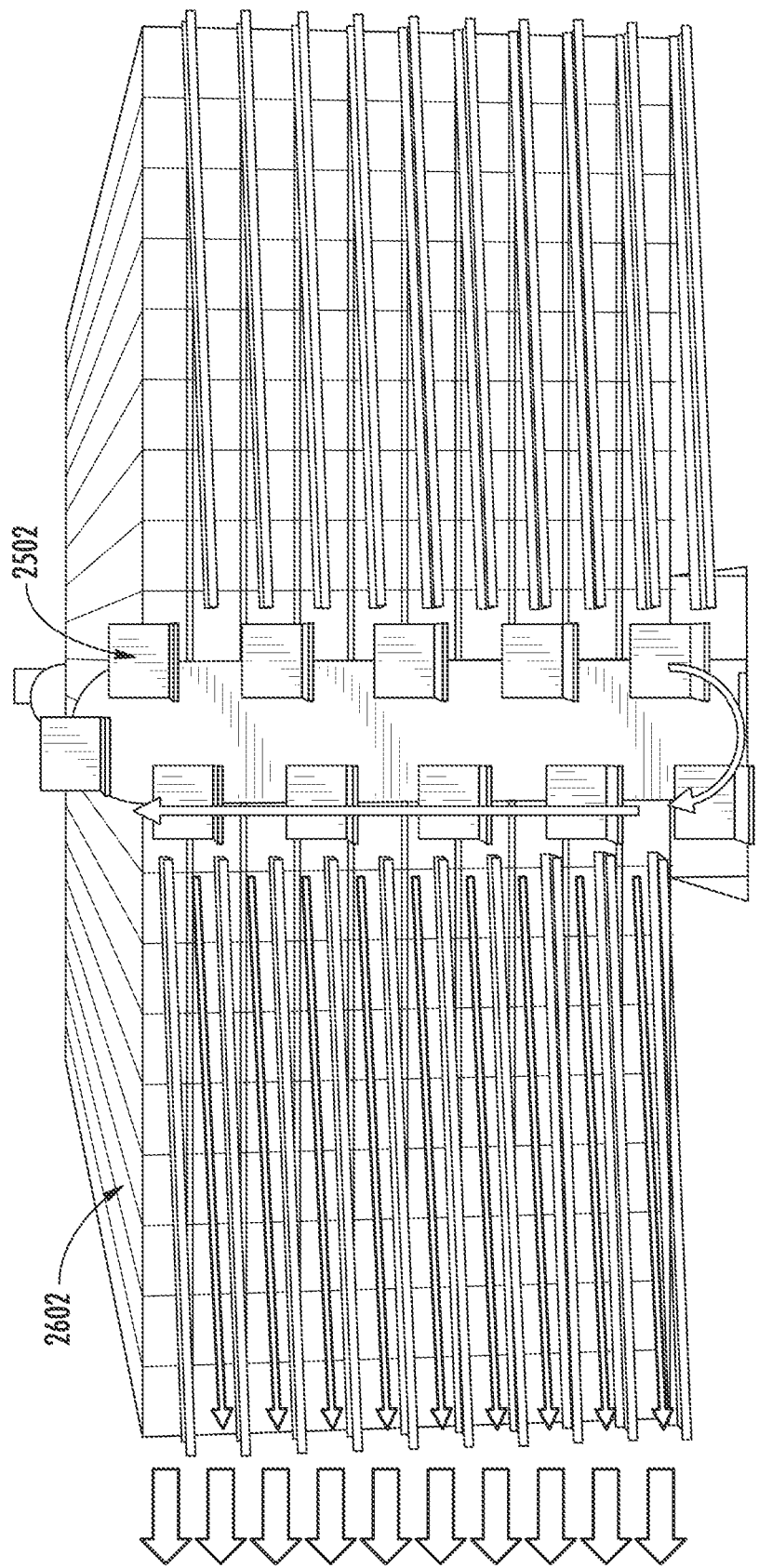
FIG. 26 shows the input portion of the input/output mechanism for use with the storage structure of FIG. 11.

FIG. 26 shows one possible embodiment of a process for inputting totes into the storage structure. In this embodiment, totes arrive at the bottom of vertical conveyer 2502 via the horizontal conveyer shown in FIG. 11. When a spot is available on vertical conveyer 2502, the tote is pushed onto the conveyer and raised to a level slightly higher than the level of its destination layer. The tote is then pushed onto an input buffer ramp 2602 and rolls or slides passively down the ramp. A mechanism (not shown) may be provided to stop the downward motion of the tote until carrier 1700 arrives at the bottom of the ramp, at which time the mechanism will allow the tote to continue its downward motion onto carrier 1700. Carrier 1700 then proceeds to place the tote in the appropriate row within its home layer.

Figure 27:
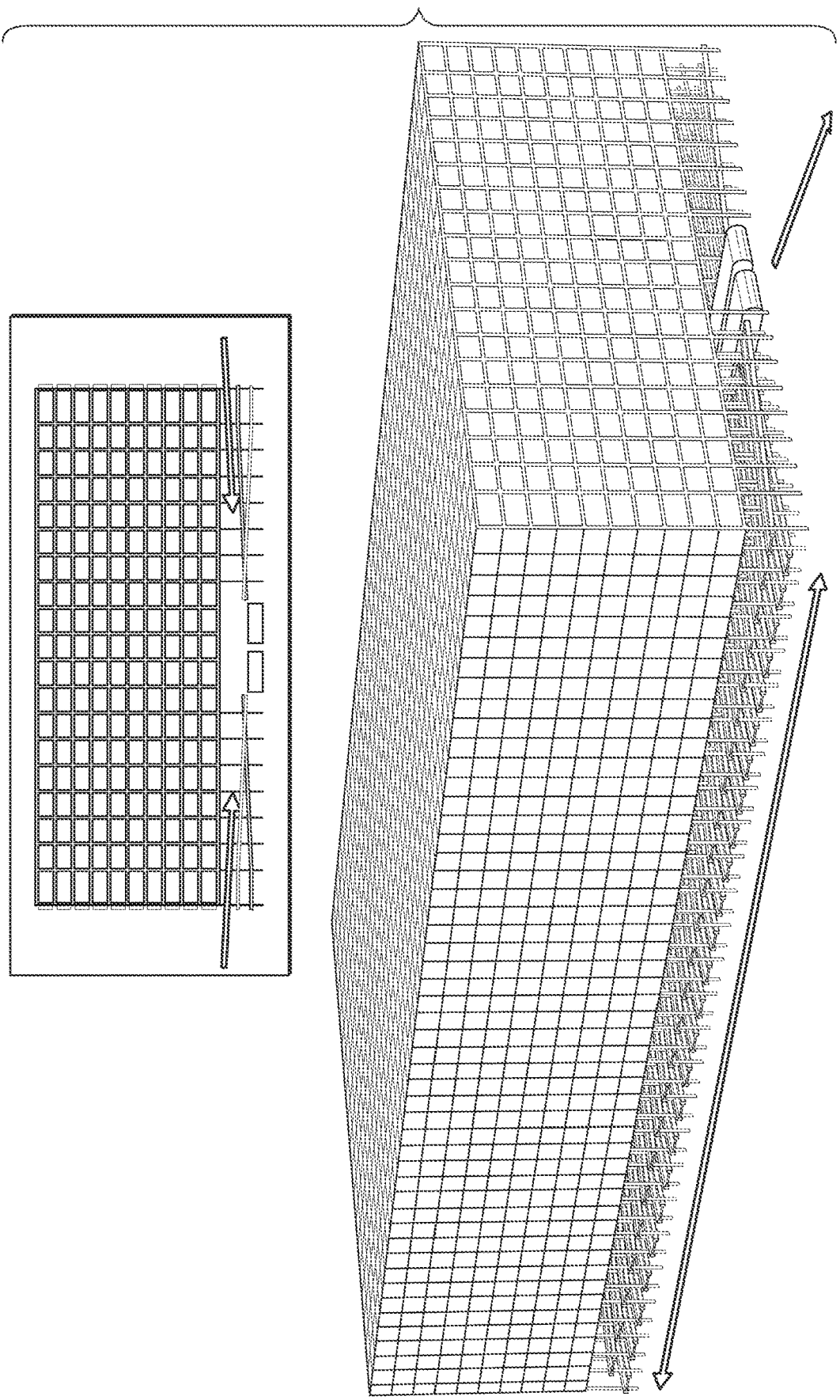
FIG. 27 shows the output portion of the input/output mechanism for use with the storage structure of FIG. 14.

FIG. 27 shows one possible embodiment of a mechanism for outputting totes from the storage structure in the multi-layer bot configuration. In this embodiment, the multi-layer bot configuration, the bottom two rows of the storage structure may be reserved for input and output buffers. The output buffers consist of alternating rows on each side of the structure. The inset of FIG. 27 shows a side view of the mechanism. Totes are retrieved from their source layers by the two-dimensional carriers 1900 and are transported vertically to an output buffer located on one end of the storage structure. The tote is pushed off of carrier 1900 onto a downward facing ramp 1600, as shown in the inset of FIG. 27 and in FIG. 16, where it rolls or slides downward. A mechanism (not shown) may be provided to stop the downward motion of the tote until an open spot on conveyer 1604 arrives at the bottom of the ramp, at which time the mechanism will allow the tote to continue its downward motion onto conveyer 1604. Conveyer 1604, then transports the tote to the end of the structure where it is pushed onto a horizontal conveyer as shown in FIG. 11.

Figure 28:
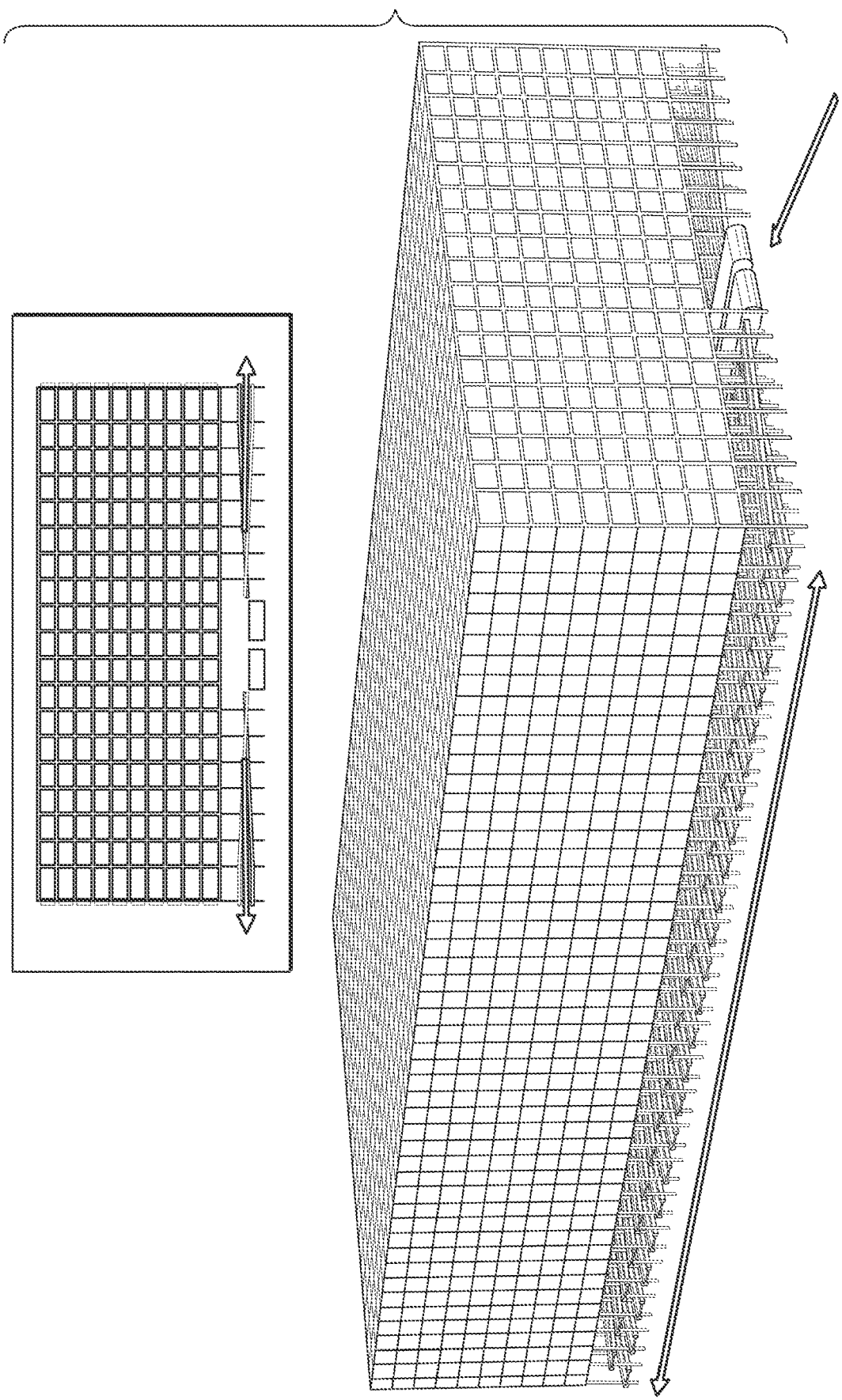
FIG. 28 shows the input portion of the input/type of mechanism for use with the storage structure of FIG. 14.

One possible embodiment of an input process for the multi-layer bot configuration is shown in FIG. 28. In this embodiment, totes are delivered to conveyer 1604 via the horizontal conveyer shown in FIG. 11. Conveyer 1604 delivers the tote to an input buffer located in the first row of the storage structure. The tote is then pushed onto a downward facing ramp 1602, as shown in the inset of FIG. 28 and in FIG. 16 and rolls or slides down the ramp. A mechanism (not shown) may be provided to stop the downward motion of the tote until a two-dimensional carrier 1900 arrives at the bottom of the ramp, at which time the mechanism will allow the tote to continue its downward motion onto carrier 1900 on the outside of the storage structure. The two-dimensional carrier 1900 picks up the tote and transports it vertically to its destination layer, and horizontally to its destination row. Totes may roll or slide down the ramps passively, or they may be assisted by actuators.

Storage and Retrieval Schemes

Figure 29:
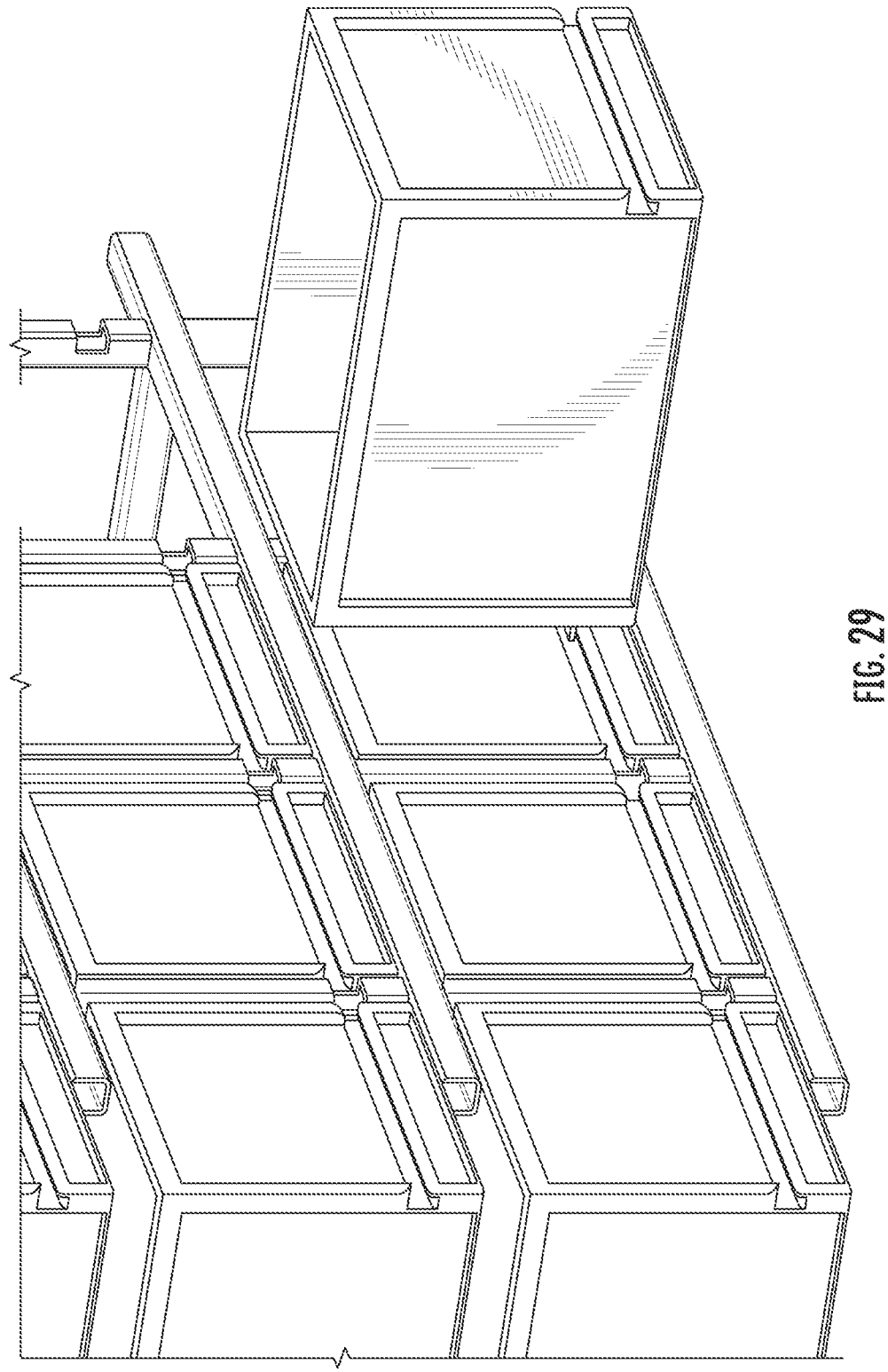
FIG. 29 shows a perspective view of a tote holding structure.

The carriers described herein are able to move along the outside face or faces of the storage structure to target row locations to be able to service rows within a limited range or along the whole face of the storage structure. Such a storage structure is shown in FIG. 29 in a multilayer configuration.

Figure 30:
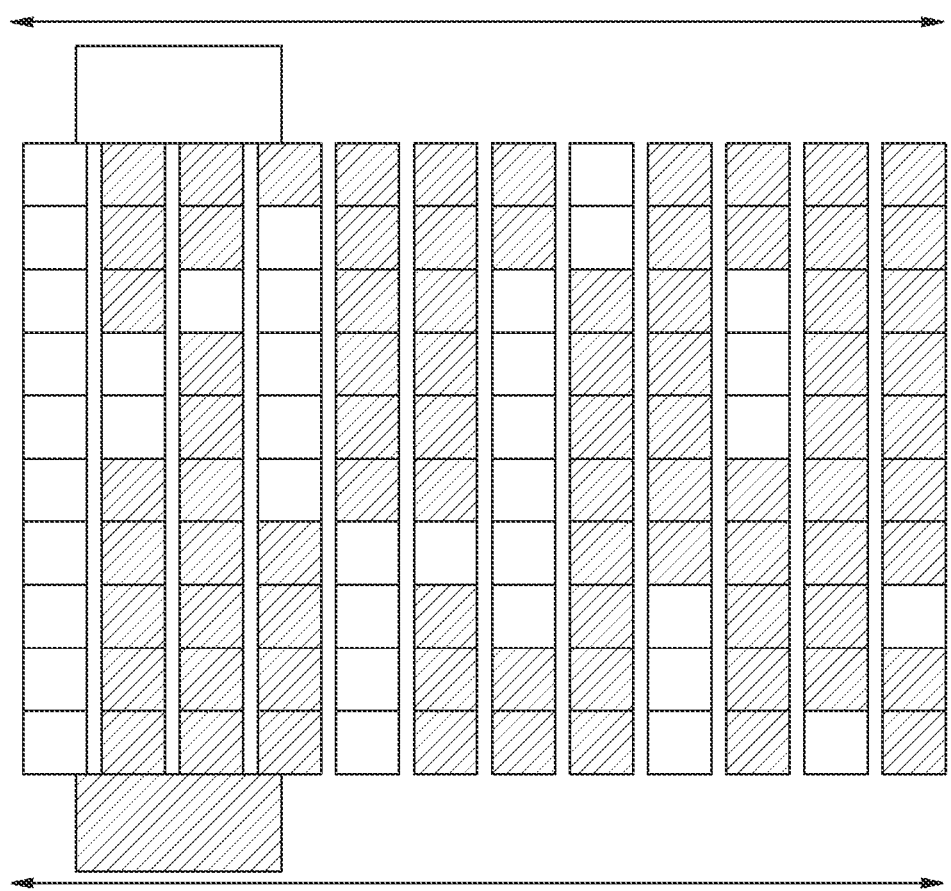
FIG. 30 shows a structure configuration having tandem carriers moving along the outside of the rows.
Figure 31:
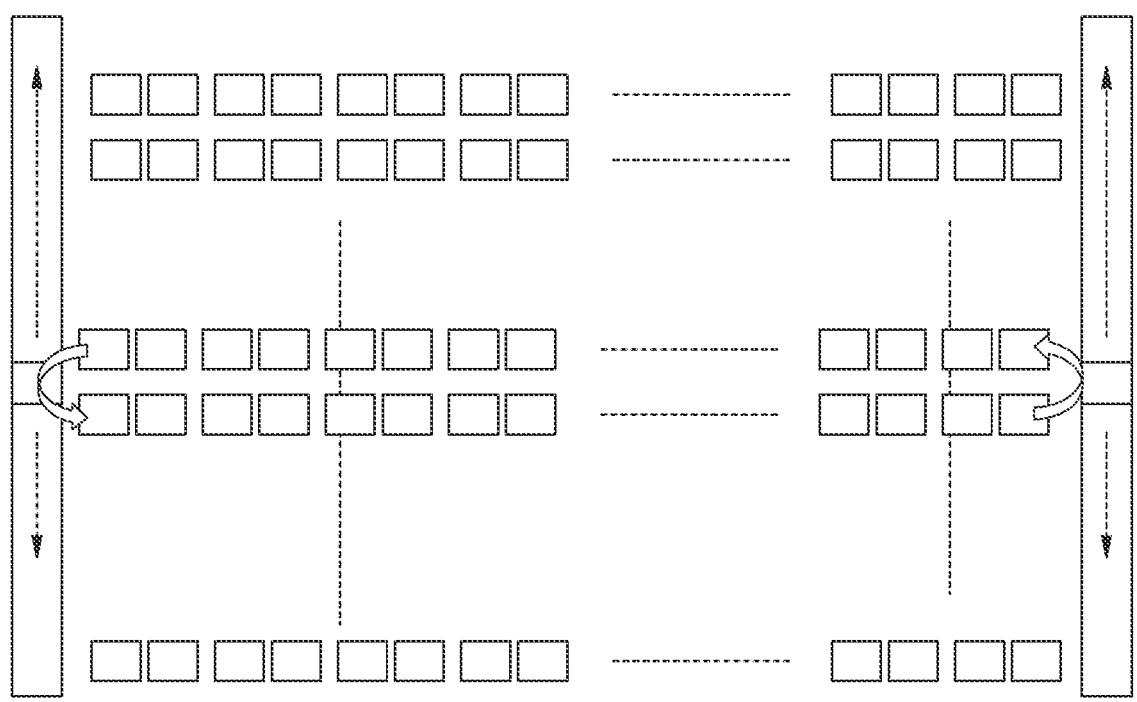
FIG. 31 shows the circular movement of totes between adjacent rows to access totes located on row interiors.
Figure 32A:
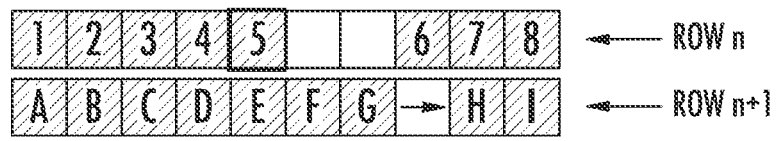
FIG. 32 is a schematic example of the retrieval of a tote from the interior of a row.
Figure 32B:
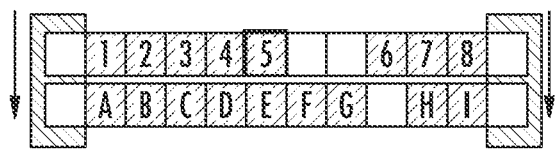
Figure 32C:
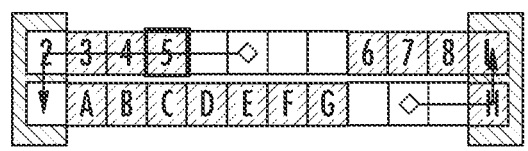
Figure 32D:
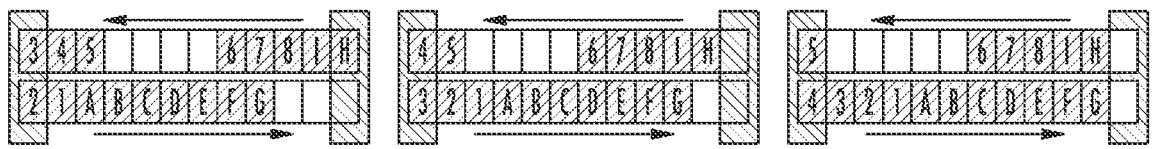
Figure 32E:
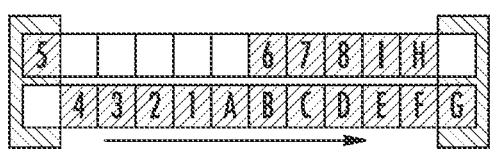
Figure 32F:
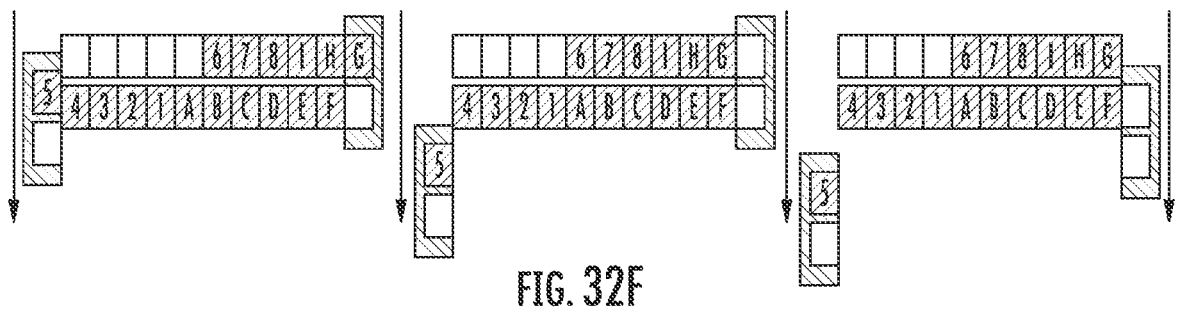

In an embodiment of the single-layer bot configuration, shown in FIG. 30, the carriers work in pairs along the opposite sides of the support structure. The movement of the robotic systems to manipulate the totes is shown in the top view of the support structure shown in FIG. 31. The carriers are able to remove a tote from its source row by decoupling the tote by moving it in a perpendicular horizontal direction to its row and coupling it to an adjacent row in the same motion. Alternatively, as discussed above, the tote may be decoupled from its source row by the passive roller mechanism shown in FIG. 5. The rows are then pushed in opposite directions by the carriers on opposite sides of the storage structure, with the totes at the ends of the rows being uncoupled by the respective carriers and placed into the adjacent row until the desired tote appears at the end of one of the row. The pushing and pulling of adjacent rows may be bidirectional, depending on which end of a row the target tote is closest. Note that, if a row is fully occupied by totes, it is not necessary that a first carrier pull the row while the second carrier pushes the row.

An operational example is shown in FIG. 32. In FIG. 32(A), tote number 5 is the target tote which is nested in the middle of a two-row pair of totes, denoted as row n and row n+1. Note that there is a gap in both row n and row n+1. In FIG. 32(B), a pair of carriers, shown as a left carrier on the left side of the rows and a right carrier on the right side of the rows, is moved to a row containing the target tote as well as an adjacent row. Note that the carriers could also have moved to be positioned on the ends of row n and n−1 (not shown). In FIG. 32(C), the left carrier pulls the totes from row n and the right carrier pulls totes from row n+1 to make space for more totes in that row. It should be noted that the right carrier would only need to begin removal of totes from row n+1 after the gap between tote G and tote H has been closed and tote G and tote H are coupled together. In FIG. 32(D), the left carrier pushes totes from row n into row n+1, while the right carrier pushes totes from row n+1 into row n until the desired tote (tote 5) is captured by the left carrier. The process could also work in reverse order wherein the totes in row n are pushed to the right, while totes and row n+1 our pushed to the left until the right carrier captures tote 5. In FIG. 32(E), the left carrier pushes tote 4 into row n+1 such that tote 5 is the only tote left on the carrier and, in FIG. 32(F), the left carrier moves to deliver the tote to the exit point of the system as soon as all other totes are clear. The right carrier may be moved to the next retrieval location. It is not necessary that the left carrier and the right carrier are members of a fixed pair of carriers but may be paired with other carriers as is convenient to optimize storage and retrieval. Note that the described storage and retrieval scheme is useful in both the single-layer bot and multi-layer bot configurations of the storage structure.

The carrier described herein could work individually or in pairs on opposite faces of the structure. When operating on opposite faces of the structures, multiple carriers would work in tandem to push/pull coupled totes linearly along their storage row, and in the perpendicular direction to decouple them from their row, and either place them in another row and push/pull them into that row or retrieve that tote for delivery to the exit point of the system.

Figure 33:
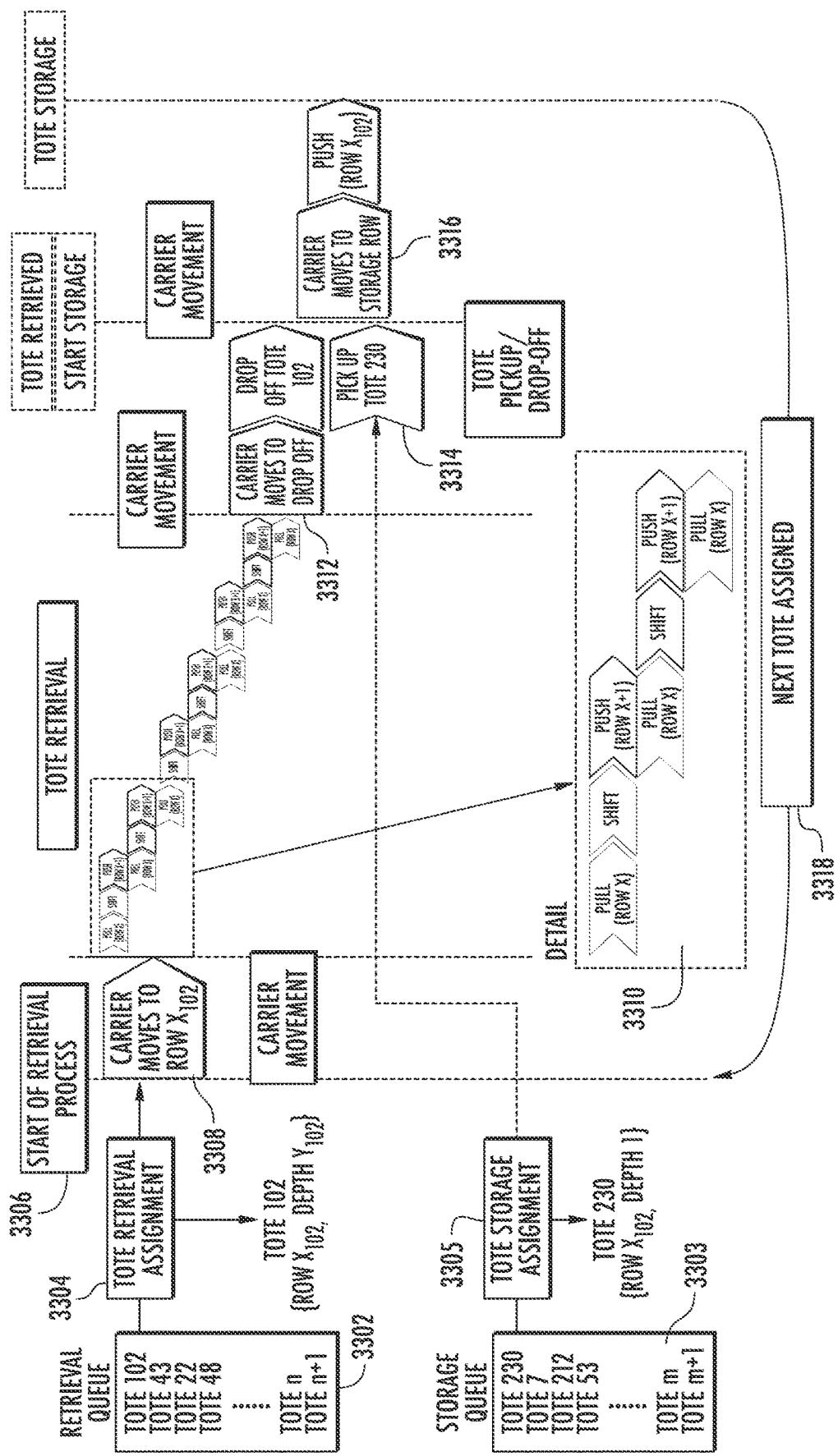
FIG. 33 is a diagrammatic view of the process for storing and retrieving totes.
Figure 34A:
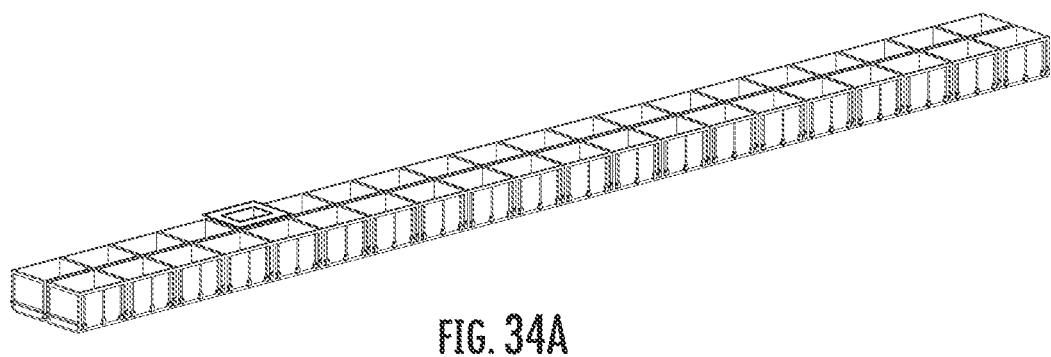
FIG. 34 shows two adjacent rows in a layer showing the movement of totes from one row to another to retrieve a tote in the middle of a row.
Figure 34B:
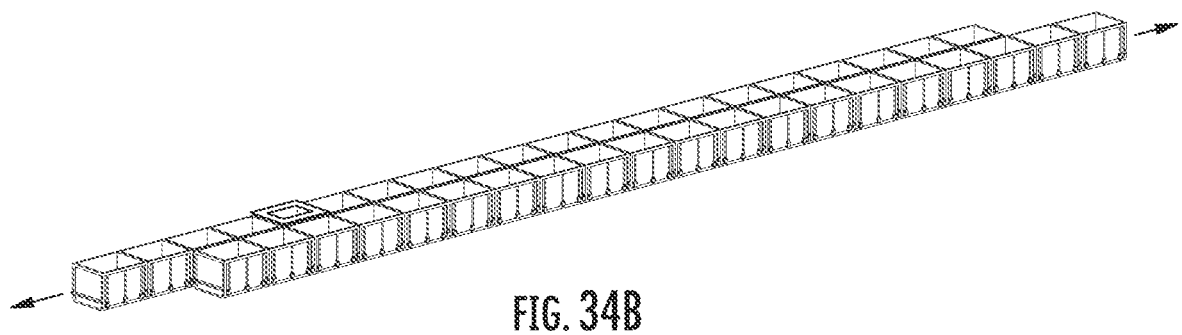
Figure 34C:
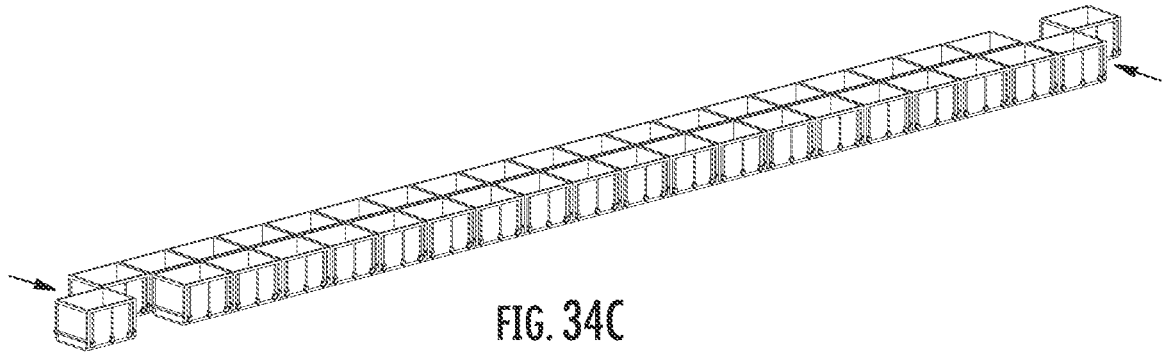
Figure 34D:
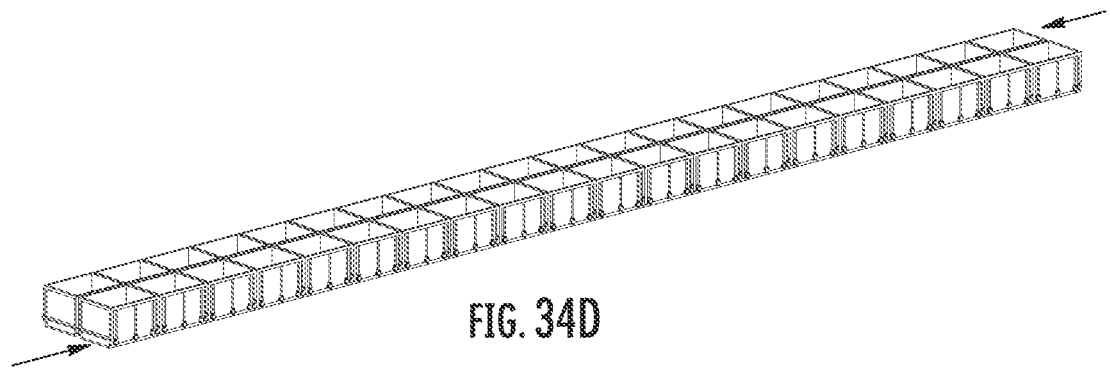

FIG. 33 is a schematic diagram showing a process for the storage and retrieval of totes. The process utilizes both a retrieval queue 3302 of totes waiting to be retrieved and a storage queue 3303 of totes waiting to be stored. To begin the process, tote is removed from retrieval queue 3302 and, at 3304, the process retrieves the location of the tote. The location of all totes is stored in the database and each location comprises a layer, a row within the layer and a depth within the row. The retrieval process starts at 3306 and, at 3308, the carrier moves to the row containing the tote to be retrieved. The detail of the tote retrieval process is shown in box 3310. The carrier pulls the row containing the desired tote from the storage structure and shifts the first tote in the row, which is now on the carrier, to the adjacent row. The carrier then again pulls the row containing the desired tote, while simultaneously pushing the tote on the carrier into the adjacent row. This process of is repeated until the desired tote is on the carrier, at which point the desired carrier must be decoupled from its row either by active decoupling or by passive decoupling brought about by the carrier shifting the tote perpendicularly with respect to its row, as discussed above. At this point, any other tote on the carrier may be pushed into the adjacent row in the layer, and the carrier will proceed to the exit point of the storage system. In the case of the single-layer bot configuration, the tote will proceed to the end of its home layer, where the desired tote will be pushed onto the ramp leading to the vertical conveyer 2502. In the case of the multi-layer bot configuration, the tote will be transported to the bottom of the storage structure where the tote will be pushed onto the ramp leading to the internal conveyer 1604, as discussed above.

It should be noted that the process may require a carrier on the opposite side of the storage structure acting in tandem with the carrier retrieving the desired tote. As totes are removed from the row containing the desired tote they are shifted to an adjacent row, where they are pushed in and thereby coupled to the adjacent row. If the adjacent row is full, a tote will be pushed out into the opposite side of the storage structure. In this case, a second carrier must be there to retrieve that tote, shift the tote the adjacent row (the row containing the desired tote) and push it into the row. In some embodiments, an electrical or mechanical stop may be provided at the end of the row to prevent a tote from being pushed out of the row until a carrier is present to receive it. The carrier may de-activate the stop, thereby allowing the tote to be pushed out of the row and received by the carrier.

It may not be necessary for the two carriers to arrive at positions on the structure wherein they act in tandem at the same time. For example, if the adjacent row into which totes are pushed after they are retrieved from the row containing the desired tote is not completely full, a tote will not be pushed out of the storage structure on the opposite side until any gap within the row is filled. Therefore, the second carrier may be occupied with other tasks until it is necessary for it to be at the required position to catch totes which are being pushed out of the adjacent row.

Returning to FIG. 33, at 3312 the carrier moves to the drop off point and delivers the retrieved totes to the input/output mechanism. At this point the carrier is able to retrieve a tote from the input/output mechanism to store within the storage structure. The first tote to be stored is removed from queue 3303 and is assigned a storage location at 3305. Again, the storage location must consist of a layer, a row within the layer, and the depth within the row where the tote will be stored. It should be noted that, in most cases, the tote will be stored at the end of a row. At 3316, the carrier moves to the required location and the tote is pushed into the assigned row. At 3318, the next tote is removed from the retrieval queue and the process repeats.

FIG. 34 shows the process of moving a desired tote from the middle of the row to the end of the row where the carrier may pick it up. FIG. 34(A) shows the desired tote as being at a depth of five within the row. At FIG. 34(B), the carriers pull on the ends of the rows, thereby retrieving a tote from opposite sides of the storage structure. In FIG. 34(C), the end tote on each row and shifted to the side, which passively decouples it from its row and, in FIG. 34(D), the shifted totes are pushed into and coupled with the adjacent rows. In alternate embodiments, only the row containing the desired tote may be pulled and, when the tote is shifted to the adjacent row and pushed into the row, a tote on the opposite side of the row may be pushed out of the storage structure onto the carrier. As such, it may not be necessary for the second carrier on the opposite side of the structure to pull on the row; the second carrier may passively receive totes which are pushed out of the row by the first carrier. The desired tote is now moved one tote closer to the end of the row and the process is repeated until the desired tote is located on the carrier, at which point it is decouple from its row and carried to the exit point of the system.

Retrieval Optimizations

Figure 35C:
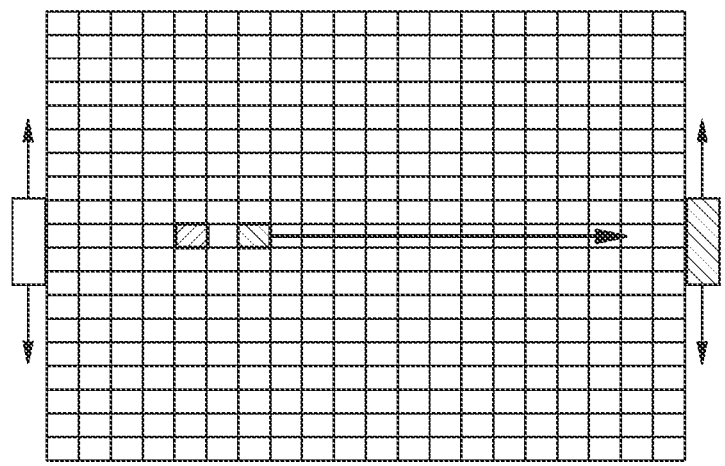
FIG. 35 shows an optimization of the process for retrieving totes.
Figure 35B:
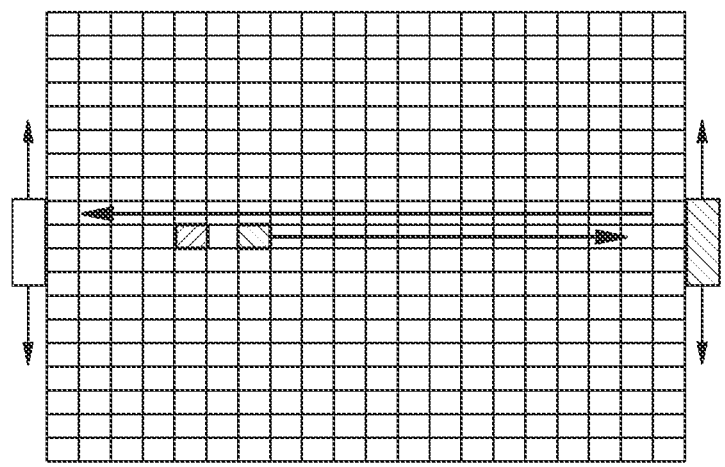
Figure 35A:
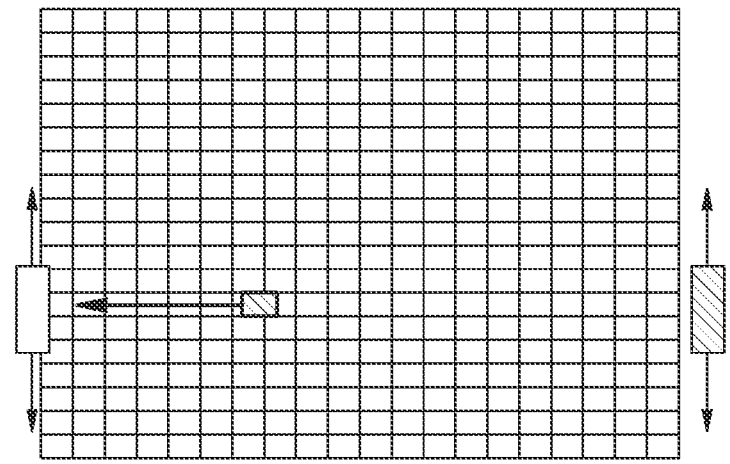

There are several optimizations possible which make the storage and retrieval process more efficient. FIG. 35 shows one such optimization. This process defines the direction in which carriers retrieve totes. With carriers on both sides of the storage structure, totes, could be pulled to either carrier for retrieval. The optimized algorithm minimizes the number of push/pull cycles required to move a tote to a carrier. In FIG. 35(A), which shows a top view of a horizontal layer of rows, the target tote is closer to the top carrier than the bottom carrier and, as such, top carrier will pull the row and will be able to retrieve the tote using seven pull/shift cycles. FIG. 35(B) shows a similar case however, there is a gap in the row between the desired tote in the top carrier. As such, even though the desired tote is located physically closer to the top carrier, because the top carrier will not be able to pull the portion of the row containing the desired tote, the row is pulled by the bottom carrier, and will require 13 pull/shift cycles to move the tote to the bottom carrier, as shown in FIG. 35(C).

Other optimizations are possible. In one embodiment, when a tote is removed from the storage queue and assigned a storage space, the storage space can be assigned based on location of the next tote in the retrieval queue. The tote to be assigned can be stored in the same position or, alternatively, in the same layer and row as the next tote to be retrieved. When the carriers move to the target row the tote to be stored is pushed into the row while the first tote is pulled. This reduces the movement time of the carriers.

In another embodiment, the queues for storage and retrieval of the totes may be optimized. Instead of retrieving the first tote in the retrieval queue, the estimated retrieval times for all totes in the queue are compared and the tote with the lowest estimated retrieval time may be retrieved first. This is repeated for each retrieval process.

In yet another optimization, carriers may be used in parallel. For a single-layer bot configuration, only one carrier may be used to pick a tote so that other carriers are free to pick other totes or stage picking. This optimization only is useful when the layer is not completely full (i.e. there are rows having a gap in them). For the multi-layer bot configuration parallelization will improve the retrieval rate and will reduce the number of required bots to operate the storage facility.

In a further optimized embodiment, the layout of the totes may be optimized. The totes may be optimized to stocking retrieval sequence to appropriately "buried" unpopular totes deeper in the row and "expose" popular totes to be closer to the edge of the row. The initial and desired layout requires keeping more popular totes in parts of the storage structure that are easy to access, for example, nearer the input/output mechanisms. The system can reconfigure the layout during slow times to prepare for busy times by shuffling popular totes to more easily accessible spots in the storage structure. Note that the popularity of totes can be gauged based on number of times a particular tote is retrieved within a predefined recency.

In yet a further optimized embodiment, a predictive layout optimization may be used to customize the desired layout to optimize for different order popularity based on time of day or week. The layout of the totes within the storage structure can be modified to better suit pickers. The system could account for multiple parallel order fulfillment for pickers and may use machine learning to account for pickers efficiency (and item efficiency) to reduce the amount of required queueing.

Improved Efficiency Embodiments

Figure 36A:
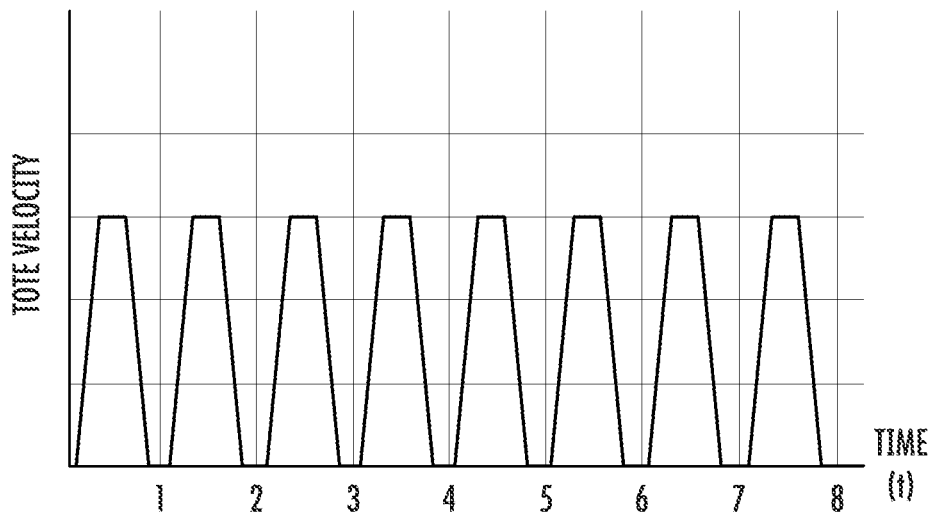
FIG. 36(A-D) are graphs showing the velocity and acceleration of rows and the efficiencies experienced by earlier described embodiments of the invention (A-B) and by improved efficiency embodiments of the invention (C-D). The graphs show that the time required to push or pull 8 totes "To" is much shorter than the time T required using discrete push and pull motion.
Figure 36B:
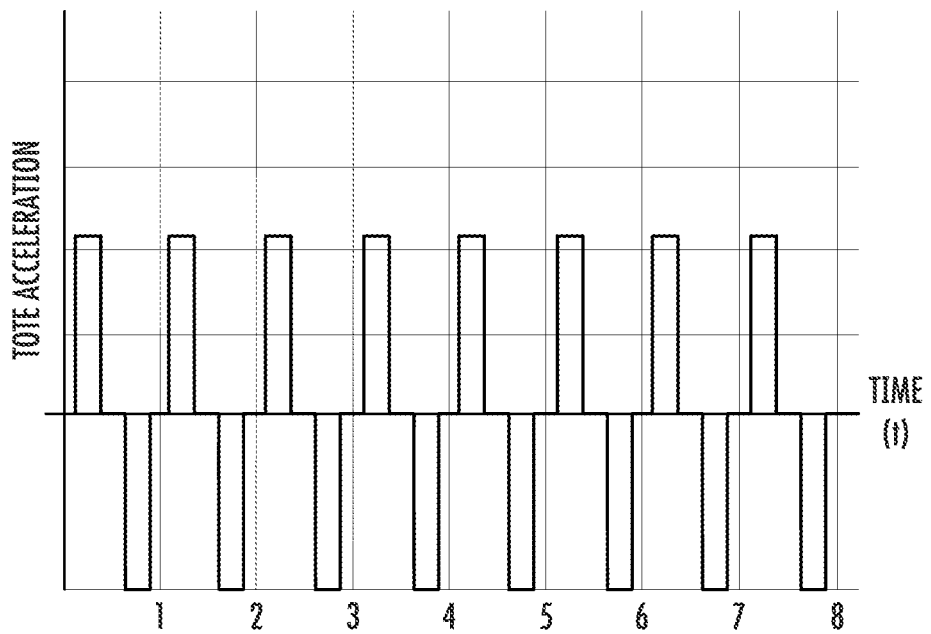
Figure 36C:
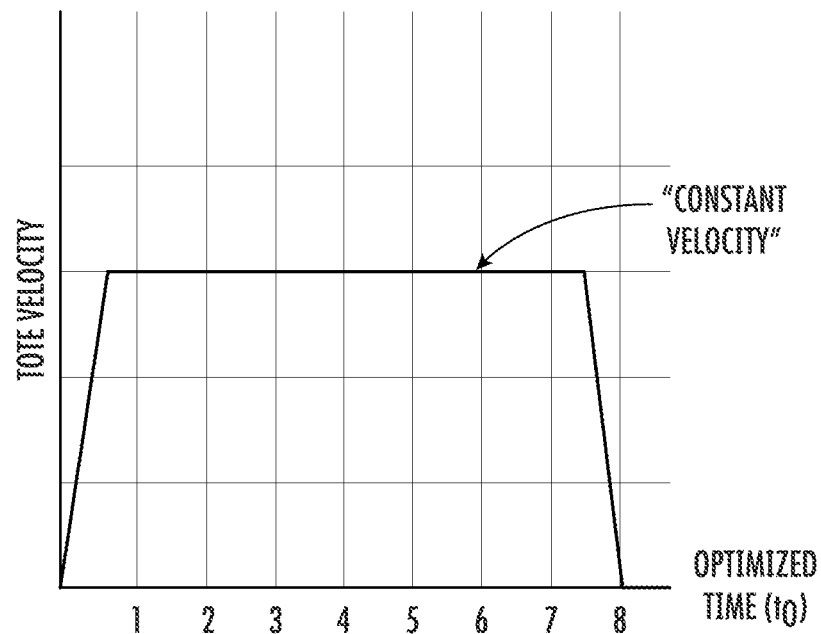
Figure 36D:
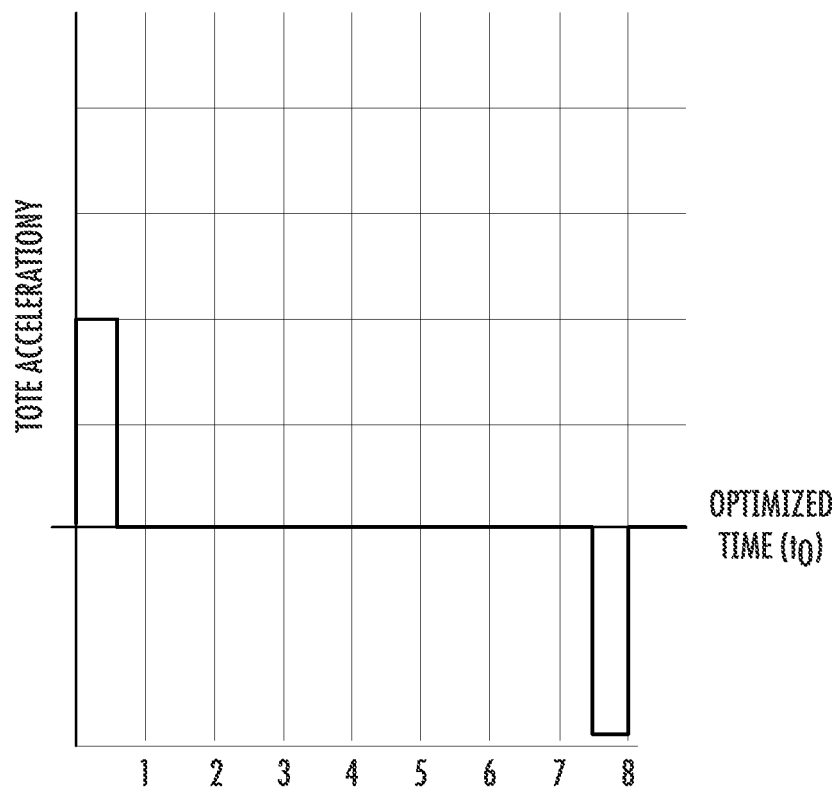

One difficulty with the embodiments described thus far is that, while they are more efficient than existing prior art designs, they are still not optimally efficient in terms of time-to-retrieve and power consumption. This is illustrated by the graphs in FIG. 36. The inefficiency arises from the fact that the movement of the rows must be stopped while each tote on the end of the row is decoupled from the row and then started back up again to move the next tote in the row to a position where it can be decoupled. FIG. 36(A) is a graph of the velocity of the rows as the totes are shifted out of the row. As can be seen, the entire row must come to a complete stop before the tote at the end of the row is decoupled from the row, negatively impacting the time-to-retrieve. Even worse is the fact that the row must be decelerated, as shown in FIG. 36(B), to bring it to a complete stop before the tote is decoupled, then accelerated again to move the next tote into position. To decelerate the row, force must be applied to the row to slow its forward momentum. This constant starting and stopping motion is inefficient both in terms of the time required to retrieve a tote and in terms of the power required to constantly accelerate and decelerate the rows, which may be significant due to the weight of the rows.

FIGS. 36(C-D) shows graphs similar to those shown in FIGS. 36(A-B) showing the difference in the row velocity and row acceleration between earlier embodiments of the invention and the improved-efficiency embodiments of the invention. The graphs in FIGS. 36(C-D) show that once the row of totes is accelerated to a desired velocity, the row stays at that velocity while totes are loaded and unloaded until the last tote has been added to or removed from the row, at which time the row velocity is slowed to zero. Thus, the "start and stop" inefficiencies shown in embodiments to which FIGS. 36(A-B) refer are eliminated, thus improving the time-to-retrieve any particular tote. Likewise, the power required to accelerate and decelerate row of totes is only needed at the beginning and end of the movement of a single row of totes.

The described inefficiencies may be eliminated by having the rows of totes move at a constant velocity, thereby eliminating the constant start and stop motion and the need to accelerate and decelerate the rows. This requires having the ability to decouple the totes from the rows and to couple totes to the rows while the rows are in motion and without slowing the rows. Additional embodiments of the invention providing this ability and thereby realizing a gain in both time-to-retrieve and power consumption will now be described.

A first embodiment providing the improved efficiency described above is illustrated schematically in FIG. 37. In this embodiment, each level in the storage structure is provided with a stationary or mobile conveyer 3700 disposed on each end of the rows of the layer. In one aspect of the invention, the conveyers may only move in one direction, with the direction of the opposing conveyers 3700 being opposite each other as shown in FIG. 37. In other aspects of the invention, conveyers 3700 may be free to move in either direction and may be configured dynamically. The presence of conveyers 3700 eliminates the need for mobile carriers 3710 to convey totes-of-interest to an exit point of the storage structure. The mobile carriers 3710 in this embodiment serve to bridge the rows of totes with the conveyers 3700 and may, in other embodiments, also serve to provide a drive mechanism for moving the rows of totes and/or mechanisms for coupling and decoupling the totes to and from the rows. In one aspect of the embodiment, mobile carriers 3710 are horizontally mobile, being free to move to the end of any row within the layer of rows. In other aspects of the embodiment, mobile carriers may be both horizontally and vertically mobile, such as to be able to move horizontally between rows of the storage structure.

FIG. 38 shows one aspect of the embodiment in which a constant circular motion is set up between a source row in a destination row within the layer of rows to retrieve the tote of interest 3802, which is present in source row 3804. Two mobile carriers 3710 are moved to the ends of source row 3804. An additional two mobile carriers 3710 are moved to the opposite ends of a destination row, in this case, row 3806 within the layer of rows. Note that row 3806 may be any row within the layer of rows but, in preferred embodiments, may be a row in which an additional tote-of-interest is located or a row in which an incoming tote entering the storage system may be stored. Rows 3804 and 3006 are moved at a substantially constant velocity and without stopping in opposite directions, as shown in FIG. 38, until tote of interest 3802 is moved onto conveyer 3700, at which point motion of the conveyer moves the tote-of-interest 3802 to an exit point of the storage system.

It should be noted that, for rows 3804 and 3806 to move at a substantially constant velocity and without stopping, it is necessary that totes are able to be decoupled from source rows and coupled to destination rows while the source or destination row moves at a constant velocity. As such, mobile carriers 3710 may be flared at the ends adjacent to conveyers 3700 to accommodate the side-to-side movement of the totes (i.e. movement in the direction of travel of the conveyer 3700) while still being moved in the longitudinal direction of the rows (i.e., in a direction perpendicular to the direction of travel of the conveyers 3700). As such, the totes experience a movement in directions both parallel to the longitudinal axis of the source of destination row and perpendicular to the longitudinal axis of the source or destination row, such as to move in an approximately circular path as the tote passes through the mobile carrier and onto the conveyer. Note that, to accommodate the coupling and decoupling of totes to and from the rows while the rows are moving at a constant velocity, it may not be possible to move totes to and from adjacent rows or rows that are less than a specified number of rows apart from each other, depending on the design of the mobile carriers.

Figure 2B:
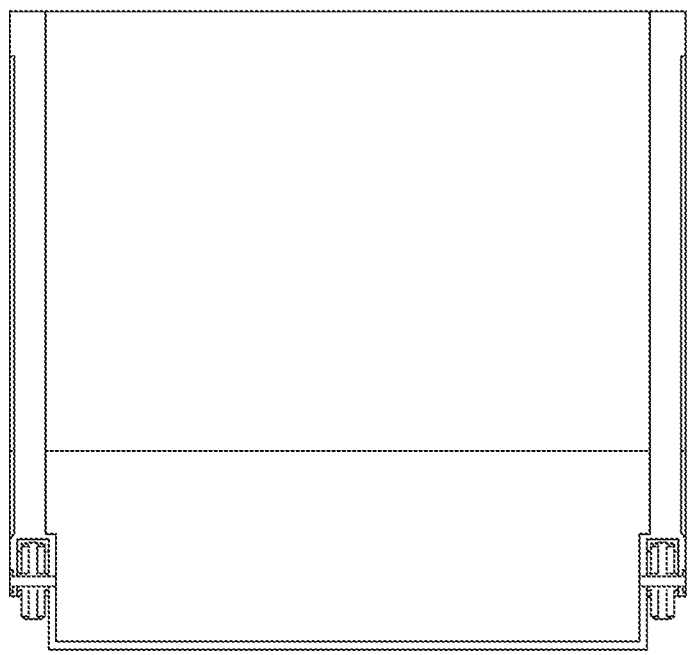

The movement of the totes in a direction perpendicular to the longitudinal axis of the row may, as in previous embodiments, be sufficient to decouple the totes from a source row or to couple the totes to destination row. An example of such a mechanism is shown in FIG. 2. However, any means of coupling and decoupling the totes may be used, including, for example active or passive mechanisms located on the mobile carrier or the conveyer.

In some embodiments, the conveyers may be equipped with shoes to actuate the movement of the totes from the conveyers to the rows. Preferably, the shoes would move at the same velocity as the conveyer. It should be noted that any implementation of shoes may be used and, in some embodiments, mechanisms other than shoes may be used to position the totes on the conveyer and/or actuate the movement of the totes to the rows. Furthermore, it is desirable that the conveyers 3700 also move the totes at the same constant velocity with which the rows are moving to provide a smooth transition of the totes between the rows and the conveyers.

FIG. 39 provides a step-by-step explanation of the retrieval of a tote-of-interest in accordance with a first improved efficiency embodiment of the invention. FIG. 39(A) shows the storage system in a static state prior to the retrieval of the tote-of-interest, which is indicated as being tote E6. It should be noted that the mobile carriers are initially in random positions, typically predicated on their ending positions from the last storage and/or retrieval operation for this layer. In FIG. 39(B), it can be seen that the mobile carriers have moved into positions to enable them to retrieve tote-of-interest E6 from source row 6. One mobile carrier has moved to each end of the row 6 in which tote E6 resides, while one tote has moved to each end of a destination row in this layer of the storage structure, in this case, row 2. As previously noted, the destination row may be any row within the storage structure and may preferably be a row having another tote-of-interest which may be retrieved or a row in which an incoming tote is desired to be stored. Although in preferred embodiments, the longitudinal motion of the conveyer decouples the totes from the end of the row, in some embodiments, mobile carriers may be provided with an active mechanism (or ramp) that assists in the decoupling of the totes from one another when the tote is being moved through the carrier.

Figure 39A:
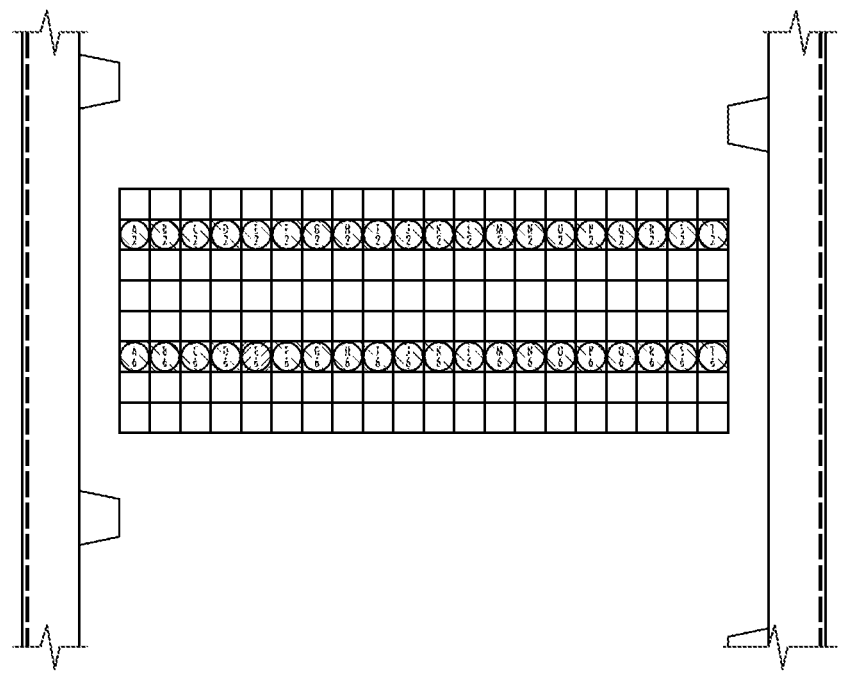
FIG. 39(A-M) are a series of schematic diagrams showing the steps to retrieve a tote from the interior of a row of the storage structure using the embodiment having the conveyers along the sides of the layer and wherein the totes exhibit a "circular" motion.
Figure 39B:
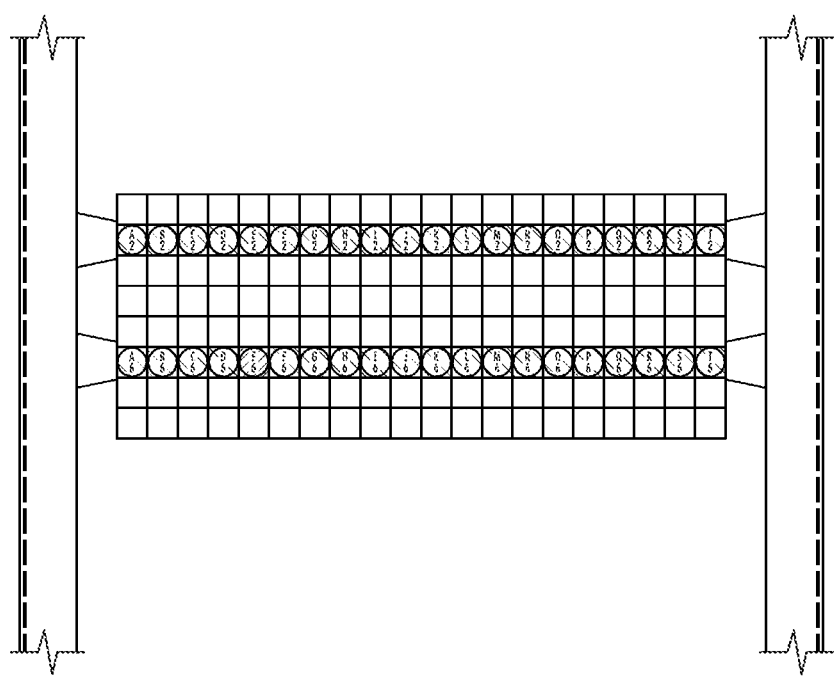
Figure 39C:
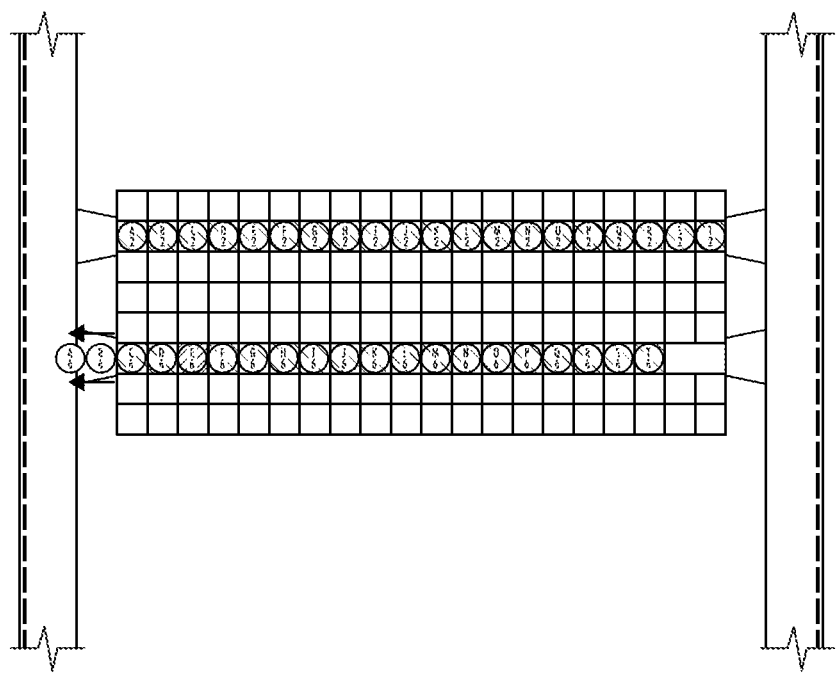
Figure 39D:
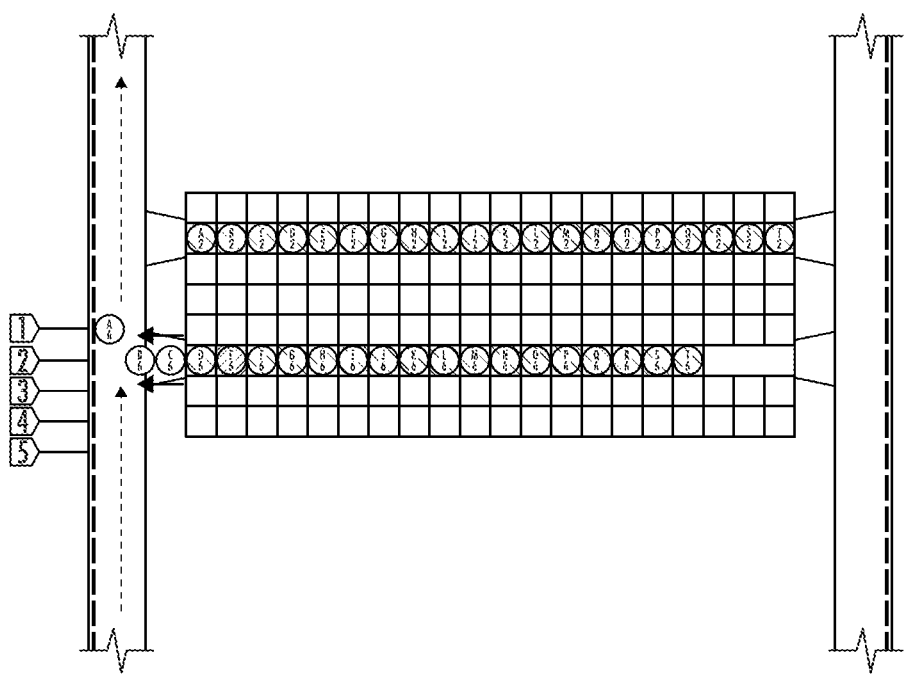

FIG. 39(C) shows that the row 6 in which tote E6 is stored has begun movement to the left and that tote A6 has moved through the mobile carrier on the end of the row and is being positioned on the left conveyer. In FIG. 39(D), tote A6 has been decoupled from row 6 and rests against shoe 1 on the left conveyer. The movement of tote A6 in the direction of the left conveyer also serves to decouple tote A6 from row 6. It should be noted that, as the tote is being decoupled, it is being moved both longitudinally in the direction of movement of row 6 and perpendicular to the longitudinal direction of the movement of row 6 by virtue of the movement of the left conveyer. This bidirectional movement serves to decouple the tote from row 6 and will serve to couple the tote to its destination row (i.e., row 2).

Figure 39E:
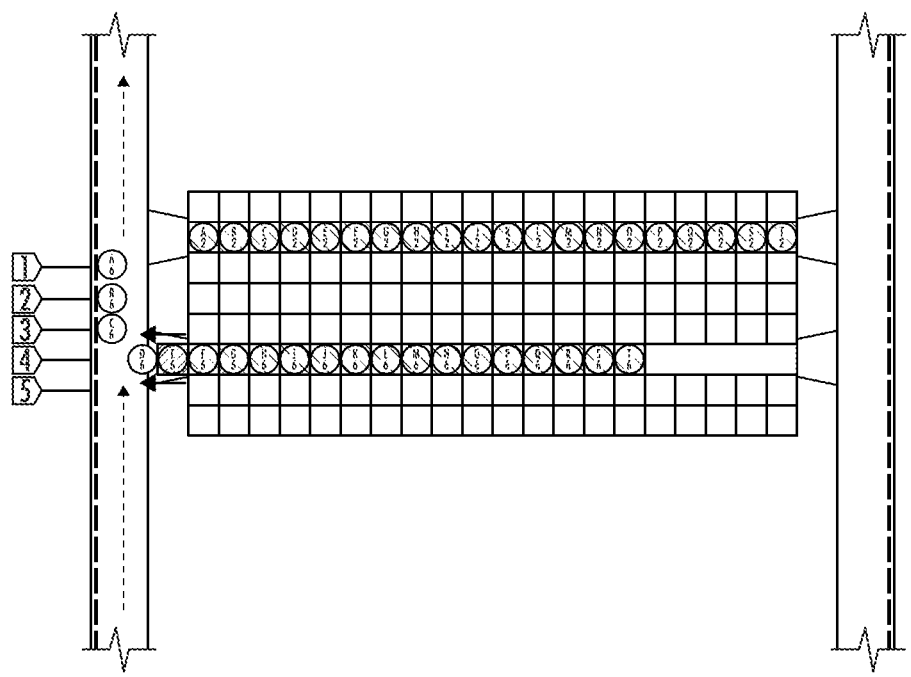

In FIG. 39(E), it can be seen totes A6, B6 and C6 have been moved against shoes 1, 2 and 3 on the left conveyer and, by virtue of the movement of the left conveyer, are moving toward row 2. It should be noted that the tote-of-interest, tote E6, now rests on the mobile carrier.

Figure 39F:
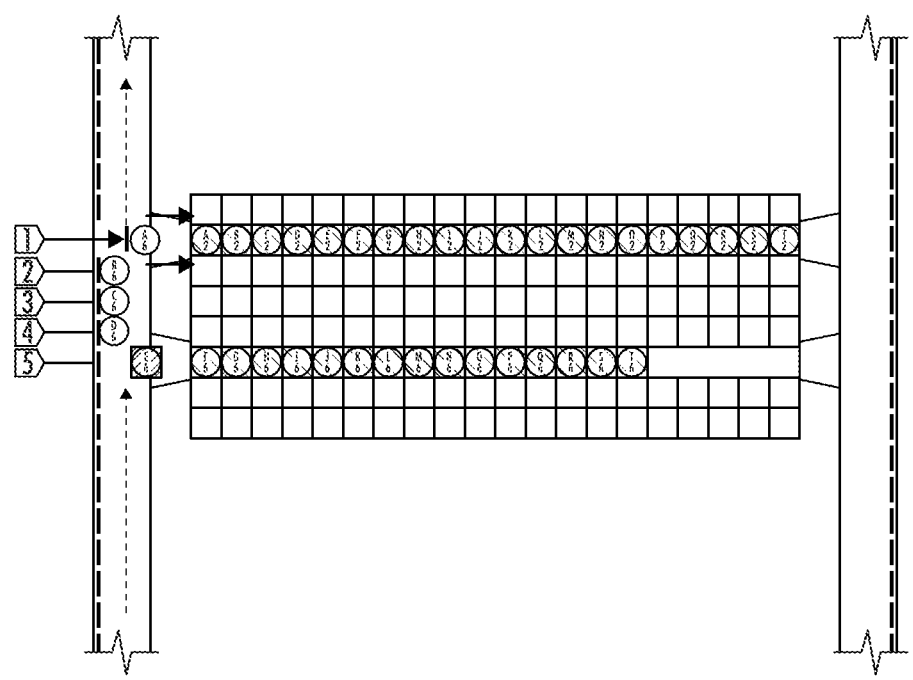

In FIG. 39(F), shoe 1 has been activated to push tote A6 onto the mobile carrier for row 2. Totes B6, C6, and D6 have moved further down the conveyer toward row 2, and the tote-of-interest, E6, is being moved onto the left conveyer. In some embodiments, the mobile carrier adjacent the left side of row 2 may be provided with a ramp which allows tote A6 to slide down and into contact with tote A2, thereby becoming coupled with tote A2. In other embodiments, the mobile carrier may be provided with a drive mechanism that moves tote A6 from the left conveyer and into contact with tote A2 in row 2.

Figure 39G:
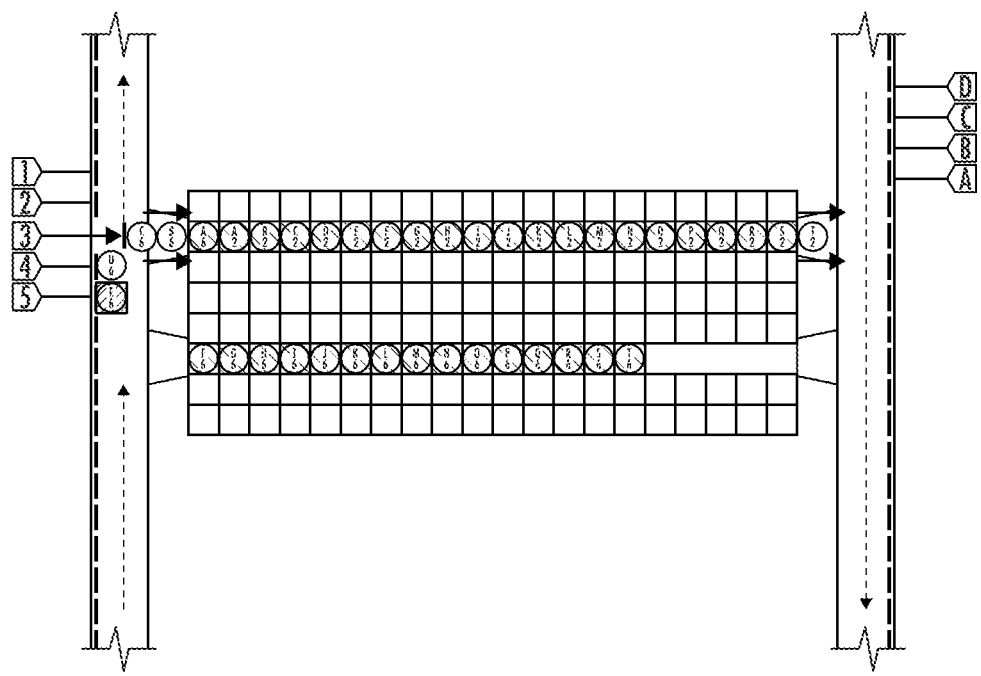

In FIG. 39(G), tote B6 has been moved onto the mobile carrier by virtue of the activation of shoe 2, thereby becoming coupled with tote A6, and tote C6 has been moved toward row 2 by virtue of the activation of shoe 3, thereby becoming coupled to tote B6. By virtue of the movement of row 2 to the right to accommodate tote A6, tote T2 has been pushed out of the end of row 2 and onto the mobile carrier.

Figure 39H:
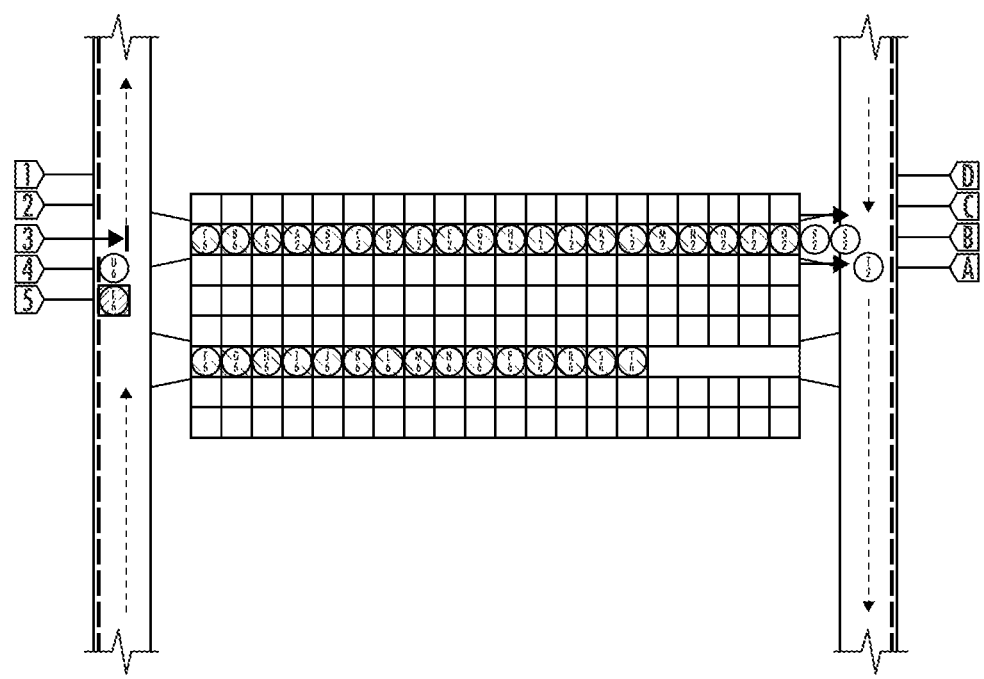

In FIG. 39(H), tote D6 has been pushed onto carrier by shoe 4. The movement of row 2 to the right to accommodate totes B6 and C6 has pushed totes S2 and R2 out of row 2 and tote T2 has moved on the right conveyer against shoe A toward row 2. Tote E6, resting against shoe 5, has moved further along the left carrier toward row 2.

Figure 39I:
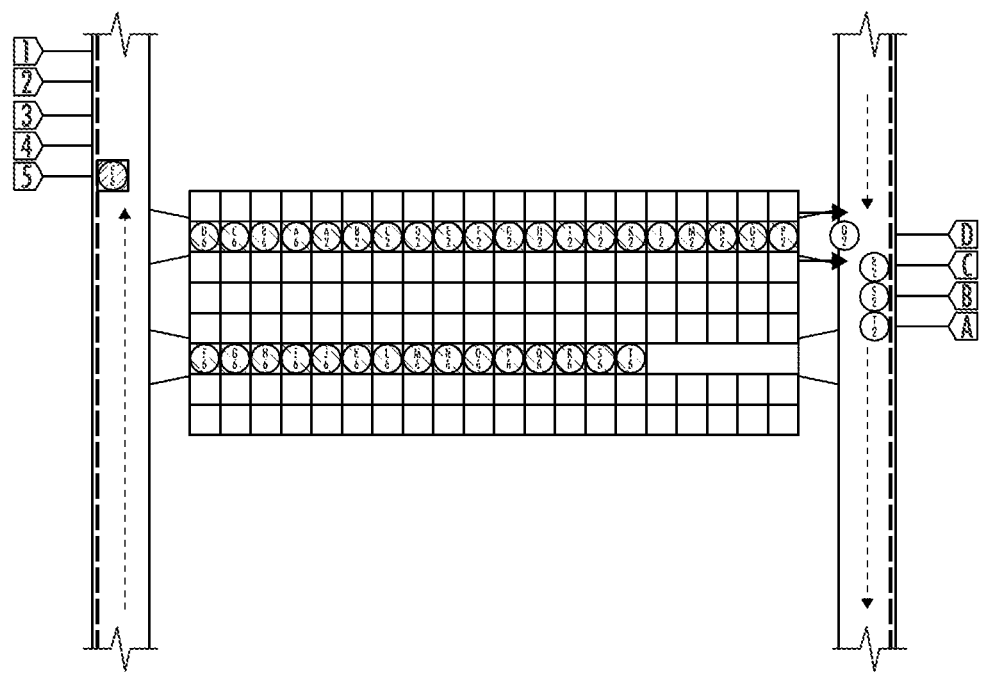

FIG. 39(I) shows that shoe 5 has not been activated, thereby allowing tote E6 to move past row 2 and further along the left conveyer toward an exit point of the storage system. Totes T2, S2 and R2 have moved in the direction of the right conveyer toward row 6 and tote Q2 is being pushed onto the right conveyer. Note the empty spaces at the end of row 6 which will accommodate totes T2, S2, R2 and Q2.

Figure 39J:
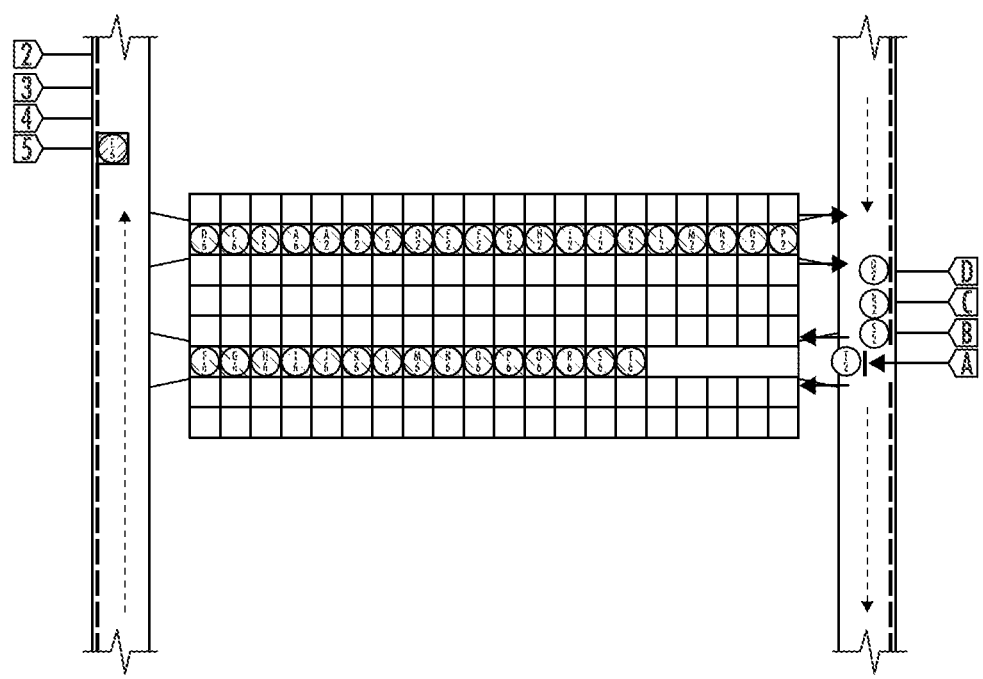
Figure 39K:
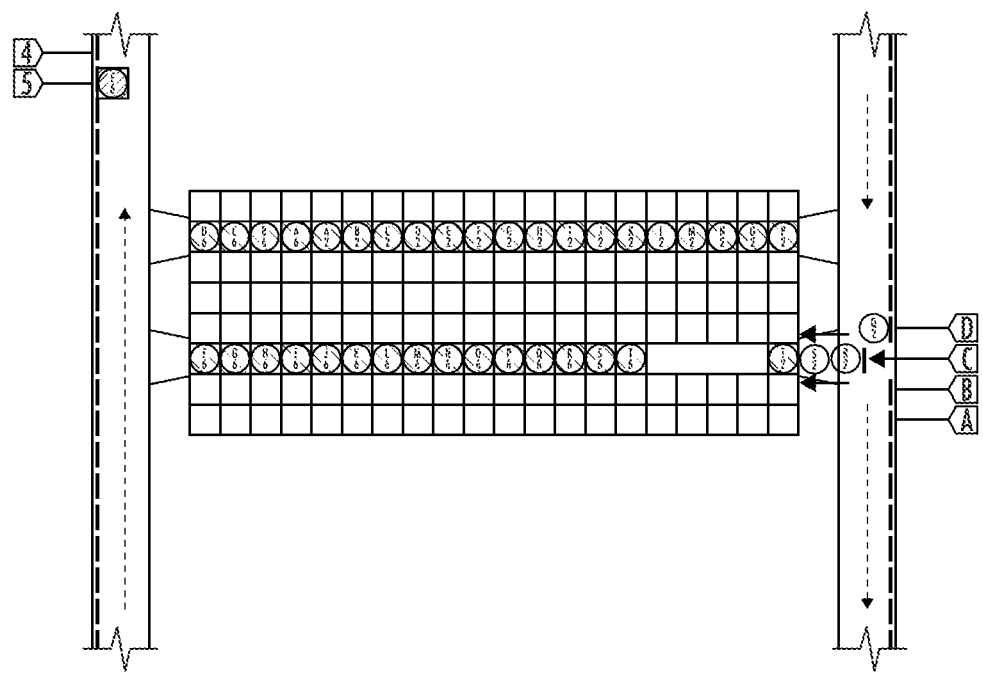
Figure 39L:
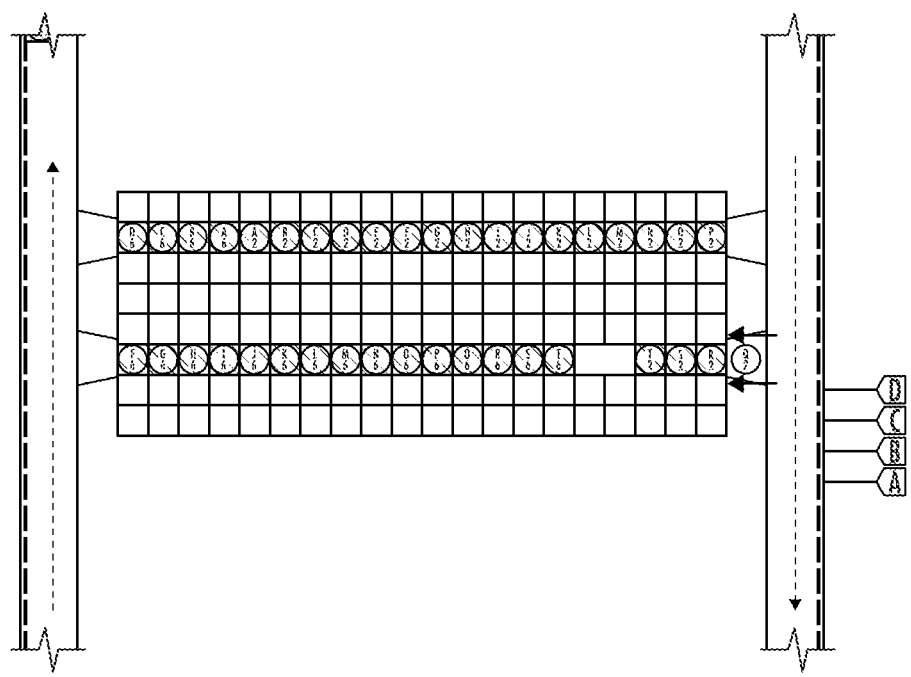

FIG. 39(J) shows the movement of tote T2 onto the mobile carrier by virtue of activation of shoe A. Totes S2, R2 and Q2 have moved further along the right conveyer toward row 6. FIG. 39(K) shows the movement of totes S2 and R2 towards row 6 by virtue of the activation of shoes B and C, thereby pushing tote T2 further into row 6. FIG. 39(L) shows the further movement of totes from row 2 into row 6. It should be noted that totes T2, S2, R2 and Q2 may be pulled into row 6 by virtue of the previously mentioned drive mechanism. In addition to, or in lieu of the drive mechanism, the mobile carrier adjacent the right side of row 6 may be provided with a ramp which allows totes pushed onto the mobile carrier by a shoe to slide down and into contact with a tote at the end of the row.

Figure 39M:
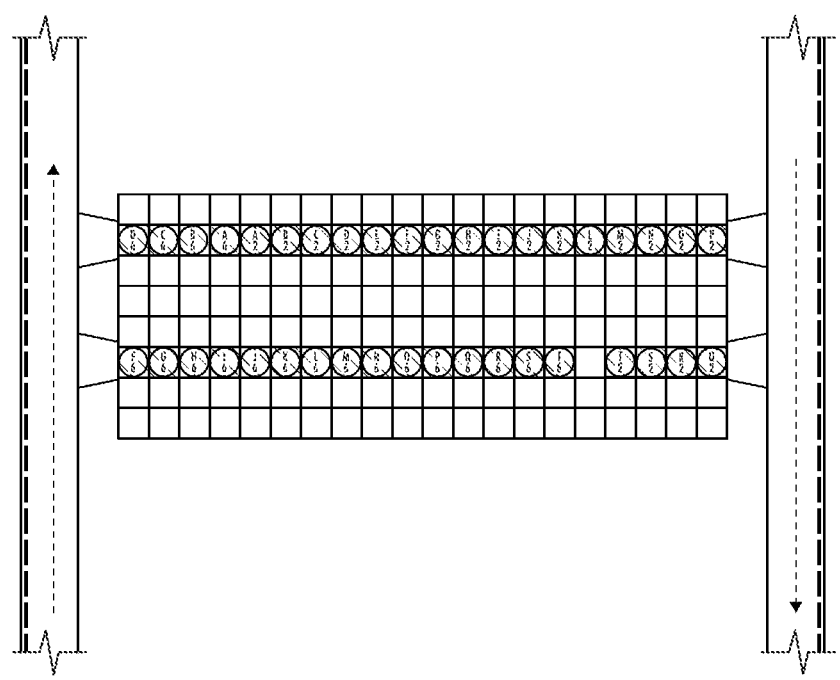

FIG. 39(M) shows the completed operation with totes T2, S2, R2 and Q2 present in row 6, with row 6 containing an empty space created by virtue of the removal of tote E6, from the storage structure.

It should further note be noted that operations involving the storage structure may be "chained" with each other. That is, one operation need not be completely finished before starting the next operation. For example, in the example just discussed, a new tote may be stored in a storage structure by introducing it via the left conveyer after tote E6 (FIG. 39(G)), and then pushing it into row 2 after tote D6 (FIG. 39(H)). In such cases, one additional tote would then move on to the right conveyer from row 2 and be stored into the empty slot in row 6 caused by the exit of tote D6 from the system. Other examples can be contemplated.

Figure 40:
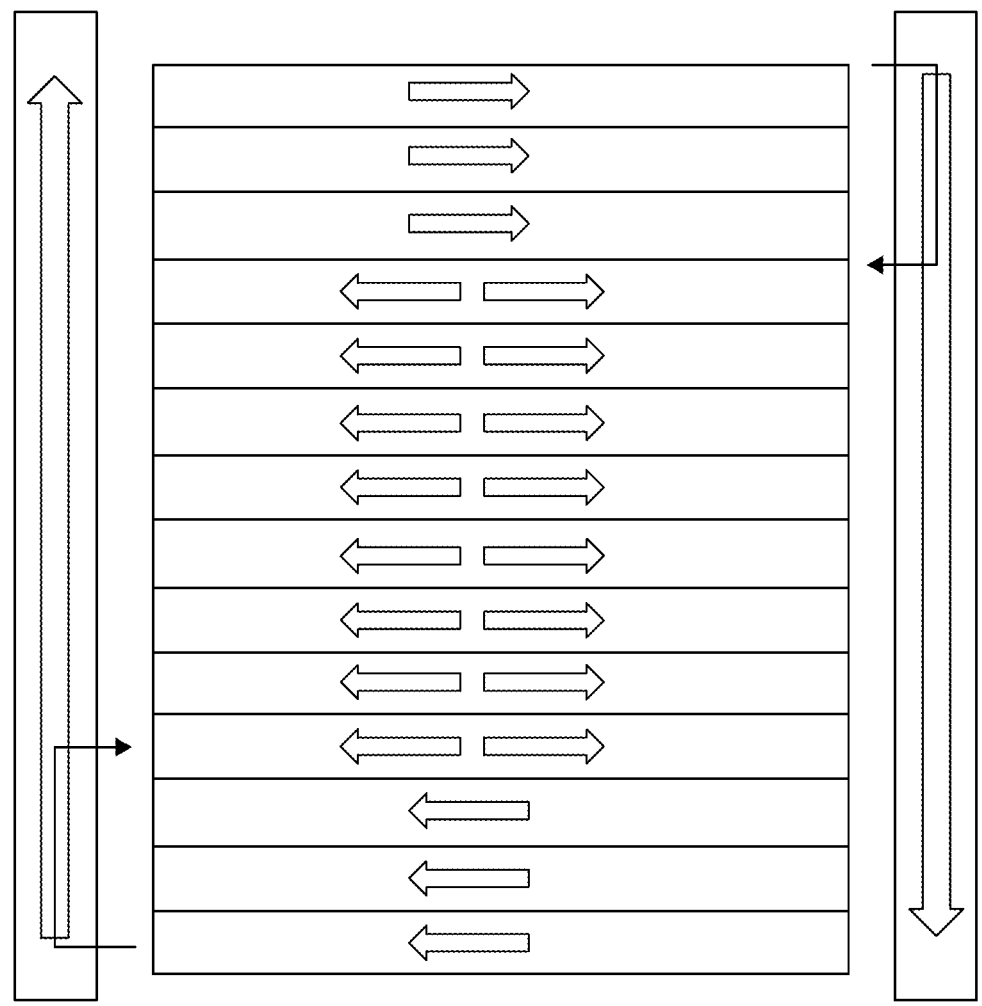
FIG. 40 is a schematic diagram of a layer of the storage structure showing limitations of the improved-efficiency embodiment.

FIG. 40 shows one possible limitation of the improved efficiency embodiment of the invention. Because there is only a single belt on each side of the storage structure, in embodiments where the belts only move in one direction, there may be constraints on the rows towards the edges of the layer in which the rows can only have tote extracted in a single direction. The number of rows to which the limitation may apply may be a function of the space required to set up the "circular" motion of the totes. As discussed before, the decoupling and coupling of the totes may require mobile carriers to have flared ends and may also require concurrent bidirectional movement of the totes in a direction both along the longitudinal direction of movement of the row and perpendicular to the longitudinal direction of movement of the row.

Figure 41A:
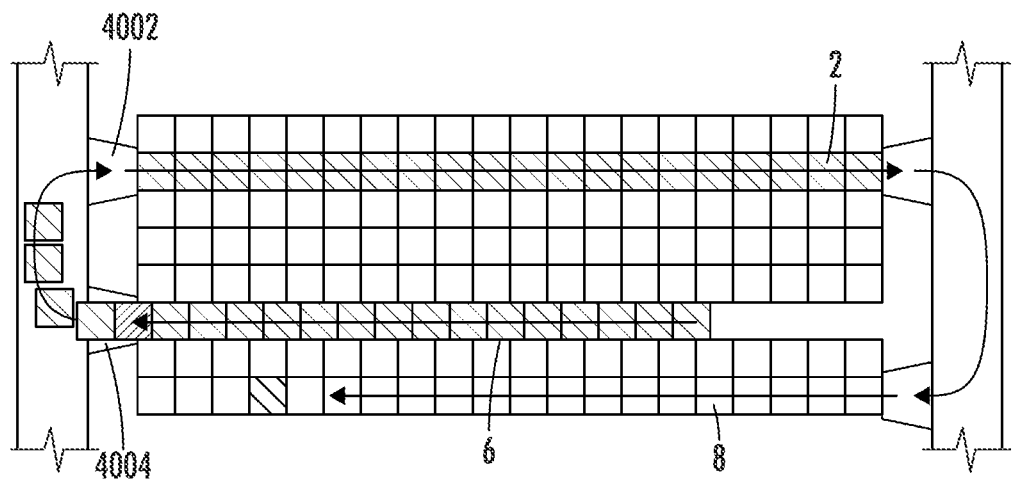
FIG. 41 is a schematic top view of a portion of the storage structure showing the steps to retrieve a tote from the interior of a row of the storage structure using the embodiment having conveyers along the sides of the layer and wherein the totes exhibit a "serpentine" motion.
Figure 41B:
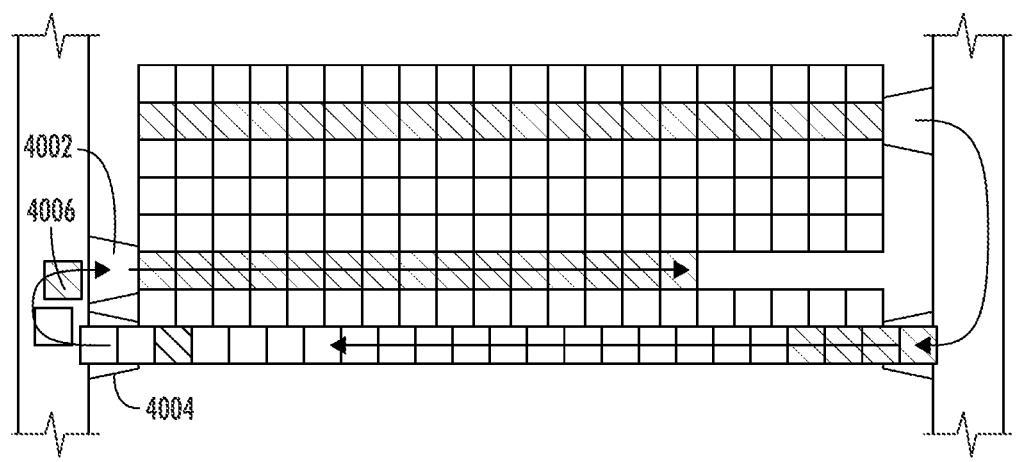

In another aspect of the first improved efficiency embodiment, shown in FIG. 41, the totes may be moved in a "serpentine" motion from a source row to a destination row as opposed to being moved in a "circular" motion. In FIG. 41(A), mobile carrier 4002 is in a position adjacent row 2 and carrier 4004 is in a position adjacent row 6 such as to facilitate the removal of totes from row and into row 2. However, after the tote of interest has been removed from row 6, as shown in FIG. 41(B), mobile carrier 4004 moves adjacent row 8 and mobile carrier 4002 moves adjacent row 6 such as to allow the totes that were removed from row 2 (to make room for the totes that were formally stored in row 6) and onto the right carrier to be moved into row 8 instead of row 6. The totes that are subsequently pushed out of the left side of row 8 are moved back into row 6 via carrier 4002. The serpentine method of movement may provide an optimization in the movement of the totes to increase efficiency. For example, if a second tote-of-interest is located in row 8, it may be possible "chain" storage or retrieval operations to minimize the movement of the carriers and to eliminate intermediate storage steps. One example of chaining events would be the introduction of a new tote into the system, shown as tote 4006 in FIG. 41(B).

It should be noted that, while the invention is discussed in terms of the conveyers being equipped with shoes to move totes on a conveyer to a mobile carrier, any well-known mechanism of moving an object such as to remove it from a conveyer may be used.

Also be noted that, in one embodiment, the invention may operate with only one carrier on each side of the layer of rows of totes. In such an embodiment, the mobile carrier would start at a source row and remain at the source row while one or more totes are moved in the source row onto the conveyer. The mobile carrier would then move to the destination row while the totes are being moved by the conveyer and would then facilitate the movement of the totes from the conveyer to the destination row.

In a second improved efficiency embodiment, shown in FIG. 42, the stationary containers located on either side of the layer of rows may be eliminated in favor of mobile carriers having conveyers several rows wide thereon which may be moved from place to place within the layer on either side of the storage structure.

Figure 42A:
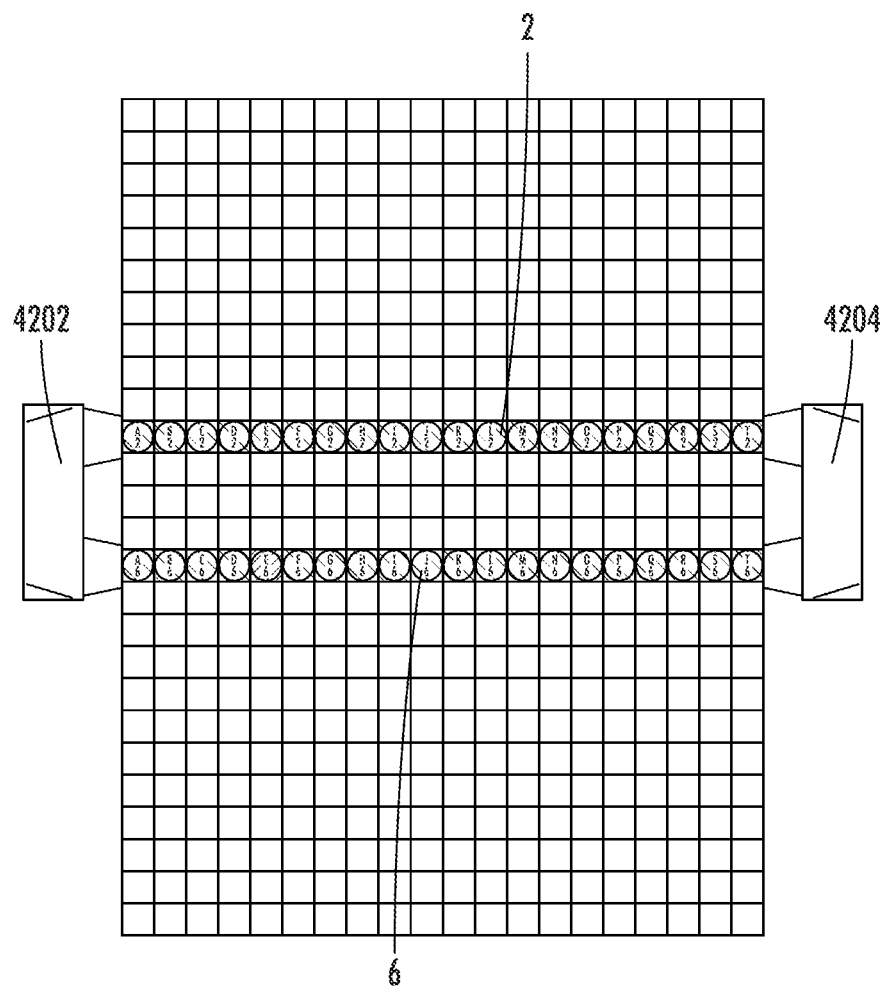
FIG. 42(A-C) are a series of schematic depictions showing the steps to retrieve a tote from the interior of a row of the storage structure using an alternate embodiment of the invention having mobile conveyers along the sides of the layer.

FIG. 42(A) shows the configuration of the totes as they were in FIG. 39(A), in which the tote-of-interest is E6, stored in row 6. Mobile conveyers 4202 and 4204 are located on opposite sides of the layer of the storage structure and are horizontally mobile within that layer. In some embodiments of the invention, mobile conveyers 4202, 4204 have entry and exit points a fixed number of rows apart (as an example, FIG. 42(A) shows the entry and exit points of mobile carriers 4202, 4204 being five rows apart), while in other embodiments, the overall size as well as the location of the entry and exit points may be configurable. In preferred embodiments of the invention, the mobile conveyers are configured with a movable belt or other mechanism which moves the totes along the length of the mobile conveyer. In preferred embodiments of the invention, the mobile conveyers on each side of a layer may move totes in opposite directions, however, the invention is intended to include embodiments wherein the mobile conveyers are configured to move totes in the same direction or are able to be configured to change the direction in which the totes are moved dynamically. Also, in preferred embodiments of the invention, each layer of the storage structure will be provided with its own pair of mobile conveyers, however, in other embodiments, mobile conveyers may be vertically mobile such as to move vertically between layers. In yet other embodiments of the invention, a single layer of the storage structure may be configured with more than one mobile conveyer on either side of the layer.

In the scenario shown in FIG. 42, mobile conveyers 4202 and 4204 are 5 rows wide and, as such, are only able to move totes into a destination row which is exactly 5 rows away from the source row. It should be noted that the 5-row-wide mobile conveyers are exemplary in nature only and that the invention is not intended to be limited to mobile conveyers 5 rows in width. In the first step of the scenario, shown in FIG. 42(A), mobile carriers 4204 and 4204 are positioned at opposite ends of rows 2 and 6 such as to be able to move totes between rows 2 and 6. Once mobile carriers 4202 and 4204 are in place, the scenario operates very similarly to the embodiment previously described having fixed conveyers 3700. As such, the series of steps to extract tote-of-interest E6 from row 6 will not be repeated here.

Figure 42B:
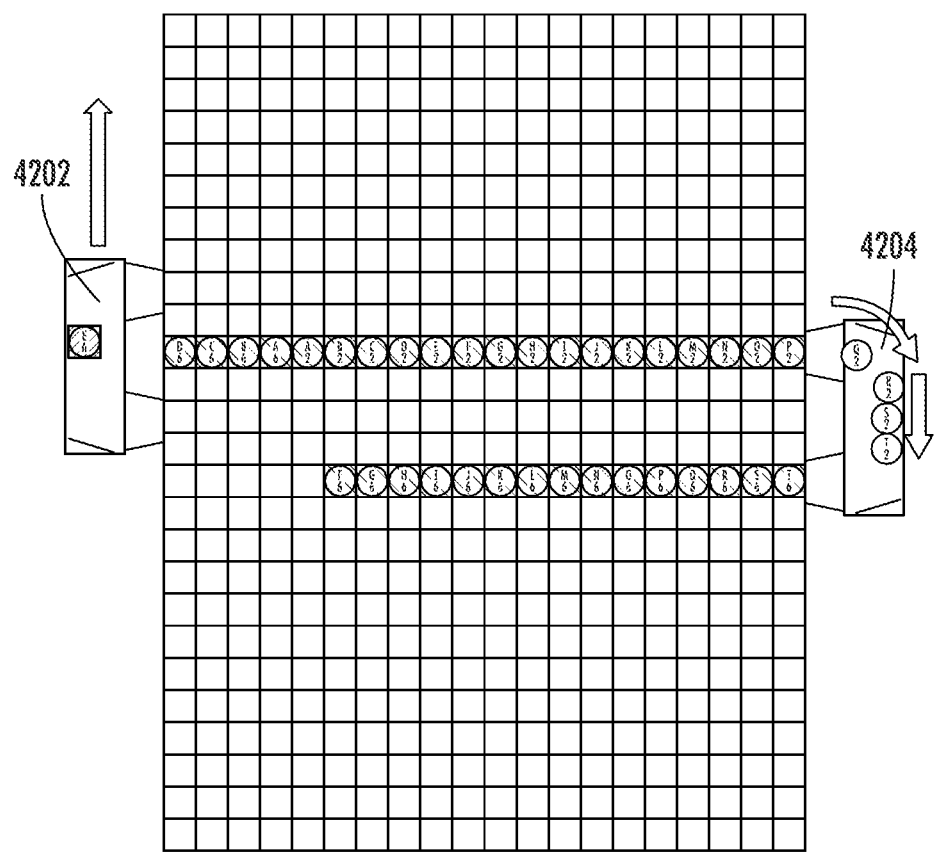
Figure 42C:
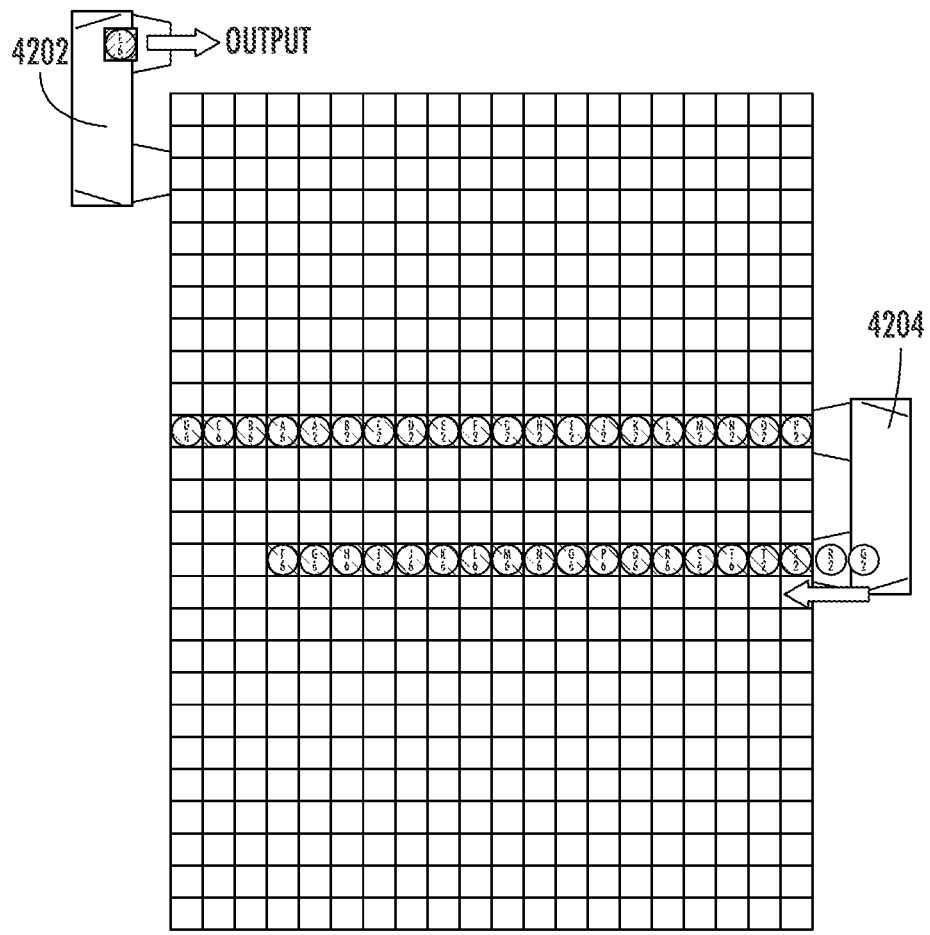

FIG. 42(B) shows the end of the scenario wherein tote E6 is on mobile conveyer 4202, while carrier 4204 is in the process of storing totes T2, S2, R2 and Q2, which have been pushed out of row 2, into row 6, as in the previous scenario. Because the mobile conveyers also act as mobile carriers, mobile conveyer 4202 is proceeding to an exit point of the system to drop off tote E6. FIG. 42(C) shows mobile conveyer 4202 delivering tote E6 to the exit point of the storage structure.

It should be noted that it is possible, in the improved-efficiency embodiments of the invention, to move the totes using both the "circular" and the "serpentine" methods described previously together.

To move the rows at a constant velocity, the improved-efficiency storage structure may, in some embodiments, be provided with a drive mechanism. In some embodiments, the drive mechanism may comprise a rack and pinion drive wherein each tote may be configured with a rack and wherein the driven pinions are disposed within the rows of the storage structure. The rows of totes are thereby able to be moved within each row in either direction by driving the pinion gears against the racks on the totes. In some embodiments, the mobile carriers may be provided with a motorized drive mechanism to drive the pinion gears in the row. In other embodiments, each row may be provided with a motorized drive. In some embodiments, the drive mechanism on the mobile carriers may be a rack and pinion system as described above with respect to the rows of the storage structure. In yet other embodiments, both the mobile carriers and the rows may be provided with a motorized drive mechanism such as to be able to move one or more totes either from a conveyer and into a destination row or from a source row onto a conveyer as the row moves at a constant velocity. In yet other embodiments of the invention, other drive mechanisms may be used to move the rows in either direction. In the improved efficiency embodiments, an additional guiding mechanism could be installed to keep the rack and pinion engaged and to prevent the totes from jumping the gears due to the insufficient weight of the totes.

Figure 43A:
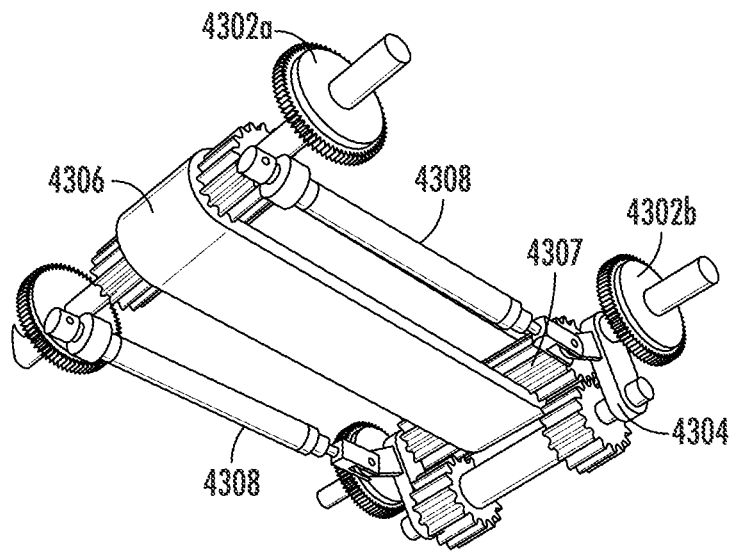
FIG. 43(A-H) show various embodiments of a drive mechanisms for moving the rows of totes.

In a preferred embodiment of the invention, to avoid the cost of installing drive motors within each row of the storage structure, mobile carriers may be fitted with a powered drive mechanism and may transfer powered drive motion to a row. FIG. 43 shows various embodiments of such a mechanism. In a first embodiment, as shown in FIG. 43(A), each mobile carrier will be provided with two sets of pinion gears 4302a, 4302b, wherein the pinion gears of each set are joined by an axle. The two sets of pinion gears may be joined by a belt 3706 which engages gearing 4304 on the axle to move each set of pinion gears in lockstep. As such, only one set of pinion gears 4302a, 4302b, needs to be driven by a motor (not shown) and the rotational motion of the driven set of pinion gears will transfer to the un-driven set of pinion gears via belt 4306. Belt 4306 may be any mechanism suitable for transferring the rotational memo motion of one set of pinion gears to the other set of pinion gears, for example, a chain. In other embodiments, pinion gears 4302a, 4302b may be driven independently by separate motors. Each mobile carrier is also provided with a set of transfer gears 4304 which may be rotated around the axle of pinion gears 4302b.

Figure 43B:
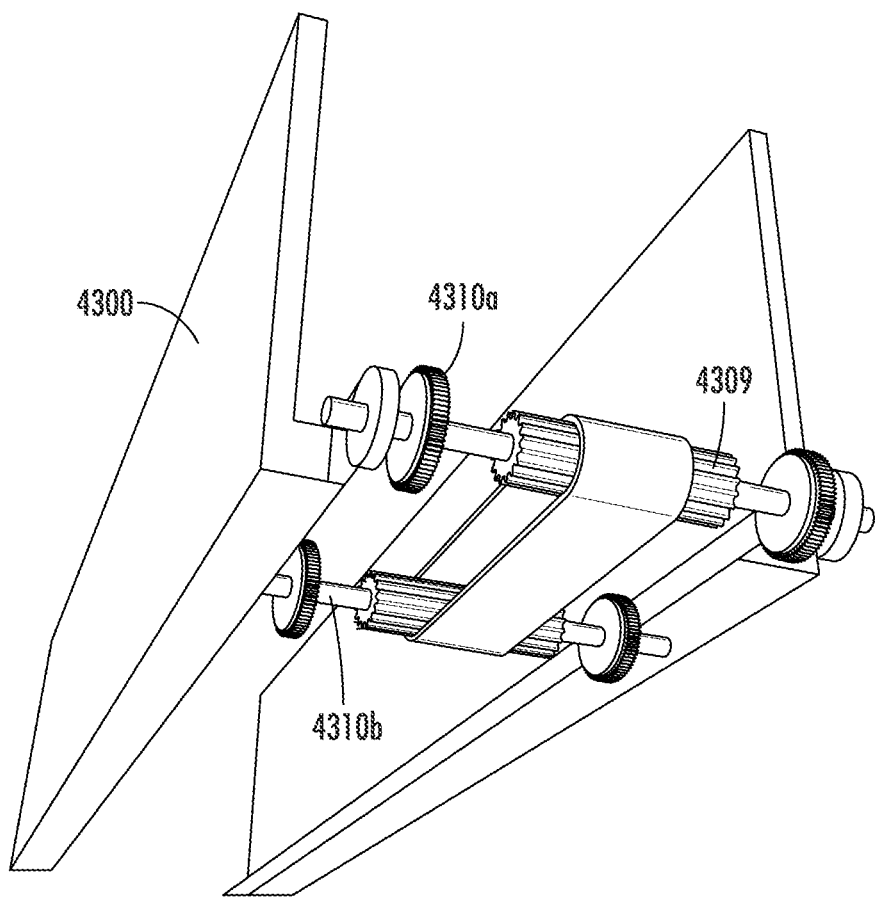
Figure 43C:
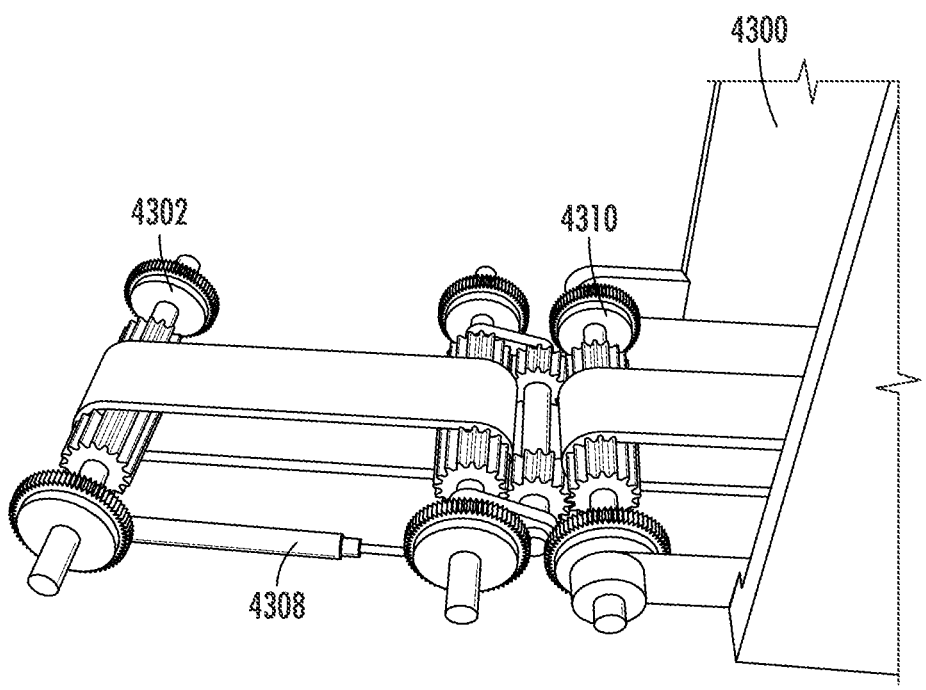

FIG. 43(B) shows one row 4300 of the storage structure provided with a similar mechanism as is present on the mobile carrier. The mechanism comprises two sets of pinion gears 4310a, 4310b, joined by belt 4312 which engages a gear on each axle such as to rotate the two sets of pinion gears in lockstep. In other aspects of the invention, belt 4312 may be any means of coupling pinion gears 4310a, 4310b, for example, a belt, a chain. A driveshaft, a gear train, etc. The two sets of pinion gears 4310a, 4310b, are rotatably attached to storage structure 4300, and are un-driven. When the transfer gears 4304 present on a mobile carrier are actuated by actuating rods 4308, they are rotated such as to engage set of pinion gears 4302b on the mobile carrier with set of pinion gears 4310a in row 4300. In this embodiment, transfer gears 4304 engage with axle gear 4307 on the mobile carrier and axle gear 4309 in the row to drive the pinion gears 4310a, however, other arrangements of transfer gears and points of contact with the pinion gears are possible. The movement of transfer gear 4304 is shown in a disengaged position in FIG. 43(E), an intermediate position between a disengaged position and an engaged position in FIG. 43(F) and in an engaged position in FIG. 43(G). As the pinion gears on the mobile carrier are driven by the motor (not shown), the presence of transfer gear 4304 will also cause the sets of pinion gears 4310a, 4310b in row 4300 to rotate in lockstep with the set of pinion gears 4302a, 4302b on the mobile carrier.

Figure 43D:
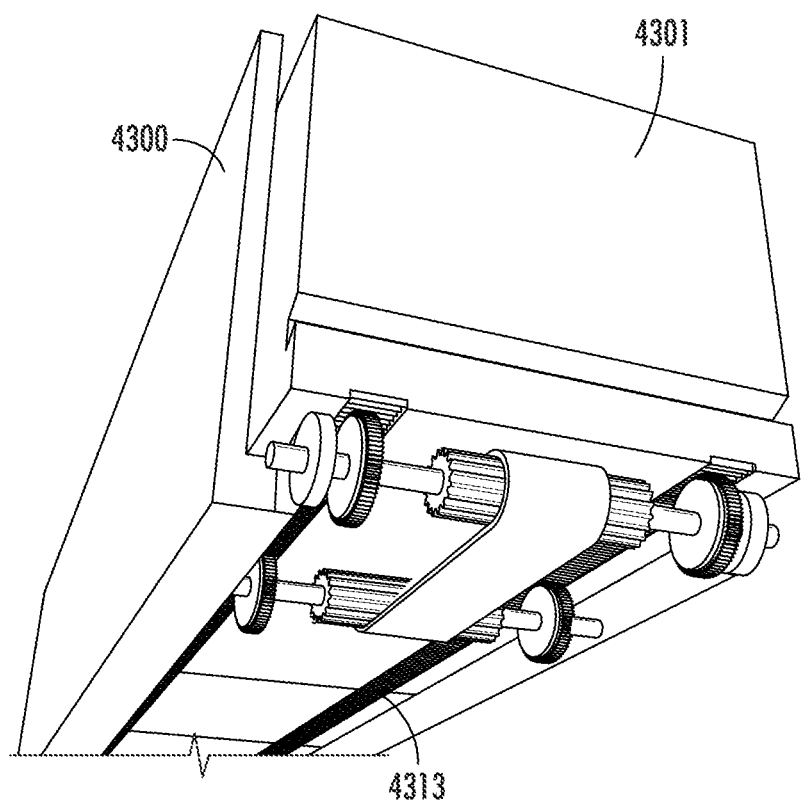
Figure 43E:
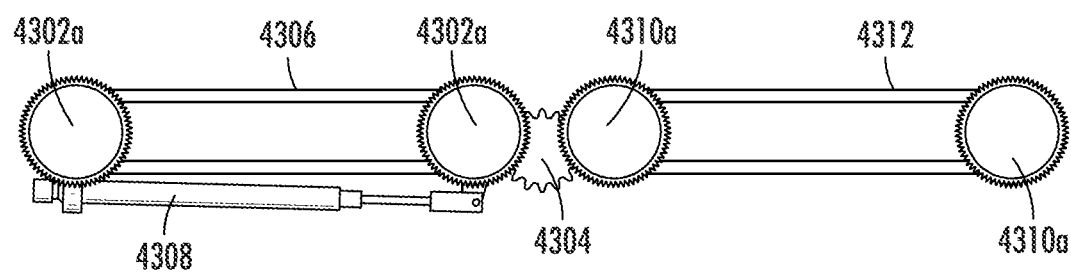
Figure 43F:
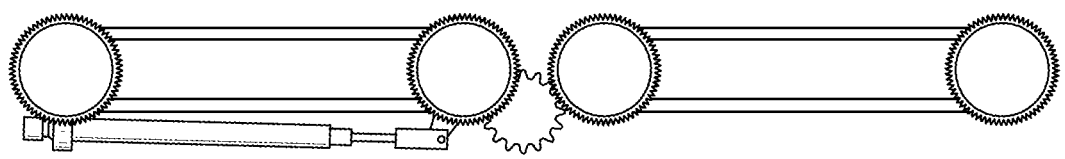
Figure 43G:
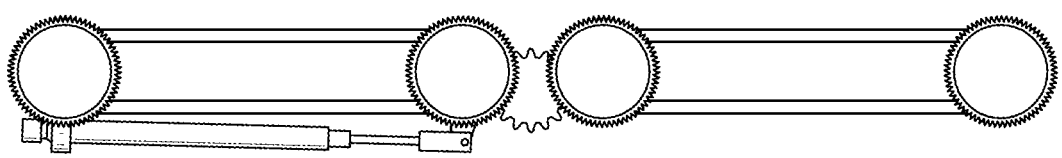

As shown in FIG. 43(D), each tote 4301 may be configured with a set of racks 4313 on a bottom surface thereof which may engage with pinion gears in pinion gear sets 4310a, 4310b. As such, the tote 4301 which is engaged by sets of pinion gears 4310a, 4310b, as well as any totes in the row coupled to it, may be moved in either direction by the drive motor (not shown) located on the mobile carrier, thereby eliminating the need for each row to be fitted with a separate drive motor. Once transfer gears 4304 are disengaged from sets of pinion gears 4302b, 4310a by actuating rods 4308, the mobile carrier may be free to move away from row 4300 to another row in the storage structure. It should be noted that the actual configuration of the mechanism described as the preferred embodiment may be varied and still be within the scope of the invention. The novel aspect of the drive mechanism is that a motor located on the mobile carrier is able to transfer motion to a portion of the drive mechanism located within row 4300 to cause the movement of the row of totes in either direction. To minimize the probability of the rack and pinion becoming disengaged (e.g. by popping off the track), the top of tote 4301 could be prevented from moving up by passive rollers/skids that prevent the totes from jumping off the gears.

Note that, in the event that mobile carriers are disposed on both sides of a full row, such as the situation wherein one mobile carrier is pushing a tote into a row and the other mobile carrier is disposed on the opposite side of the row to receive a tote which is being pushed out of the row, the pushing and pulling motions of the mobile carriers will need to be coordinated.

Figure 43H:
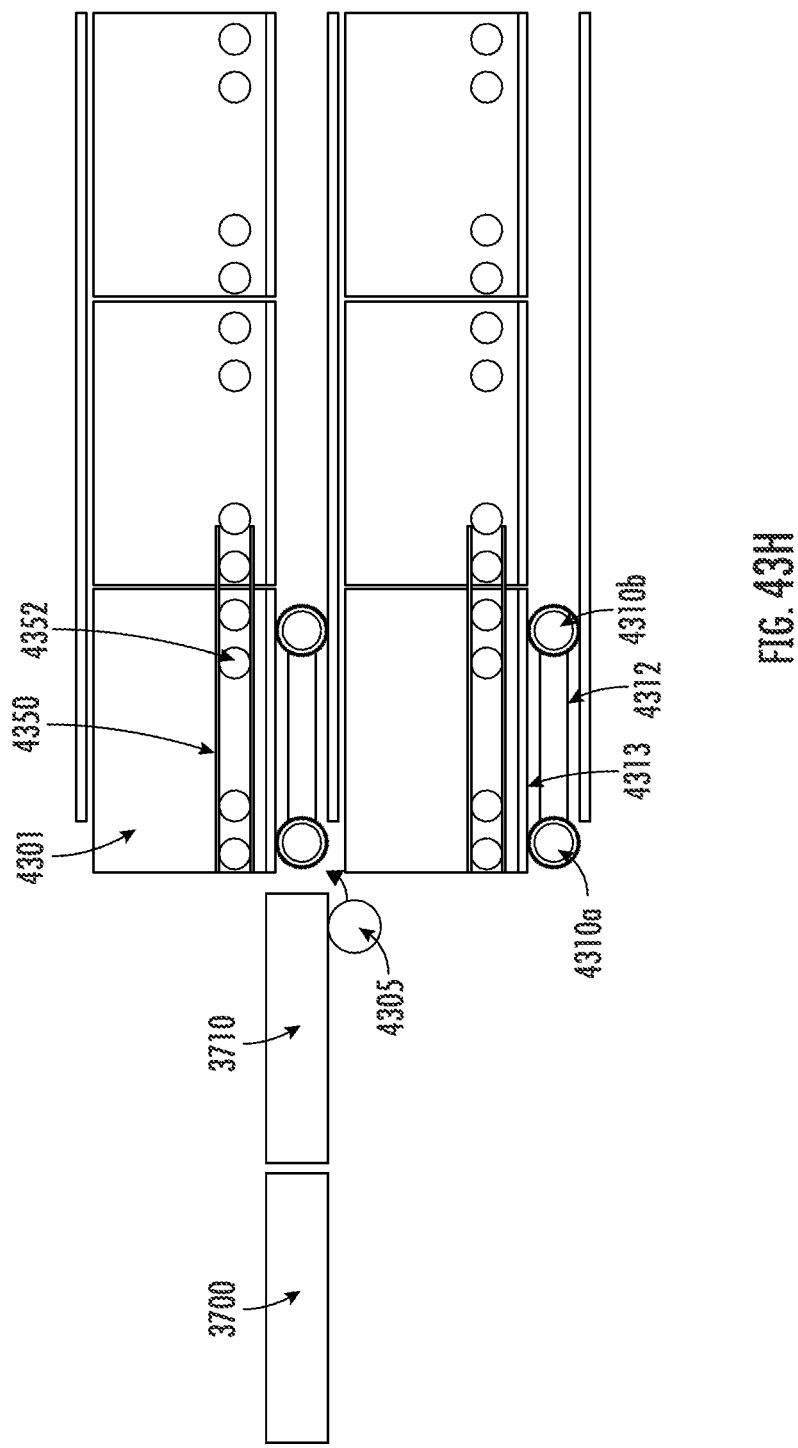

FIG. 43(H) is a second possible embodiment of the invention wherein the mobile carrier is fitted with a powered drive mechanism to transfer powered drive motion to the row. In this embodiment, mobile carriers 3710 is fitted with a gear 4305 driven by a motor. Gear 4305 in similar or identical to gear 4304 shown in FIG. 43(A). When mobile carriers 3710 adjacent a row, gear 4305 may rotate into contact with pinion gears 4310a, located within the row. In one embodiment, rotational power may be transferred from pinion gear 4310a to pinion gear 4310b via belt 4312. As with the previous embodiment, tote 4301 is fitted with a rack 4313 on a surface thereof to interface with pinion gears 4310a, 4310b. Each row may also be fitted with one or more mechanical guides 4350 to allow the totes to move along the longitudinal axis of the row and to maintain proper engagement of the pinion gears 4310a, 4310b to the rack 4313. Mechanical guides 4350 may be configured with rollers guide rollers 4352 or other means of reducing friction between the totes and the storage structure as the rows of totes are moved. In this embodiment, the drive pinions 4310a, 4310b that contact the tote rack 4313 are only in the storage structure, while the powered drive pinion is still on the mobile carrier 3710.

FIGS. 44(A-J) illustrate yet another embodiment of the invention in which the layers are vertically-oriented instead of horizontally-oriented. In this embodiment, the totes are arranged in rows that are in the same vertical column. There can be one or more rows between the source row (i.e., the row from which totes are retrieved) and the destination row (i.e., the row into which totes are stored). One advantage of the vertically-oriented rows is that totes may be moved from a higher row to the lower row with the assistance of gravity.

Figure 44A:
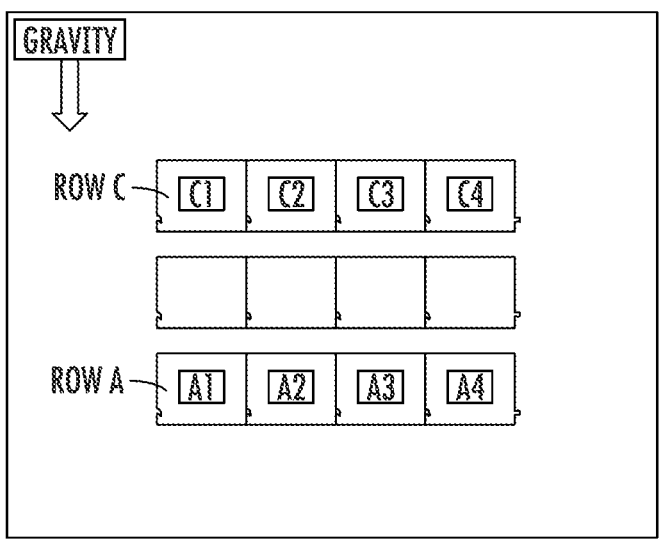
FIG. 44(A-J) shows a sequence of operations wherein the tote motion is gravity-assisted by moving totes from an upper row to a lower row.

FIG. 44(A) is a side view of three vertically-oriented rows of totes wherein the tote-of-interest is tote C3. In FIG. 44(A), tote-of-interest C3 is the third tote from the end in the row "C".

Figure 44B:
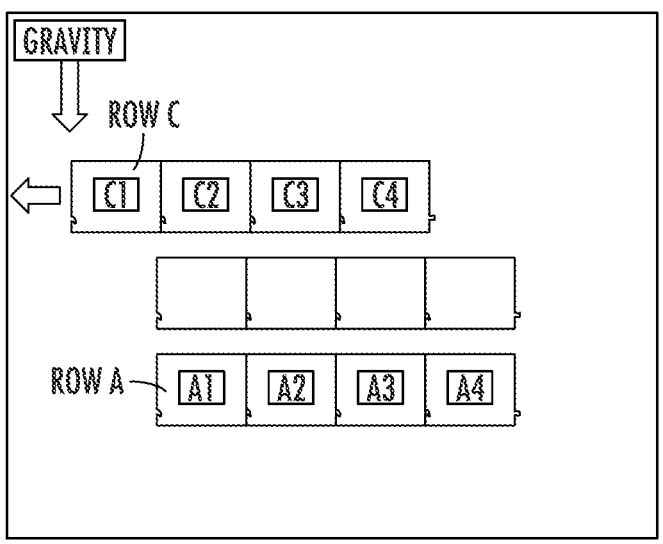

FIG. 44(B) shows the row "C" being moved to the left such that tote C1 is now outside of the storage structure.

Figure 44C:
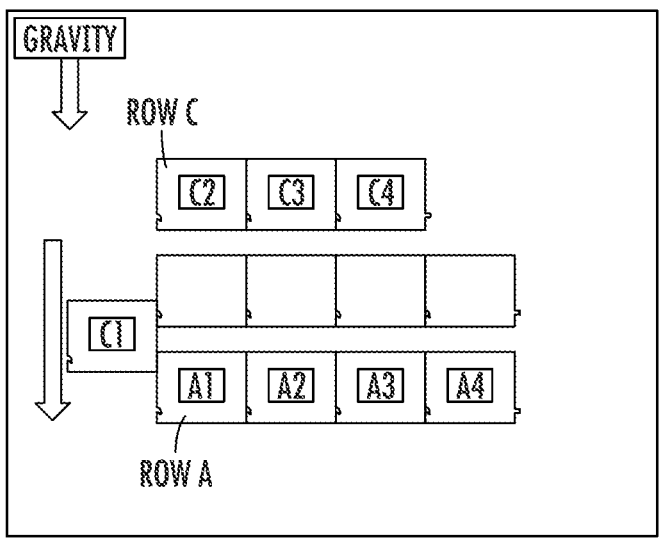

FIG. 44(C) shows that once tote C1 is outside of the storage structure, tote C1 is moved downward from row "C" toward row "A". Because this motion is in the direction of gravity, it requires less energy to move the tote from row "C"

to row "A". The downward motion of the totes from row "C" to row "A" may be assisted to ensure proper deceleration or velocity or can be unassisted using only gravity. In preferred embodiments of the invention, the storage structure may be configured with a conveyer or some other mechanism on the left side of the vertically-oriented rows for guiding the tote as it falls from row "C" to row "A" and for slowing and stopping the tote when it is aligned with row "A". As tote C1 moves away from row "C", it is automatically decoupled from tote C2. As such, in this embodiment, the rows can still maintain a constant velocity as totes are moved into and out of the storage structure and decoupled from or coupled to their rows.

Figure 44D:
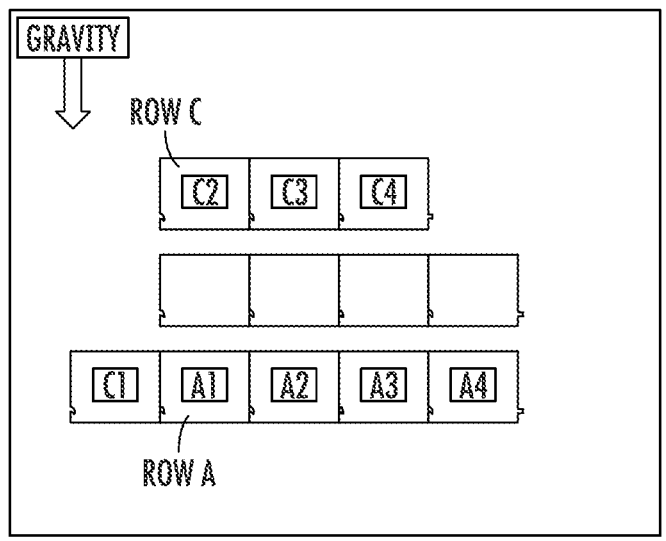

FIG. 44(D) shows that, as tote C1 approaches the row "A", the downward motion of tote C1 is slowed and its downward velocity is reduced to zero. As tote C1 moves to the same height as row "A", it can be automatically coupled to tote A1 in row "A".

Figure 44E:
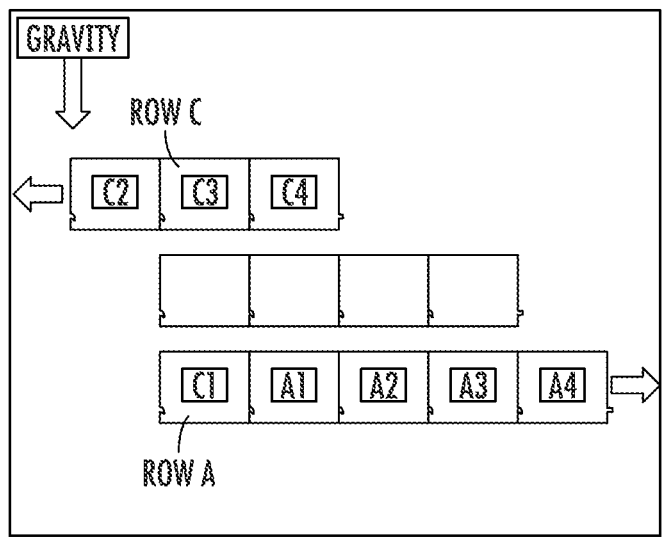

In FIG. 44(E), tote C1 is pushed into the left side of row "A", which then causes tote A4 to be pushed out of the right side of row "A". Similarly, tote C2 is moved out of the row "C". In the position shown in FIG. 40(E), the totes in row "C" are coupled to tote C2 so they are moved along with tote C2. In addition, tote C1 and A4 are coupled to the other totes in row "A" so they are moved along with these other totes.

Figure 44F:
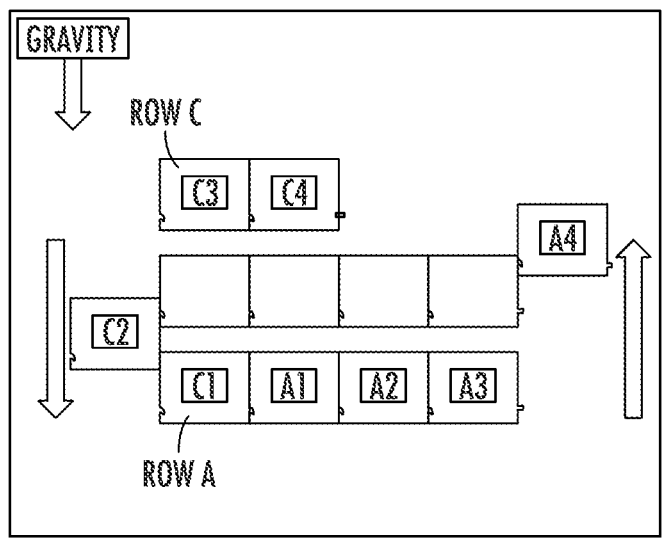

FIG. 44(F) shows tote C2 being lowered from row "C" towards row "A" assisted by gravity. As tote C2 moves away from row "C", it is automatically decoupled from tote-of-interest C3. Simultaneously, tote A4 is raised toward row "C", but because it is not in the direction of gravity, it requires a lifting motion through other power/motion sources. In some embodiments, the totes on the right-hand side of the vertically-oriented rows may be raised using a conveyer, a mobile carrier or some other mechanism to elevate the tote to its destination row.

Figure 44G:
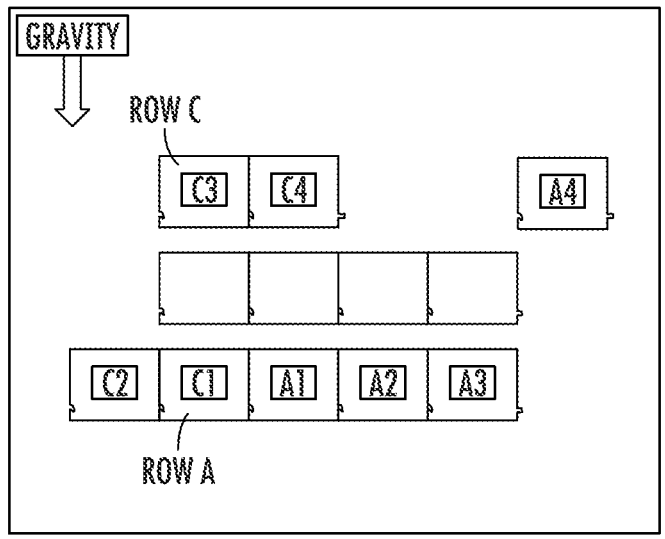

FIG. 44(G) shows tote C2 now aligned with row "A" and becomes coupled to tote C1. In addition, tote A1 has been raised to row "C" and is ready to be pushed into the row.

Figure 44H:
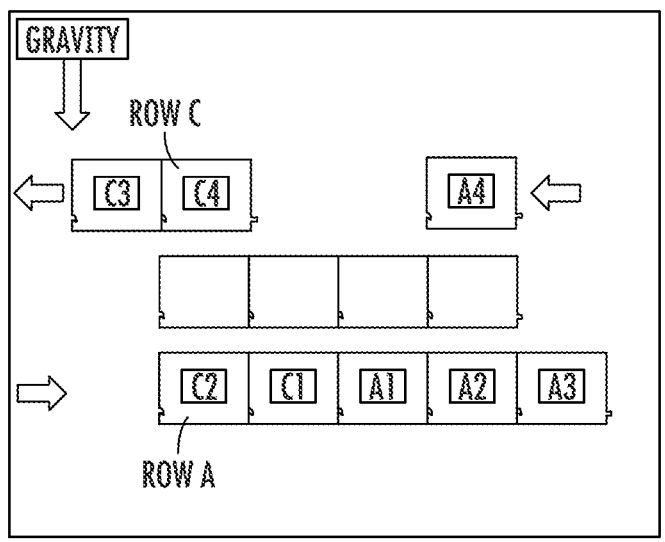

FIG. 44(H) shows several actions. First, the tote-of-interest, C3, is moved out of row "C". Because tote-of-interest C3 is coupled to tote C4, tote C4 moves to the left. Second, tote A4 is pushed into row "C". Note that, because there is a gap between tote C4 and tote A4, tote A4 does not become coupled to the other totes in row "C". Lastly, tote C2 is pushed into destination row "A" thereby pushing tote A3 out of row "A".

Figure 44I:
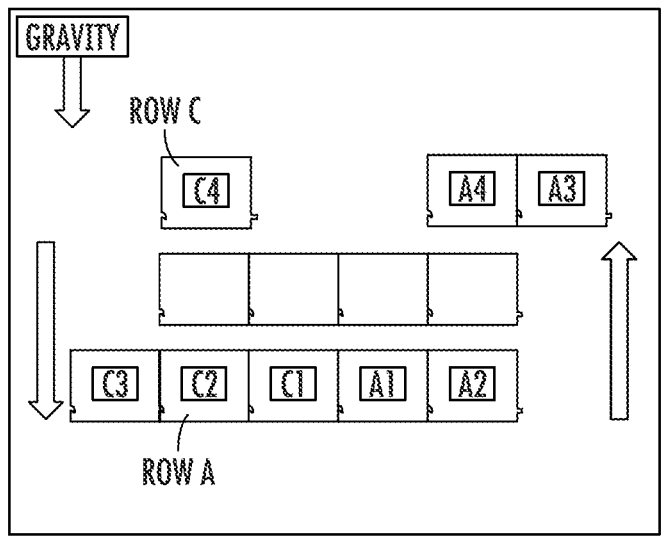

In FIG. 44(I), tote-of-interest C3 has been lowered to the level of row "A" using the gravity-assist, while tote A3 has been raised to the level of row "C" by the conveyer (not shown) on the right side of the vertically-oriented rows.

Figure 44J:
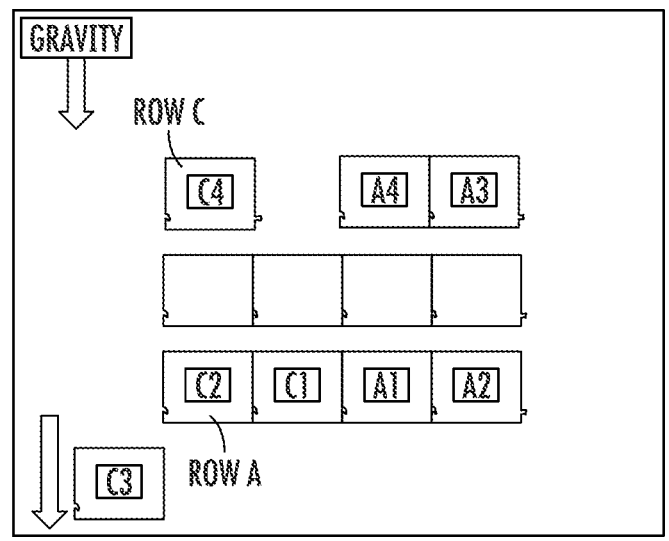

Finally, FIG. 44(J) shows tote-of-interest C3 being lowered below row "A", and, eventually, to an exit point of the storage system.

Software Architecture

Figure 45:
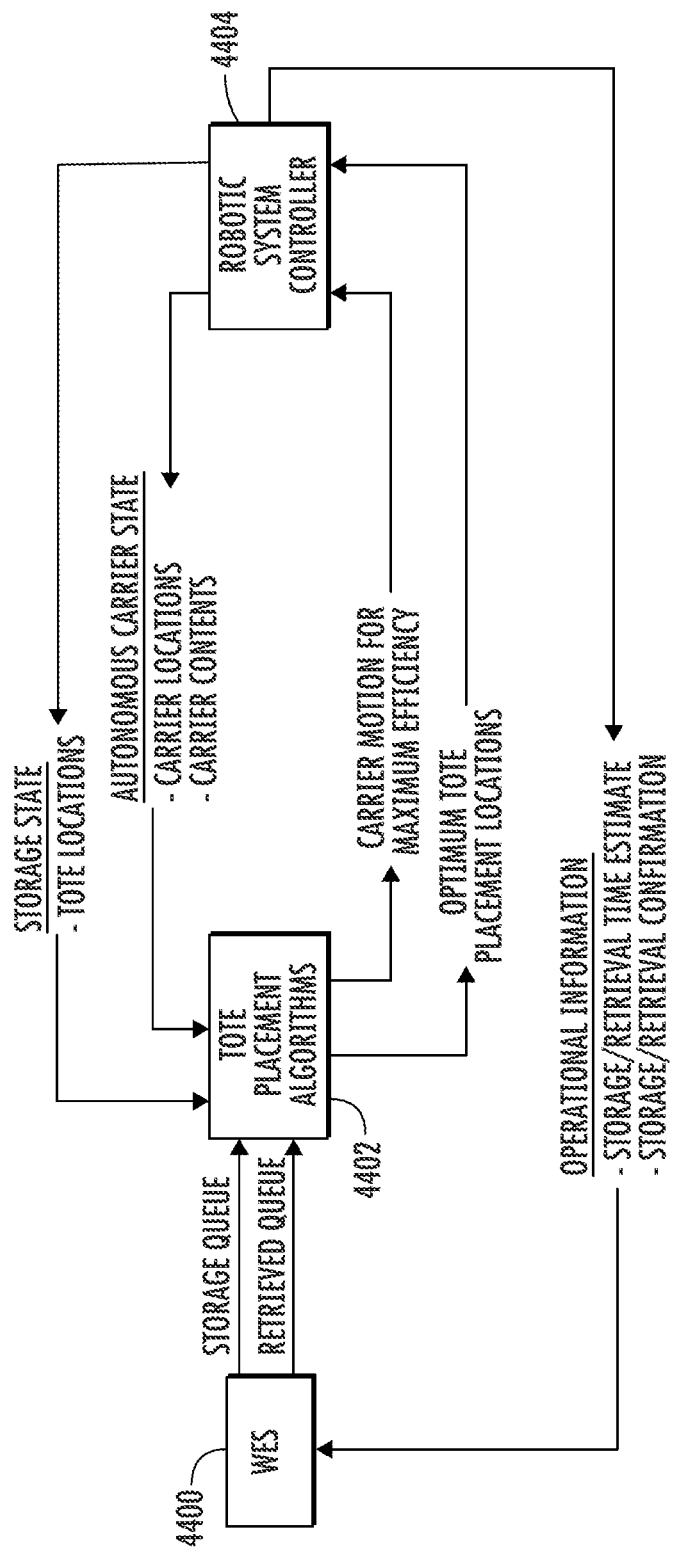
FIG. 45 shows one embodiment of a software architecture of a control system for the described system.

FIG. 45 shows one implementation of a software architecture to manage and optimize the storage and retrieval processes used to store and retrieve totes within this system. A warehouse execution system (WES) 4500 provides both a desired queue for totes to be stored and a desired queue for totes to be retrieved. Each of these queues are processed into the tote placement algorithms 4502. These algorithms optimize and re-order the queues based on several factors that include, but are not limited to, maximum movement efficiency of the robotic carriers and optimal placemen/storage of totes within the storage structure. Tote placement algorithms 4502 provide the robotic system controller the desired row(s) to place and/or retrieve a tote from. This information is used by the robotic system controller 4504 to determine motion paths and execute the tote storage and retrieval process.

The state of the totes within storage structure is also monitored by the robotic system controller 4504 which updates both the storage state of tote locations and the autonomous carrier state locations and contents back into tote placement algorithms so that it can continue to update carrier motion and tote placement/storage locations for maximum efficiency. Additionally, the robotic system controller 4504 sends operational information back to the WES 4400 to give estimates on storage and retrieval times and confirmation of tote storage and retrieval so that the queues are properly updated.

This software system could include optimizations that include, but are not limited to, deciding which totes should be prioritized for retrieval in the system, the optimal stocking placement for products based on either priority or by how often the product is required to be retrieved from the system, planning for optimal placement of totes being stored in the system, and for how to manage "holes or gaps" in the system that result from a tote being retrieved from the system for other operations. It is important to note that there could only be a single gap on any row.

Figure 46:
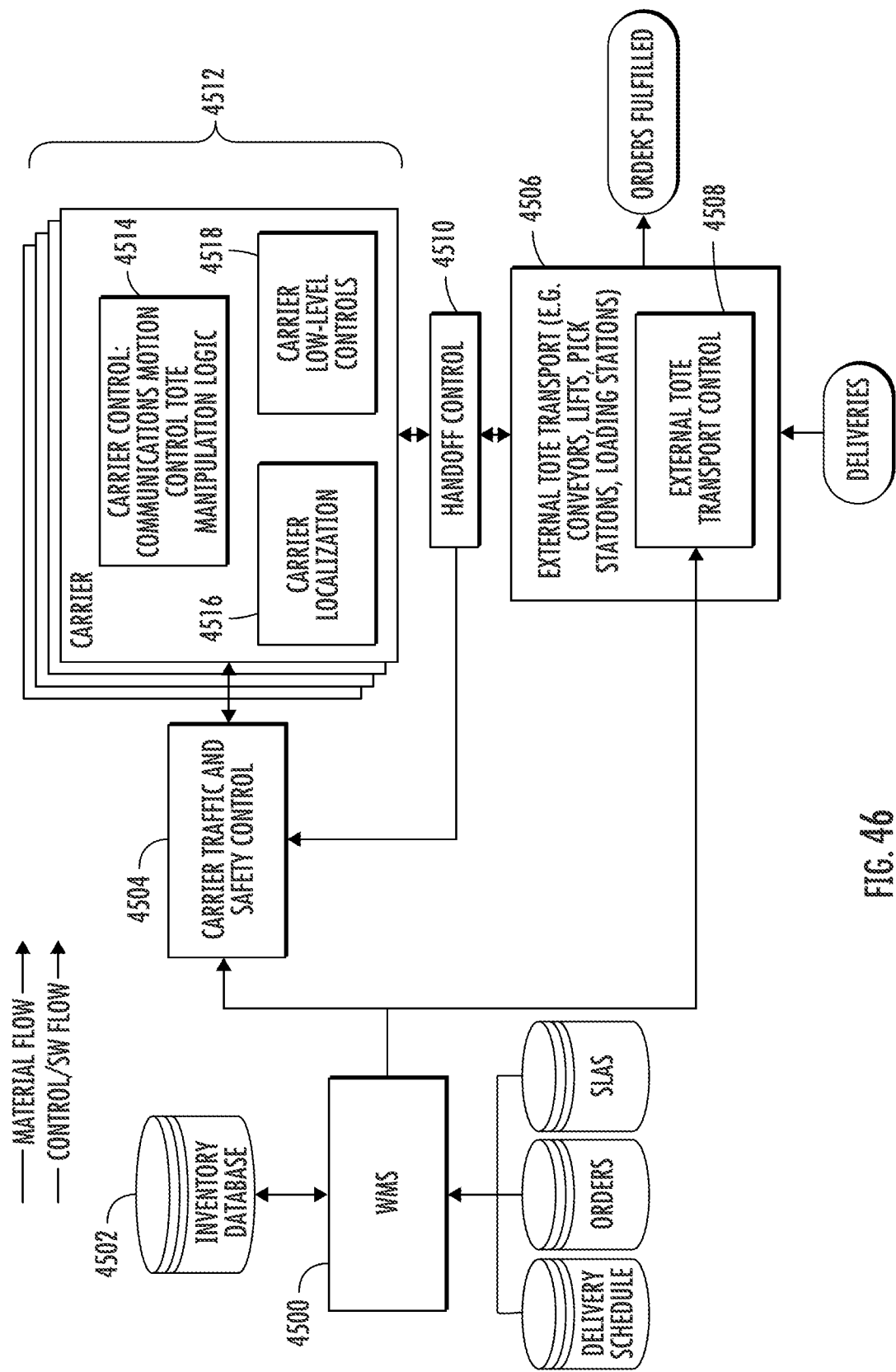
FIG. 46 shows an alternate embodiment of a software architecture of a control system for the described system.

An alternate embodiment of the software architecture is shown in FIG. 46. A warehouse management system (WMS) 4600 monitors and updates a warehouse's inventory database 4602 based on delivery schedules, orders, and service level agreements (SLA)s. The WMS 4600 communicates with carrier traffic and safety controller 4604 for the automated carriers as well as all of the external transport systems for totes (conveyers, lifts, pick stations, loading stations, etc). The external tote transport 4606 is able to handle the material flow of deliveries coming into the system as well as fulfilled orders going out of the system. The external tote transport control 4608 is able to handoff control of the tote transport to the carrier traffic and safety controller 4604 when totes are flowing into or out of the storage structure. The handoff controller 4610 is able to assign the totes that are being placed or retrieved into the system to a particular set of carriers 4612, each with their own carrier controller 4614 that consists of communications, motion control, and tote manipulation logic controller. As the carrier either stores or retrieves the tote, it continually updates its location via on board localization 4616 and is able to execute desired operations via on on-board low-level controller 4518. As the carriers execute their processes, they communicate with the carrier traffic and safety controller which updates the required trajectories and motions based on the top-level motion requirements for the system.

In preferred embodiments, the hardware components of the system are controlled via software executing on one or more processors. The software may be stored on a non-transitory computer-readable storage medium. In various embodiments of the invention, a process, a system and a non-transitory computer-readable storage medium containing the software may be claimed.

In addition to the components described herein, a means of communicating the instructions to and receiving status from each of the carriers as well as a means of sending instructions to and receiving status from each of the input/output mechanisms will be necessary. These interfaces, in preferred embodiments, will be wireless to avoid the entanglement of wired connections as carriers move about the carrier support structures.

In addition, various embodiments of the invention will require a database to store the current location of each tote stored within the storage system. The locations, in various embodiments, may include a layer indicator indicating the layer in the storage system in which each tote is stored, a row indicator indicating the row within the layer in which each tote is stored, and a depth indicator where within the row each tote is stored.

The software may include various optimization routines which may use information in the database and the current status of the carriers in the input/output mechanisms to optimize movement of the carriers and the order in which the totes are stored and retrieved. In preferred embodiments of the invention, the system may be optimized to obtain the minimum time to retrieve any particular tote from the storage system or, in the alternative, to maximize the number of retrievals per unit time of the system.

In some embodiments of the system, the totes may be provided with a means of identification, for example, an RF tag or a barcode, which may be read by a sensor in the system for confirming the location of a tote as it is moved into or out of the storage system.

In certain embodiments of the system, the totes are unidirectional in nature. That is, the totes must be stored in a certain orientation in the system to enable the coupling of the totes to other totes within each row. As such, the system may be provided with a means for orienting totes such they are oriented in the proper direction before they are stored, or, alternatively, for rejecting totes which are placed into the system in a non-conforming orientation.

The invention has been described in the context of specific embodiments, which are intended only as exemplars of the invention. As would be realized, many variations of the described embodiments are possible. For example, variations in the design, shape, size, location, function and operation of various components, including both software and hardware components, would still be considered to be within the scope of the invention, which is defined by the following claims.

We claim:

1. A storage structure comprising:
   a plurality of layers, each layer comprising a plurality of rows for storing a plurality of totes; and
   a conveyer located on opposite ends of any layer;
   wherein totes stored in a source row may be removed from an end of the source row and onto a conveyer as the totes in the source row are moving at a constant velocity toward the conveyer; and
   wherein totes on a conveyer may be stored in a destination row as the totes in the destination row are moving at a constant velocity away from the conveyer.

2. The storage structure of claim 1 layer further comprising:
   one or more drive mechanisms for moving totes within a source or destination row at the constant velocity toward either of the opposite ends of the layer.

3. The storage structure of claim 2 wherein the one or more drive mechanisms comprise a rack and pinion mechanism wherein each row of the storage structure comprises one or more pinions and wherein each of the totes is equipped with one or more racks.

4. The storage structure of claim 3 further comprising:
   one or more mobile carriers located between each conveyer and its respective side of the layer.

5. The storage structure of claim 1 wherein the conveyer also serves as a mobile carrier.

6. The storage structure of claim 4 wherein a motorized portion of the drive mechanism is built in to the one or more mobile carriers.

7. The storage structure of claim 6 wherein the one or more drive mechanisms comprise:
   a motor;
   one or more transfer gears driven by the motor which engage one or more pinion gears in the storage structure to transfer driven rotational movement from the motor to the one or more pinions gears on the storage structure.

8. The storage structure of claim 6 wherein the one or more drive mechanisms comprise:
   one or more driven pinion gears located on the mobile carrier;
   a motor for driving the one or more driven pinion gears;
   one or more un-driven pinion gears rotatably attached to a source or destination row of the storage structure; and
   one or more transfer gears which engage the driven pinion gears and the un-driven pinion gears such that the driven rotational movement of the driven pinion gears by the motor also serve to rotate the one or more pinion gears within the source or destination row;
   wherein the one or more un-driven pinion gears located within the source or destination row engage one or more racks disposed on each of the plurality of totes such as to be able to move one or more of the plurality of totes in either direction within the source or destination rows.

9. The storage structure of claim 6 wherein:
   totes being removed from an end of the source row pass through a mobile carrier and onto a conveyer; and
   totes being stored in a destination row pass from a conveyer, through a mobile carrier and into the destination row.

10. The storage structure of claim 9 wherein totes being removed from the source row move in directions both parallel to the longitudinal axis of the source row and perpendicular to the longitudinal axis of the source row, such as to move in an approximately circular path as the tote passes through the mobile carrier and onto the conveyer.

11. The storage structure of claim 10 wherein a tote moving from a source row is decoupled from the source row as the tote moves through the mobile carrier and onto the conveyer.

12. The storage structure of claim 9 wherein totes being moved from a conveyer to a destination row move in directions both parallel to the longitudinal axis of the destination row and perpendicular to the longitudinal axis of the destination row such as to move in an approximately circular path as the tote passes through the mobile carrier and into the destination row.

13. The storage structure of claim 12 wherein a tote moving into a destination row is coupled to the destination row as the tote moves through the mobile carrier and into the destination row.

14. The storage structure of claim 2 wherein the conveyers located at the opposite ends of any layer are mobile conveyers spanning the length of multiple rows.

15. The storage structure of claim 14 wherein totes being removed from the source row move in directions both parallel to the longitudinal axis of the source row and perpendicular to the longitudinal axis of the source row, such as to move in an approximately circular path as the tote moves from the source row onto the mobile conveyer.

16. The storage structure of claim 14 wherein totes being moved from a mobile conveyer to a destination row move in directions both parallel to the longitudinal axis of the destination row and perpendicular to the longitudinal axis of the destination row such as to move in an approximately circular path as the tote passes from the mobile carrier and into the destination row.

17. The storage structure of claim 1 wherein the layers are oriented vertically.

18. The storage structure of claim 17 wherein the movement of totes from a higher source row to a lower destination row is assisted by gravity.

19. The storage structure of claim 17 wherein totes moved from a lower source row to a higher source row are lifted by a conveyer.

20. A method for arranging and manipulating totes in a storage structure comprising a plurality of layers, each layer comprising a plurality of rows for storing a plurality of totes, the method comprising:
positioning a first mobile carrier at an end of a source row;
moving the totes in the source row at a constant velocity toward a first conveyer such that one or more totes are moved out of the source row and move through the first mobile carrier onto the first conveyer;
positioning a second mobile carrier at the end of a destination row; and
moving the totes in the destination row at a constant velocity away from the first conveyer such as to accommodate one or more totes moved from the first conveyer and through the second mobile carrier into the destination row;
wherein the conveyer moves the one or more totes in a direction from the source row to the destination row.

21. The method of claim 20 further comprising:
positioning a third mobile carrier at an opposite end of the destination row from the second mobile carrier; and
moving one or more totes pushed from an opposite end of the destination row as the destination row moves away from the first conveyer and toward a second conveyer through the third mobile carrier and onto the second conveyer.

22. The method of claim 21 further comprising:
positioning a fourth mobile carrier between the second conveyer and another row in the layer; and
moving the totes moved on to the second conveyer into the other row through the fourth mobile carrier.

23. The method of claim 22 wherein the other row is the source row.

24. The method of claim 23 wherein the other row is a row other than the source row.

25. The method of claim 21 wherein the first and second mobile carriers are the same carrier and wherein the third and fourth mobile carriers are the same carrier.

26. A method for arranging and manipulating totes in a storage structure comprising a plurality of layers, each layer comprising a plurality of rows for storing a plurality of totes, the method comprising:
positioning a first mobile conveyer at an end of any layer between a source row and a destination row;
moving the totes in the source row at a constant velocity toward the first mobile conveyer such that one or more totes are moved out of the source row and onto the first mobile conveyer;
moving the totes in the destination row at a constant velocity away from the first mobile conveyer such as to accommodate one or more totes moved from the first mobile conveyer and into the destination row;
wherein the conveyer moves the one or more totes in a direction from the source row to the destination row.

27. The method of claim 26 further comprising:
positioning a second mobile conveyer at an opposite end of the layer between the destination row and another row;
moving one or more totes pushed from an opposite end of the destination row as the destination row moves away from the first mobile conveyer and toward the second mobile conveyer onto the second mobile conveyer.

28. The method of claim 27 further comprising:
moving one or more totes pushed onto the second mobile conveyer into the other row.

29. The method of claim 28 wherein the other row is the source row.

30. The method of claim 28 wherein the other row is a row other than the source row.

* * * * *